US010746863B2

United States Patent
Hoshuyama

(10) Patent No.: US 10,746,863 B2
(45) Date of Patent: Aug. 18, 2020

(54) TARGET EXTRACTION SYSTEM, TARGET EXTRACTION METHOD, INFORMATION PROCESSING APPARATUS, AND CONTROL METHOD AND CONTROL PROGRAM OF INFORMATION PROCESSING APPARATUS

(71) Applicant: NEC Corporation, Tokyo (JP)

(72) Inventor: Osamu Hoshuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 982 days.

(21) Appl. No.: 15/124,200

(22) PCT Filed: Dec. 26, 2014

(86) PCT No.: PCT/JP2014/084613
§ 371 (c)(1),
(2) Date: Sep. 7, 2016

(87) PCT Pub. No.: WO2015/136823
PCT Pub. Date: Sep. 17, 2015

(65) Prior Publication Data
US 2017/0016983 A1    Jan. 19, 2017

(30) Foreign Application Priority Data
Mar. 11, 2014   (JP) ................. 2014-048144

(51) Int. Cl.
*G01S 13/34* (2006.01)
*G01S 7/35* (2006.01)
(Continued)

(52) U.S. Cl.
CPC ............. *G01S 13/34* (2013.01); *G01S 7/354* (2013.01); *G01S 7/536* (2013.01); *G01S 13/343* (2013.01);
(Continued)

(58) Field of Classification Search
CPC ...... G01S 13/34; G01S 13/343; G01S 13/584; G01S 13/881; G01S 13/931; G01S 7/354;
(Continued)

(56) References Cited

U.S. PATENT DOCUMENTS

| 7,149,148 B2 * | 12/2006 | Berkman ................. G01S 7/534 367/100 |
| 2009/0009381 A1 * | 1/2009 | Inaba ....................... G01S 13/34 342/109 |

FOREIGN PATENT DOCUMENTS

| JP | 59-044593 B2 | 3/1984 |
| JP | 63-208779 A | 8/1988 |
| JP | 05-240945 A | 9/1993 |

OTHER PUBLICATIONS

International Search Report corresponding to PCT/JP2014/084613, dated Mar. 24, 2015 (4 pages).
(Continued)

*Primary Examiner* — Timothy A Brainard
*Assistant Examiner* — Michael W Justice
(74) *Attorney, Agent, or Firm* — Wilmer Cutler Pickering Hale and Dorr LLP

(57) ABSTRACT

To acquire a beat frequency necessary for target extraction, target speed estimation, and Doppler influence detection by preventing the necessary beat frequency from overlapping unnecessary frequencies in a heterodyne processing result, an apparatus includes a wave receiver that receives a reflected wave of a chirp wave reflected from a target, and outputs a reception wave signal, a dual-sweep signal generator that generates a dual-sweep signal of the chirp wave, having a frequency which does not overlap that of the chirp wave, and a heterodyne processor that generates a beat frequency by multiplying the reception wave signal and the dual-sweep signal as a heterodyne signal.

18 Claims, 50 Drawing Sheets

(51) Int. Cl.
    *G01S 7/536*     (2006.01)
    *G01S 13/58*     (2006.01)
    *G01S 15/34*     (2006.01)
    *G01S 15/58*     (2006.01)
    *G01S 15/88*     (2006.01)
    *G01S 13/931*     (2020.01)
    *G01S 15/931*     (2020.01)
    *G01S 13/88*     (2006.01)

(52) U.S. Cl.
    CPC ............ *G01S 13/584* (2013.01); *G01S 15/34* (2013.01); *G01S 15/586* (2013.01); *G01S 13/881* (2013.01); *G01S 13/886* (2013.01); *G01S 13/931* (2013.01); *G01S 15/88* (2013.01); *G01S 15/931* (2013.01)

(58) Field of Classification Search
    CPC ........ G01S 7/536; G01S 15/34; G01S 15/586; G01S 15/88; G01S 15/931
    USPC ........................................................ 342/109
    See application file for complete search history.

(56) References Cited

OTHER PUBLICATIONS

Stephane Guyonic, Synthetic Aperture Processing on Simulated Data with a Continuous Transmission Frequency Modulation Sonar (CTFM), Traitement du Signal 1994, vol. 11, No. 4, ISSN 0765-0019, pp. 315-324.

Yang Wang and Jun Yang, "Continuous Transmission Frequency Modulation Detection Under Variable Sonar-Target Speed Conditions," Sensors 2013, March, pp. 3549-3567.

M.A. Do, "New Dual-Sweep Receiver for CTFM Sonar," Ultrasonics 1986, vol. 24, July, pp. 179-182.

\* cited by examiner

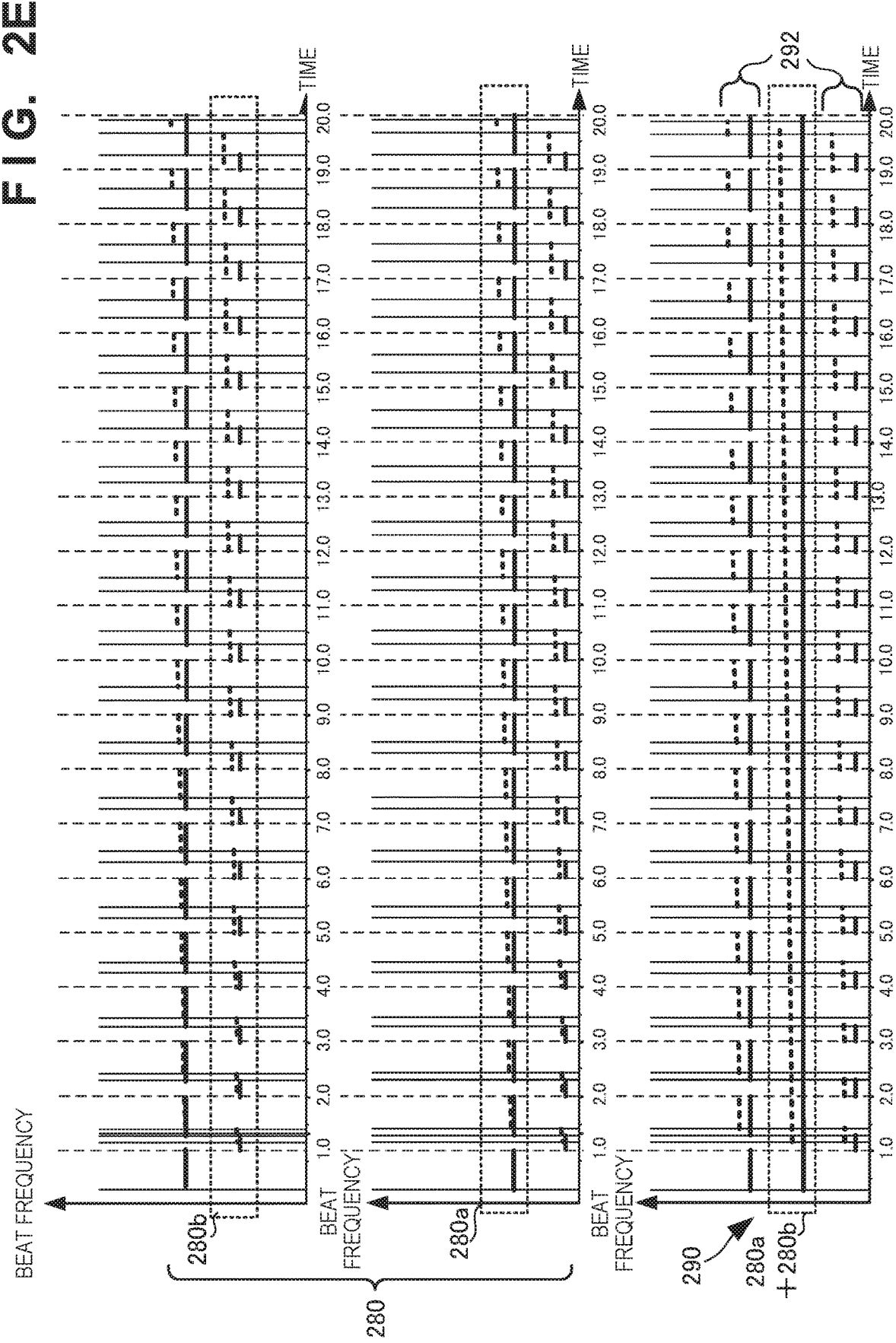

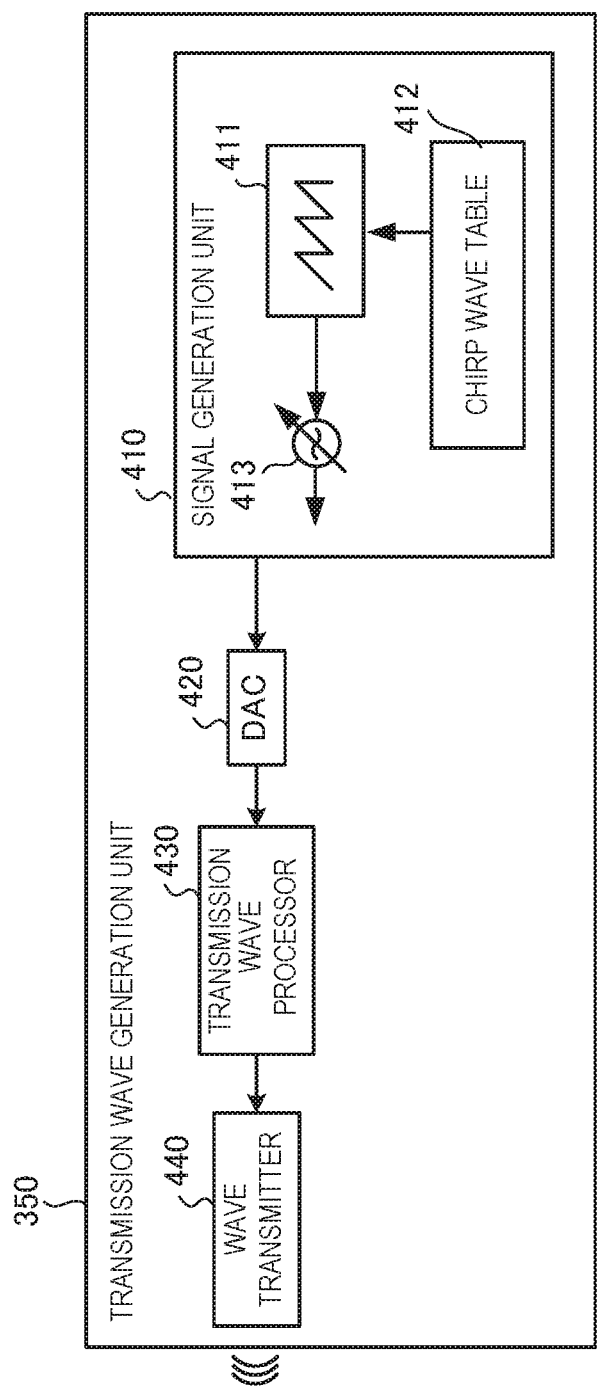

| 421 USE WAVE | 422 WAVE TYPE | 423 FREQUENCY BAND | | 424 CYCLE |
| --- | --- | --- | --- | --- |
| | | LOW FREQUENCY | HIGH FREQUENCY | |
| × | UP CHIRP WAVE | f1 | f2 (>f1) | T1 |
| ○ | DOWN CHIRP WAVE | f3 | f4 (>f3) | T2 |
| ... | | | | |

| SIGNAL TYPE | USE CHIRP WAVE | | | FREQUENCY BAND | | CYCLE |
|---|---|---|---|---|---|---|
| | UP/DOWN | FREQUENCY BAND | CYCLE | LOW FREQUENCY | HIGH FREQUENCY | |
| DOWN DUAL-SWEEP SIGNAL (LOW-FREQUENCY SIDE) | DOWN | f3<f<f4 | T2 | f3−2×(f4−f3) | f3−(f4−f3) | T2 |
| DOWN DUAL-SWEEP SIGNAL (HIGH-FREQUENCY SIDE) | | | | f3−(f4−f3) | f3 | T2 |
| ... | | | | | | ... |

501 502 503 504 521

| 601 FILTER TYPE | 602 USE CHIRP WAVE | | 603 USE DUAL-SWEEP SIGNAL | | 604 FILTER FREQUENCY BAND | |
| --- | --- | --- | --- | --- | --- | --- |
| | UP/DOWN | FREQUENCY BAND | UP/DOWN | FREQUENCY BAND | LOW FREQUENCY | HIGH FREQUENCY |
| FOR UNNECESSARY SIGNAL REMOVAL | | | | | | |
| ... | | | | | | |

FIG. 6B

| FILTER TYPE | USE CHIRP WAVE 1502 | | USE DUAL-SWEEP SIGNAL 1503 | | FILTER FREQUENCY BAND 1504 | |
|---|---|---|---|---|---|---|
| | UP/DOWN | FREQUENCY BAND | UP/DOWN | FREQUENCY BAND | LOW FREQUENCY | HIGH FREQUENCY |
| FOR UP UNNECESSARY SIGNAL REMOVAL (1541) | UP | | UP/DOWN | | | |
| | DOWN | | | | | |
| | UP | | UP | | | |
| | DOWN | | | | | |
| FOR DOWN UNNECESSARY SIGNAL REMOVAL (1571) | UP | | DOWN | | | |
| | DOWN | | | | | |
| | UP | | DOWN | | | |
| | DOWN | | | | | |

F I G. 15B

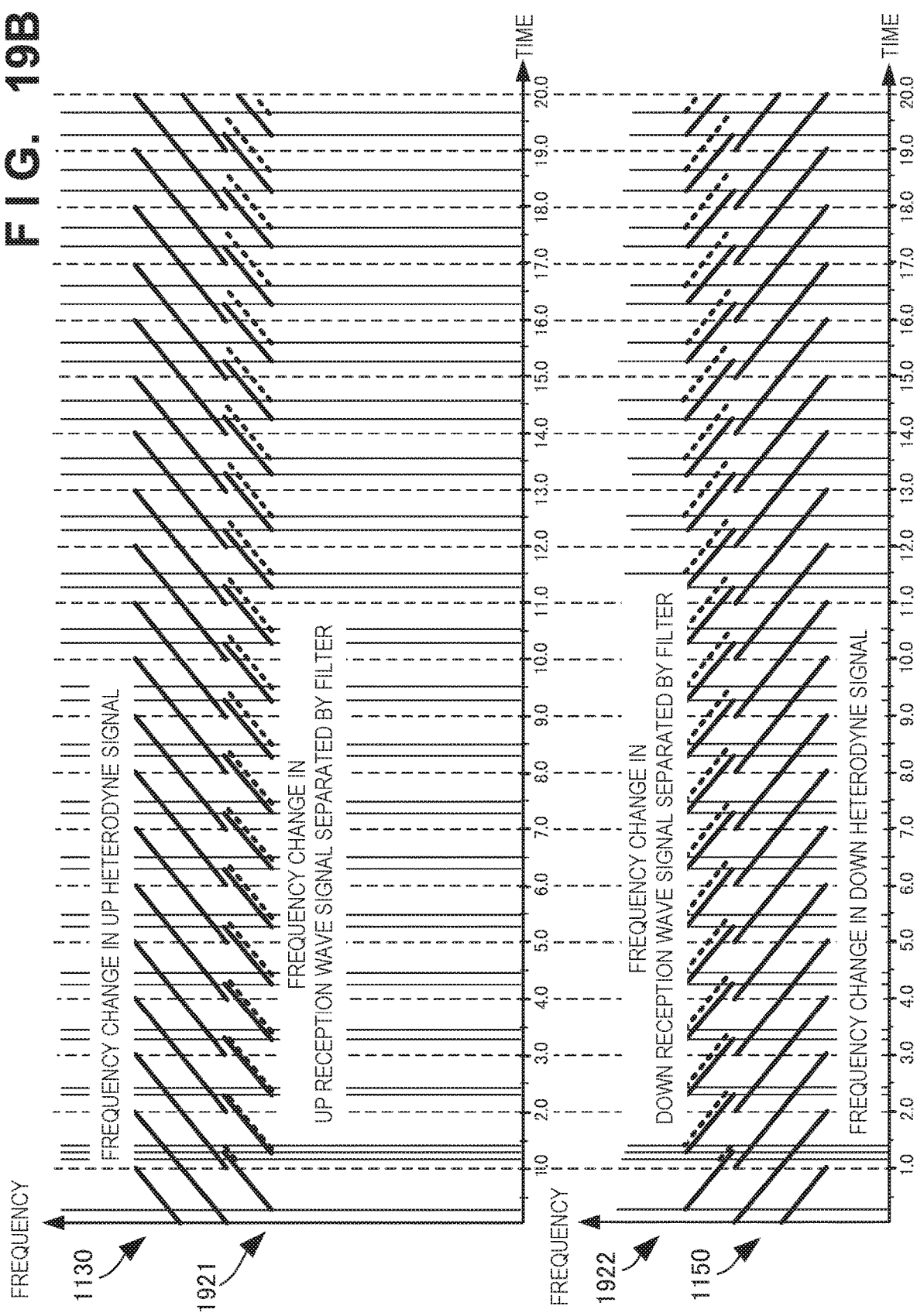

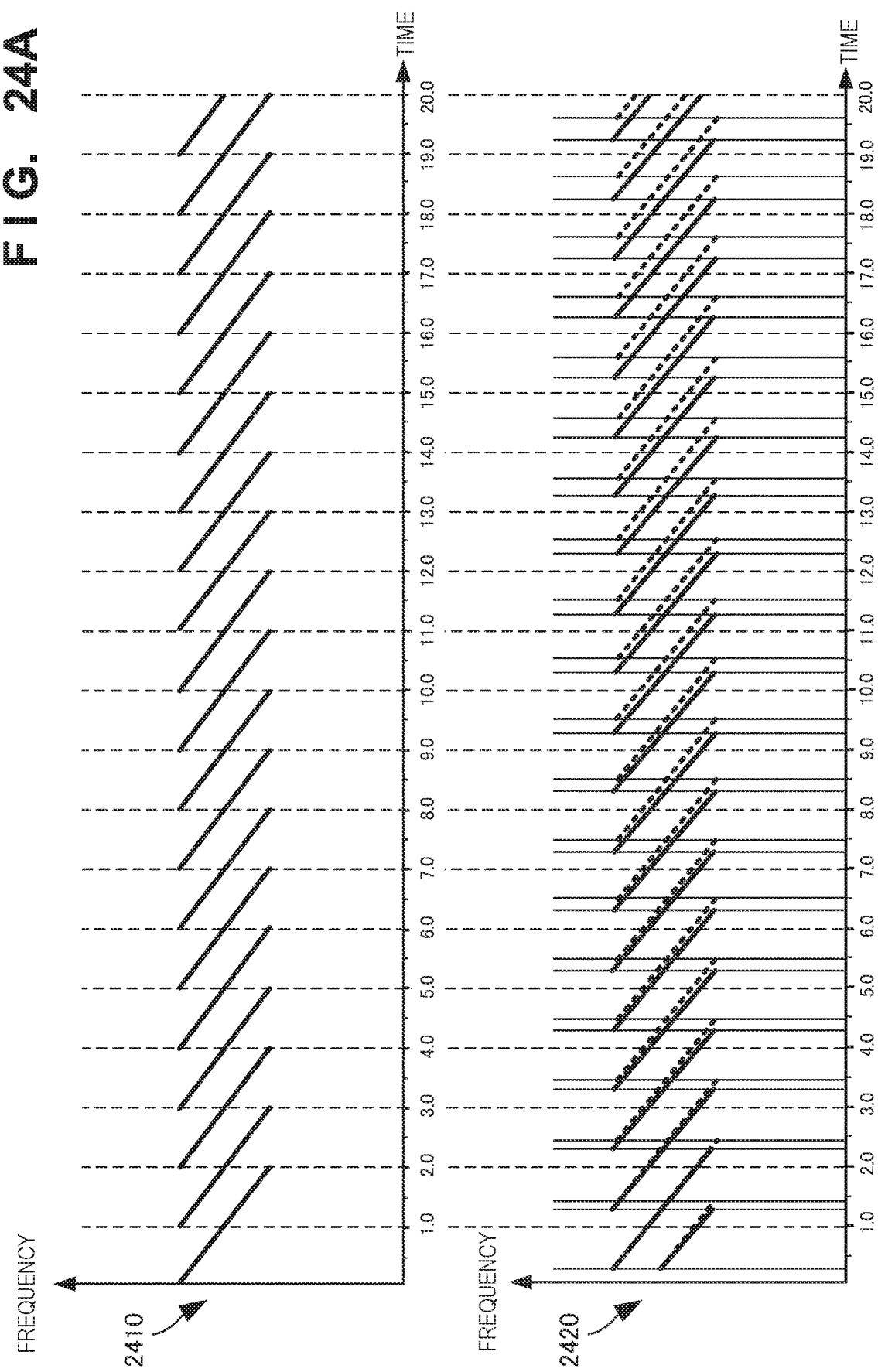

F I G. 25B

| USE WAVE | WAVE TYPE | FREQUENCY BAND | | CYCLE |
|---|---|---|---|---|
| | | LOW FREQUENCY | HIGH FREQUENCY | |
| × | UP CHIRP WAVE | f5 | f6 (>f5) | T4 |
| ○ | DOWN CHIRP WAVE | f7 (=f6) | f8 (=f7+(f6−f5)) | T4 |
| ... | | | | |

2521  2522  2523  2524

2512 ns)TARGET EXTRACTION SYSTEM, TARGET
EXTRACTION METHOD, INFORMATION
PROCESSING APPARATUS, AND CONTROL
METHOD AND CONTROL PROGRAM OF
INFORMATION PROCESSING APPARATUS

CROSS-REFERENCE TO RELATED
APPLICATIONS

This application is a national stage application of International Application No. PCT/JP2014/084613 entitled "Target Extraction System, Target Extraction Method, Information Processing Apparatus, and Control Method and Control Program of Information Processing Apparatus," filed on Dec. 26, 2014, which claims the benefit of the priority of Japanese Patent Application No. 2014-048144, filed on Mar. 11, 2014, the disclosures of each of which are hereby incorporated by reference in their entirety.

TECHNICAL FIELD

The present invention relates to a target extraction system, a target extraction method, an information processing apparatus, and a control method and control program of the information processing apparatus for extracting a target based on the reflected wave of a transmitted chirp wave.

BACKGROUND ART

In the above technical field, patent literatures 1 and 2 disclose techniques of obtaining the distance to a target based on the frequency difference between a transmitted chirp wave and a chirp wave reflected from the target. Furthermore, patent literature 3 and non-patent literatures 1 and 2 disclose techniques in which a dual-sweep signal that sweeps a frequency band twice the frequency band of a transmitted chirp wave in two cycles of the transmitted chirp wave is used as a heterodyne signal, and the reception wave signal of a chirp wave reflected from a target is multiplied by the heterodyne signal, thereby generating a beat frequency as the frequency difference between the heterodyne signal and the reception wave signal by performing heterodyne processing once regardless of a delay in the reception wave signal of the chirp wave.

CITATION LIST

Patent Literature

Patent literature 1: Japanese Patent Publication No. 59-44593
Patent literature 2: Japanese Patent Laid-Open No. 63-208779
Patent literature 3: U.S. Pat. No. 7,149,148 B2

Non-Patent Literature

Non-patent literature 1: M.A. Do, "New dual-sweep receiver for CTFM sonar," Ultrasonics 1986 Vol. 24 July
Non-patent literature 2: Yang Wang and Jun Yang, "Continuous Transmission Frequency Modulation Detection under Variable Sonar-Target Speed Conditions," Sensors 2013, Mar. 13, 3549-3567

SUMMARY OF THE INVENTION

Technical Problem

In the techniques described in the above literatures, however, a beat frequency necessary for target extraction, target speed estimation, and Doppler influence detection may overlap unnecessary frequencies in a heterodyne processing result, and thus the target extraction accuracy may be insufficient.

The present invention enables to provide a technique of solving the above-described problem.

Solution to Problem

One aspect of the present invention provides an information processing apparatus comprising:
a wave receiver that receives a reflected wave of a chirp wave reflected from a target, and outputs a reception wave signal;
a dual-sweep signal generator that generates a dual-sweep signal of the chirp wave, having a frequency which does not overlap a frequency band of the chirp wave; and
a heterodyne processor that generates a beat frequency by multiplying the reception wave signal and the dual-sweep signal as a heterodyne signal.

Another aspect of the present invention provides a control method of an information processing apparatus, comprising:
receiving a reflected wave of a chirp wave reflected from a target, and outputting a reception wave signal; and
generating a beat frequency by multiplying the reception wave signal and a dual-sweep signal of the chirp wave as a heterodyne signal, wherein a frequency of the dual-sweep signal does not overlap that of the chirp wave.

Still other aspect of the present invention provides a control program of an information processing apparatus, for causing a computer to execute a method, comprising:
receiving a reflected wave of a chirp wave reflected from a target, and outputting a reception wave signal; and
generating a beat frequency by multiplying the reception wave signal and a dual-sweep signal of the chirp wave as a heterodyne signal, wherein a frequency of the dual-sweep signal does not overlap that of the chirp wave.

Still other aspect of the present invention provides a target extraction system comprising:
a wave transmission apparatus that transmits a chirp wave; and
a wave reception apparatus that receives a reflected wave of the chirp wave reflected from a target, and extracts the target,
said wave reception apparatus comprising:
a wave receiver that receives the reflected wave, and outputs a reception wave signal; and
a heterodyne processor that generates a beat frequency by multiplying the reception wave signal and a dual-sweep signal of the chirp wave as a heterodyne signal, wherein a frequency of the dual-sweep signal does not overlap that of the chirp wave.

Still other aspect of the present invention provides a target extraction method comprising:
transmitting a chirp wave; and
extracting a target based on a frequency spectrum of a beat frequency generated by multiplying a reception wave signal obtained from a reflected wave of the chirp wave reflected from the target and a dual-sweep signal of the chirp wave as a heterodyne signal, wherein a frequency of the dual-sweep signal does not overlap that of the chirp wave.

Advantageous Effects of Invention

According to the present invention, it is possible to improve the target extraction accuracy.

BRIEF DESCRIPTION OF DRAWINGS

FIG. 2C shows timing charts showing the heterodyne processing result of the reception wave signal and a dual-sweep signal according to a technical premise;

FIG. 2E shows timing charts showing beat frequency changes in heterodyne processing results in the information processing apparatus according to the second embodiment of the present invention;

FIG. 4A is a block diagram showing the functional arrangement of a transmission wave generation unit according to the second embodiment of the present invention;

FIG. 4B is a table showing the structure of a chirp wave table according to the second embodiment of the present invention;

FIG. 5B is a table showing the structure of a dual-sweep signal table according to the second embodiment of the present invention;

FIG. 6B is a table showing the structure of a filter parameter table according to the second embodiment of the present invention;

FIG. 15B is a table showing the structure of filter parameter table according to the third embodiment of the present invention;

FIG. 19B shows timing charts respectively showing frequency changes in a separated up reception wave signal and an up heterodyne signal, and those in a separated down reception wave signal and a down heterodyne signal according to the fourth embodiment of the present invention;

FIG. 24A shows timing charts respectively showing a frequency change in a transmission wave signal and that in a reception wave signal in a target extraction system including an information processing apparatus according to the fifth embodiment of the present invention;

FIG. 25B is a table showing the structure of a chirp wave table according to the fifth embodiment of the present invention;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise. Note that a "chirp wave" used in this specification indicates a wave whose frequency linearly changes. A wave whose frequency linearly rises will be referred to as an "up chirp wave" hereinafter, and a wave whose frequency linearly lowers will be referred to as a "down chirp wave" hereinafter. A wave obtained by repeating an up chirp wave and a down chirp wave is distinguished from a wave obtained by repeating only an up chirp wave or down chirp wave, and will be referred to as a "serrated chirp wave" hereinafter. A "dual-sweep signal" indicates a signal that linearly changes in a frequency band twice a frequency change in a chirp wave in a cycle twice the cycle of the chirp wave.

In this specification, a signal whose frequency linearly rises will be referred to as an "up dual-sweep signal" hereinafter, and a wave whose frequency linearly lowers will be referred to as a "down dual-sweep signal" hereinafter. Furthermore, a "beat frequency" indicates the frequency of a combined wave whose amplitude slowly, periodically changes when two waves with slightly different frequencies interfere with each other. In this example, the "beat frequency" corresponds to a frequency difference as a calculation result obtained by performing heterodyne processing of integrating a reception wave signal corresponding to a received chirp wave and a heterodyne signal corresponding to a transmitted chirp wave. The "heterodyne signal" includes a "dual-sweep signal".

First Embodiment

An information processing apparatus 100 according to the first embodiment of the present invention will be described with reference to FIG. 1.

The information processing apparatus 100 is an apparatus for extracting a target based on the reflected wave of a transmitted chirp wave.

Figure 1:
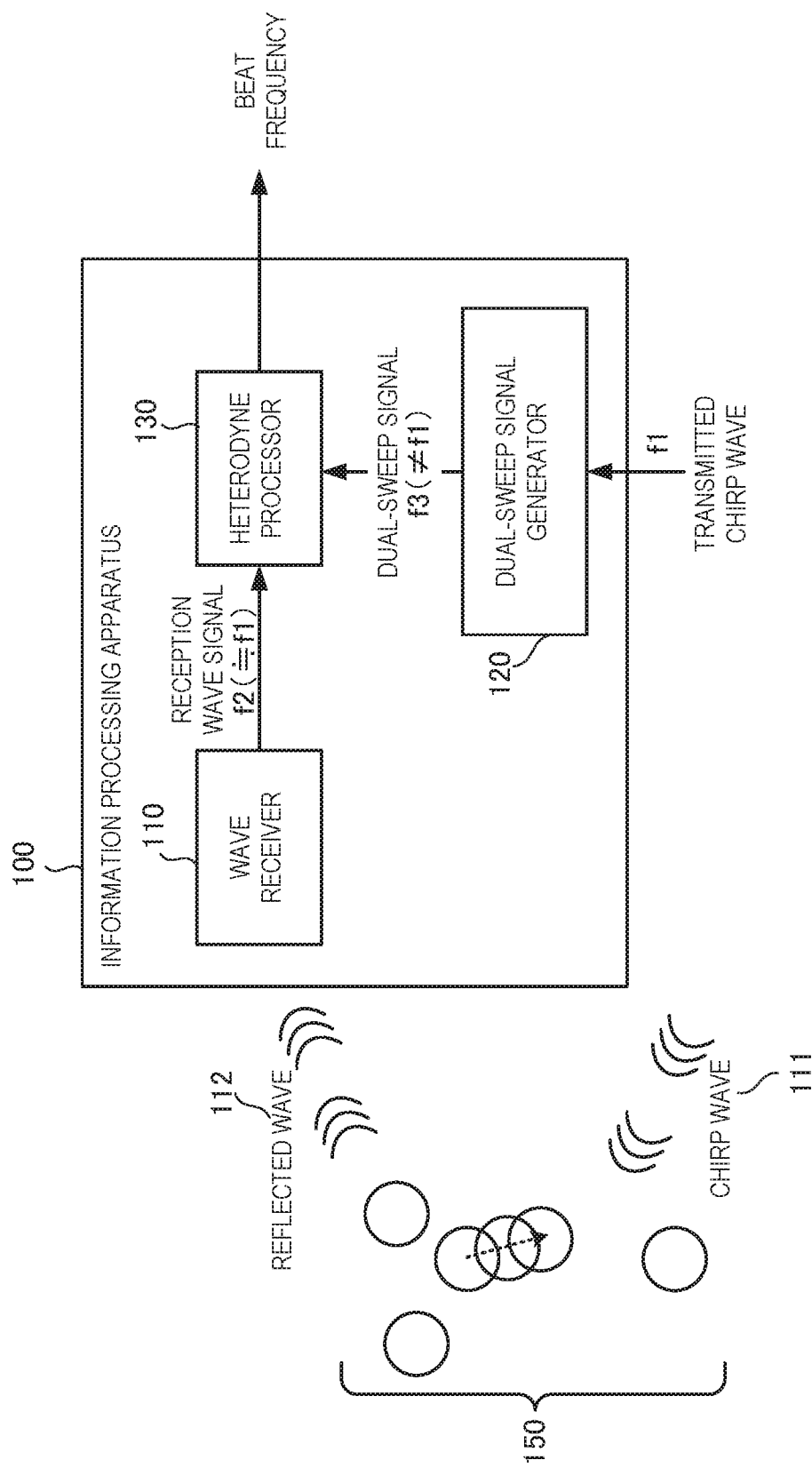
FIG. 1 is a block diagram showing the arrangement of an information processing apparatus according to the first embodiment of the present invention.

As shown in FIG. 1, the information processing apparatus 100 includes a wave receiver 110, a dual-sweep signal generator 120, and a heterodyne processor 130. The wave receiver 110 receives a reflected wave 112 of a chirp wave 111 reflected from a target 150, and outputs a reception wave signal. The dual-sweep signal generator 120 generates the dual-sweep signal of the chirp wave 111, whose frequency does not overlap that of the chirp wave 111. The heterodyne processor 130 generates a beat frequency by multiplying the reception wave signal by the dual-sweep signal as a heterodyne signal.

According to this embodiment, it is possible to improve the target extraction accuracy by preventing a beat frequency necessary for target extraction, target speed estimation, and Doppler influence detection from overlapping unnecessary frequencies in a heterodyne processing result.

Second Embodiment

An information processing apparatus according to the second embodiment of the present invention will be described next. The information processing apparatus according to this embodiment executes generation and display of a beat frequency, extraction of a target, estimation of the speed of a moving target, correction of the Doppler influence, and the like using, as a heterodyne signal, a dual-sweep signal of a frequency band that does not overlap that of a chirp wave transmitted by a wave transmitter.

<<Overview of Processing of Embodiment>>

(Heterodyne Signal)

Figure 2A:
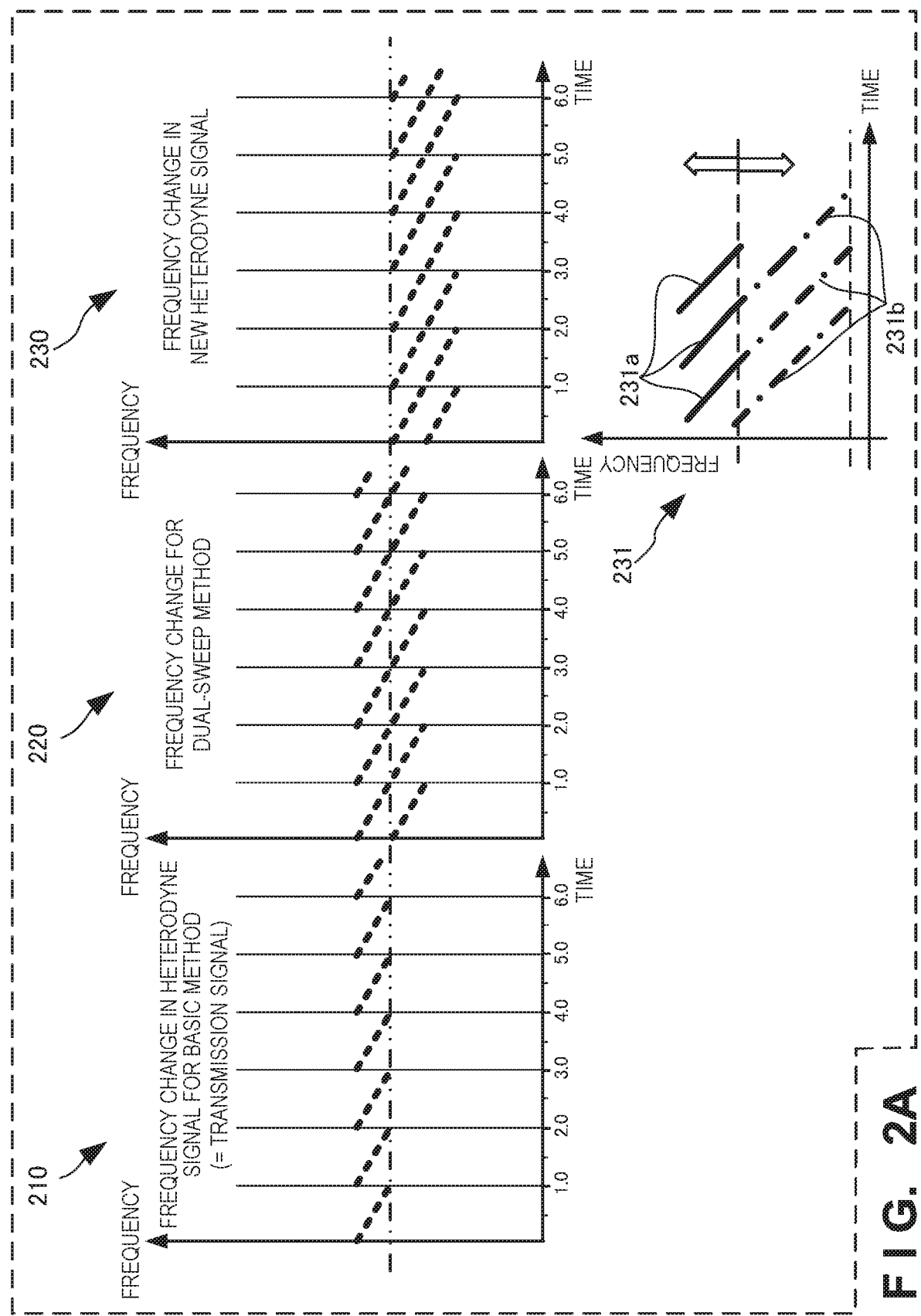
FIG. 2A shows timing charts showing the features of a target extraction method by an information processing apparatus according to the second embodiment of the present invention.

FIG. 2A shows timing charts showing the features of a target extraction method by the information processing apparatus according to this embodiment.

Note that FIG. 2A shows frequency changes in a transmission wave and a heterodyne signal to clarify the differences. In the following timing charts respectively showing signals, the signal is illustrated as a frequency change. This embodiment will explain a case in which a center frequency is 40 kHz and a sampling frequency is 160 kHz. The present invention, however, is not limited to this.

Referring to FIG. 2A, a heterodyne signal 210 for a basic method is the same as a frequency change in a chirp wave, and is a heterodyne signal used in patent literatures 1 and 2. A dual-sweep signal 220 as a heterodyne signal for a dual-sweep method is a frequency change in a frequency band twice the frequency band of the chirp wave in a cycle twice the cycle of the chirp wave, which is obtained by connecting two chirp waves, and is a signal whose frequency band overlaps that of the chirp wave used in patent literature 3 and non-patent literatures 1 and 2.

A dual-sweep signal 230 of a new heterodyne signal shown in FIG. 2A is a dual-sweep signal used in this embodiment, and is a signal whose frequency band does not overlap that of the chirp wave. That is, in this embodiment, a heterodyne dual-sweep signal 231*b* is generated so as to satisfy the minimum condition that a frequency band is different from that of a chirp wave 231*a* to be transmitted, and does not overlap that of the chirp wave 231*a*.

(Transmission Wave Signal and Reception Wave Signal)

Figure 2B:
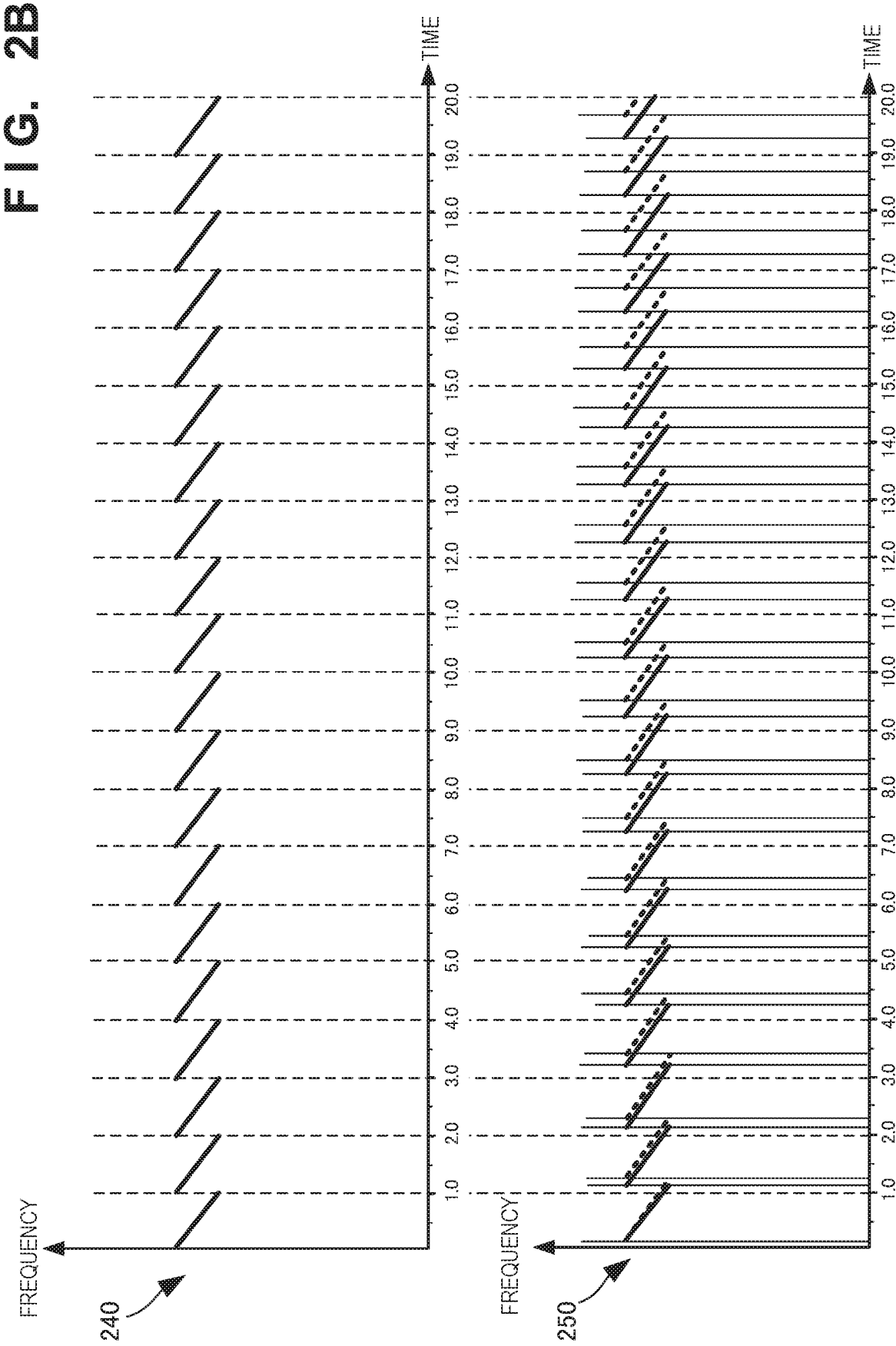
FIG. 2B shows timing charts respectively showing a frequency change in a transmission wave signal and that in a reception wave signal in a target extraction system including the information processing apparatus according to the second embodiment of the present invention.

FIG. 2B shows timing charts respectively showing a frequency change in a transmission wave signal 240 and that in a reception wave signal 250 in a target extraction system including the information processing apparatus according to this embodiment. FIG. 2B shows the transmission wave signal 240 which the chirp wave is based on, and the reception wave signal 250 corresponding to the received chirp wave. In the reception wave signal 250, a solid line indicates the reception wave signal of a still object, and a delay time with respect to the transmission wave signal 240 is constant. On the other hand, in the reception wave signal 250, a broken line indicates the reception wave signal of a moving object, and a delay time with respect to the transmission wave signal 240 changes. FIG. 2B shows a case in which the distance to the moving object is long.

In a reception wave signal and heterodyne result in each timing chart, a solid line corresponds to a still object, and a broken line corresponds to a moving object.

(Heterodyne Processing Result in Technical Premise)

FIG. 2C shows timing charts showing a heterodyne processing result 270 of the reception wave signal 250 and the dual-sweep signal 220 according to a technical premise. The reception wave signal 250 is of the same frequency band as that shown in FIG. 2B.

Referring to FIG. 2C, a dual-sweep signal is generated as the dual-sweep signal 220 by a signal 220*a* that is the same as the transmission wave signal 240 and a signal 220*b* of a frequency band continuing to that of the signal 220*a*, thereby executing heterodyne processing of multiplying the reception wave signal 250 by the generated dual-sweep signal.

In the heterodyne processing result 270, beat frequencies 271 respectively indicating a still object and moving object overlap unnecessary frequencies 272 during a time period 273. Consequently, visual identification is difficult, and separation cannot be performed by a filter. Therefore, during the time period 273, that is, while the distance to the target falls within a predetermined range, target extraction, distance estimation, and Doppler correction are difficult.

(Reception Wave Signal and Dual-Sweep Signal of Embodiment)

Figure 2D:
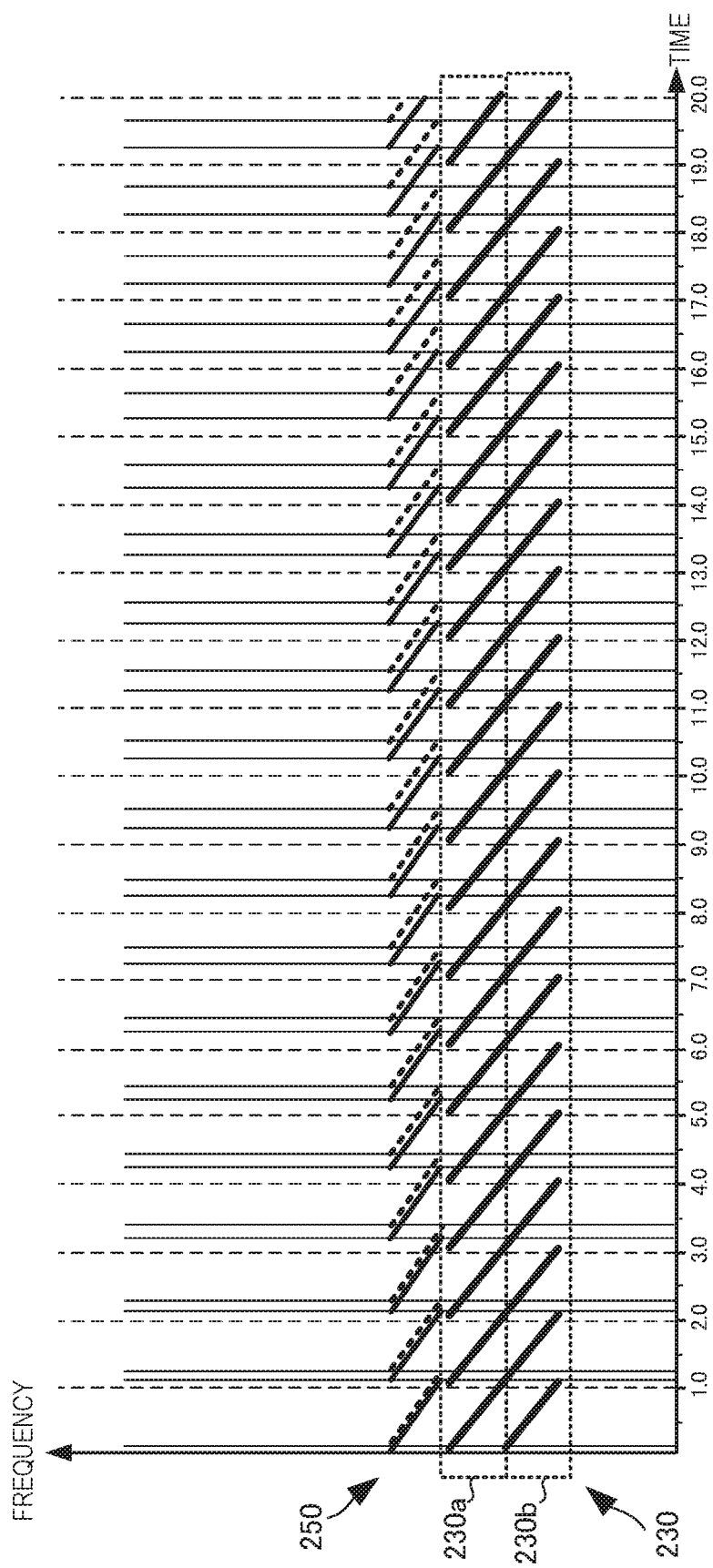
FIG. 2D is a timing chart showing frequency changes in the reception wave signal and dual-sweep signal according to the second embodiment of the present invention.

FIG. 2D is a timing chart showing frequency changes in the reception wave signal 250 and the dual-sweep signal 230 according to this embodiment. The reception wave signal 250 is of the same frequency band as that shown in FIGS. 2B and 2C.

Referring to FIG. 2D, a dual-sweep signal is generated as the dual-sweep signal 230 by a signal 230*a* and a signal 230*b* of a frequency band continuing to that of the signal 230*a*, whose frequency bands do not overlap that of the transmission wave signal 240, thereby executing heterodyne processing of multiplying the reception wave signal 250 by the generated dual-sweep signal.

(Heterodyne Processing Result in Embodiment)

FIG. 2E shows timing charts showing beat frequency changes in the heterodyne processing results in the information processing apparatus according to this embodiment.

In a heterodyne processing result 280 based on the dual-sweep signal 230 in FIG. 2D, a heterodyne processing result based on the signal 230*a* is a target beat frequency 280*a*. A heterodyne processing result based on the signal 230*b* is a target beat frequency 280*b*. The beat frequencies 280*a* and 280*b* are connected, resulting in a target heterodyne processing result 290.

The frequency band of the target heterodyne processing result 290 does not overlap unnecessary frequencies 292. Thus, visual identification is easy, and separation can be readily performed by a filter. Therefore, target extraction, distance estimation, and Doppler correction are possible regardless of the distance to the target.

<<Functional Arrangement of Target Extraction System Including Information Processing Apparatus>>

Figure 3:
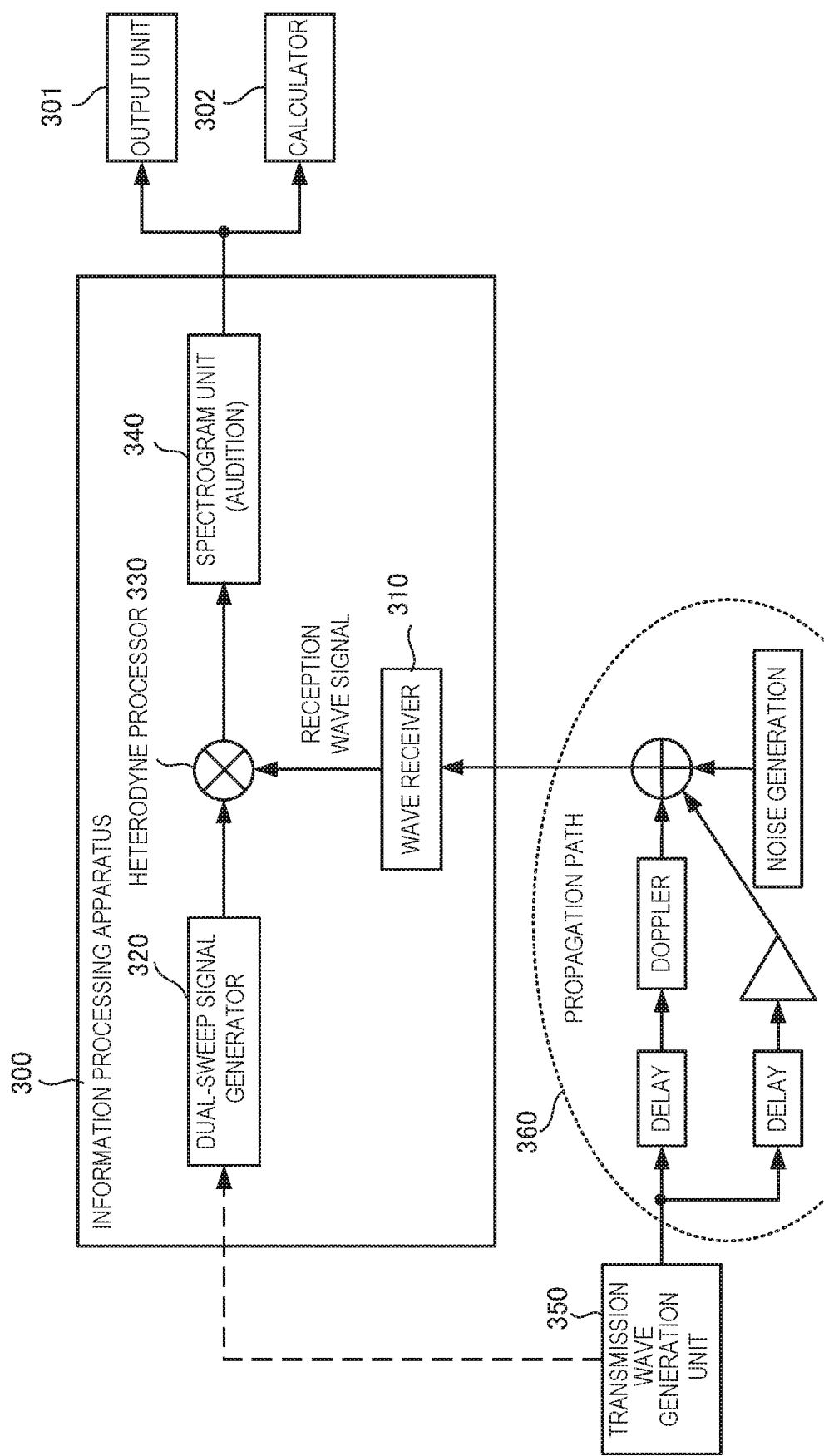
FIG. 3 is a block diagram showing the functional arrangement of the target extraction system including the information processing apparatus according to the second embodiment of the present invention.

FIG. 3 is a block diagram showing the functional arrangement of the target extraction system including an information processing apparatus 300 according to this embodiment.

A transmission wave generation unit 350 generates a chirp wave of a predetermined frequency band and a predetermined cycle, and transmits it. The chirp wave transmitted from the transmission wave generation unit 350 propagates through a propagation path 360, is reflected from the target, and is detected by a wave receiver 310 of the information processing apparatus 300. The propagation path 360 is the sea or the water such as a body but is not limited to this. Note that in FIG. 3, the propagation path 360 is modeled by delays, the Doppler effect, noise generation, and the like. This is merely an example, and the present invention is not limited to this.

The information processing apparatus 300 includes the wave receiver 310, a dual-sweep signal generator 320, a heterodyne processor 330, and a spectrogram unit 340. The wave receiver 310 receives an acoustic wave which has propagated through the propagation path 360 and reached the wave receiver 310, and includes the chirp wave from the transmission wave generation unit 350.

The dual-sweep signal generator 320 generates, as a heterodyne signal, a dual-sweep signal whose frequency band does not overlap that of the chirp wave transmitted by the transmission wave generation unit 350 and is twice the frequency band of the transmission wave signal. Note that FIG. 3 shows an example in which the dual-sweep signal generator 320 acquires the frequency band and cycle of the chirp wave transmitted from the transmission wave generation unit 350. However, if the frequency band and cycle of the chirp wave transmitted from the transmission wave generation unit 350 are already known, a dual-sweep signal can be generated without acquiring the frequency band and cycle of the chirp wave.

The heterodyne processor 330 multiplies a reception wave signal output from the wave receiver 310 by the dual-sweep signal whose frequency band does not overlap that of the reception wave signal, thereby generating a beat frequency as the frequency difference between the reception wave signal and the dual-sweep signal. The spectrogram unit 340 generates, as a processing result of the heterodyne processor 330, a spectrogram (to be referred to as a spectrogram of the beat frequency hereinafter) from a frequency change obtained by replacing a frequency along the ordinate by the beat frequency, thereby facilitating identification of a reflected sound from the target in the reception wave signal.

Note that an output from the spectrogram unit 340 undergoes spectrogram display by an output unit 301, and is used by a calculator 302 for calculation of the distance to the target, estimation of a target speed, correction of the Doppler influence, and the like. The output unit 301 and the calculator 302 may be included in the information processing apparatus 300.

(Functional Arrangement of Transmission Wave Generation Unit)

FIG. 4A is a block diagram showing the functional arrangement of the transmission wave generation unit 350 according to this embodiment. The functional arrangement of the transmission wave generation unit 350 shown in FIG. 4A is merely an example, and the present invention is not limited to this as long as a chirp wave is output according to this embodiment.

The transmission wave generation unit 350 includes a signal generation unit 410, a digital-to-analog converter (DAC in FIG. 4A) 420, a transmission wave processor 430, and a wave transmitter 440. The signal generation unit 410 includes a signal generator 411 that generates a signal for generating a chirp wave, a chirp wave table 412 that stores the frequency band and cycle of the chirp wave generated by the signal generator 411, and an oscillator 413 that generates a chirp wave based on the signal from the signal generator 411.

The digital-to-analog converter 420 converts the chirp wave generated by the signal generation unit 410 into an analog signal. The transmission wave processor 430 performs processing of, for example, amplifying the analog signal of the chirp wave. The wave transmitter 440 transmits, to the propagation path 360, the chirp wave according to the signal of the transmission wave processor 430.

Note that FIG. 4A shows the arrangement in which the frequency band and cycle of a chirp wave to be transmitted can be freely set. If the chirp wave is fixed, the chirp wave table 412 is not necessary.

FIG. 4B is a table showing the structure of the chirp wave table 412 according to this embodiment. The chirp wave table 412 is used to set the frequency band and cycle of a chirp wave generated by the signal generator 411.

The chirp wave table 412 stores a wave type 422 and a frequency band 423 and cycle 424 of the wave in association with a use wave flag 421 indicating a chirp wave to be used. Referring to FIG. 4B, in the use wave flag 421, o indicates a use wave and x indicates a disuse wave. The wave type 422 includes an up chirp wave whose frequency linearly rises, a down chirp wave whose frequency linearly lowers, and a serrated chirp wave obtained by alternately repeating an up chirp wave and a down chirp wave.

In FIG. 4B, the down chirp wave shown in FIGS. 2A to 2E is selected as a use wave.

(Functional Arrangement of Dual-Sweep Signal Generator)

Figure 5A:
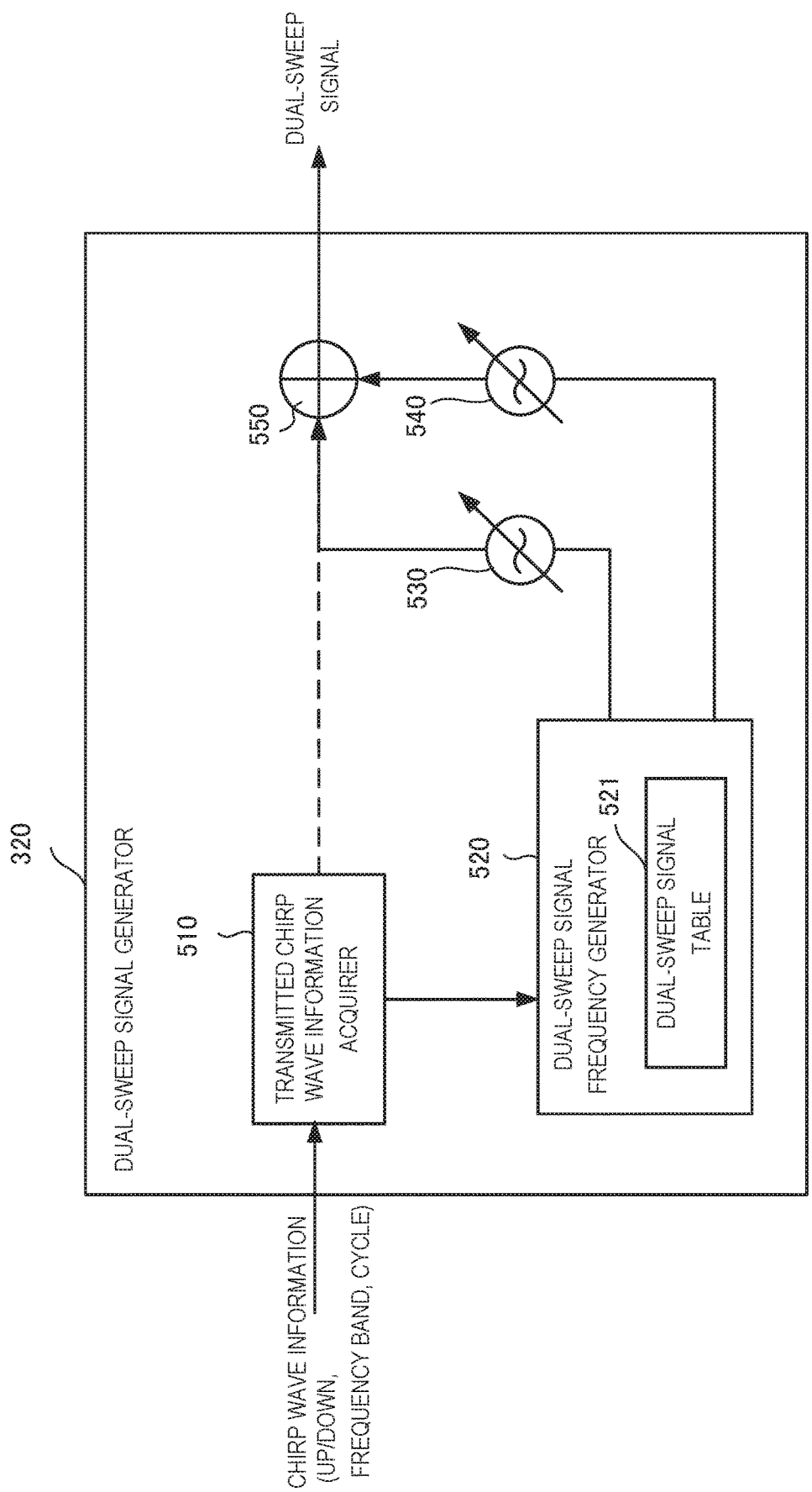
FIG. 5A is a block diagram showing the functional arrangement of a dual-sweep signal generator according to the second embodiment of the present invention.

FIG. 5A is a block diagram showing the functional arrangement of the dual-sweep signal generator 320 according to this embodiment. The functional arrangement of the dual-sweep signal generator 320 shown in FIG. 5A is merely an example, and the present invention is not limited to this as long as a dual-sweep signal whose frequency band does not overlap that of a chirp wave is output according to this embodiment.

The dual-sweep signal generator 320 includes a transmitted chirp wave information acquirer 510, a dual-sweep signal frequency generator 520, an oscillator 530 on the low-frequency side of a dual-sweep signal, an oscillator 540 on the high-frequency side of the dual-sweep signal, and a signal combiner 550. If a chirp wave to be transmitted changes, the transmitted chirp wave information acquirer 510 acquires the information (up or down, frequency band, and cycle) of the chirp wave to generate a dual-sweep signal. Note that if the chirp wave to be transmitted is known and fixed, the transmitted chirp wave information acquirer 510 is not necessary.

The dual-sweep signal frequency generator 520 includes a dual-sweep signal table 521, and generates, based on the transmitted chirp wave, frequency data of the dual-sweep signal whose frequency band does not overlap that of the chirp wave. In accordance with the output of the dual-sweep signal frequency generator 520, the oscillators 530 and 540 respectively generate signals each of which has the same degree of frequency change as that of the chirp wave and in each of which a frequency change continues without overlapping the frequency band of the transmitted chirp wave. The signal combiner 550 combines the outputs of the oscillators 530 and 540, and outputs a dual-sweep signal whose frequency band does not overlap that of the transmitted chirp wave.

Note that FIG. 5A shows the arrangement in which the frequency band and cycle of the chirp wave to be transmitted can be freely set. However, if the chirp wave is known and fixed, the dual-sweep signal table 521 is not necessary. A broken line from the transmitted chirp wave information acquirer 510 to the signal combiner 550 indicates a case in which a signal corresponding to the transmitted chirp wave is acquired, and used intact.

FIG. 5B is a table showing the structure of the dual-sweep signal table 521 according to this embodiment. The dual-sweep signal table 521 is used to generate a dual-sweep signal corresponding to a transmitted chirp wave.

The dual-sweep signal table 521 stores a frequency band 503 and a cycle 504, which are set based on a signal type 501 and a transmitted use chirp wave 502. The signal type 501 includes a low-frequency side and a high-frequency side for one dual-sweep signal.

The use chirp wave 502 stores the chirp wave information acquired by the transmitted chirp wave information acquirer 510.

In the frequency band 503, a frequency band which does not overlap that of the chirp wave and is close to that of the chirp wave is set based on the transmitted chirp wave information. The frequency bands 503 on the low- and high-frequency sides are continuous. Furthermore, the same cycle as that of the chirp wave is set in the cycle 504.

(Functional Arrangement of Heterodyne Processor)

Figure 6A:
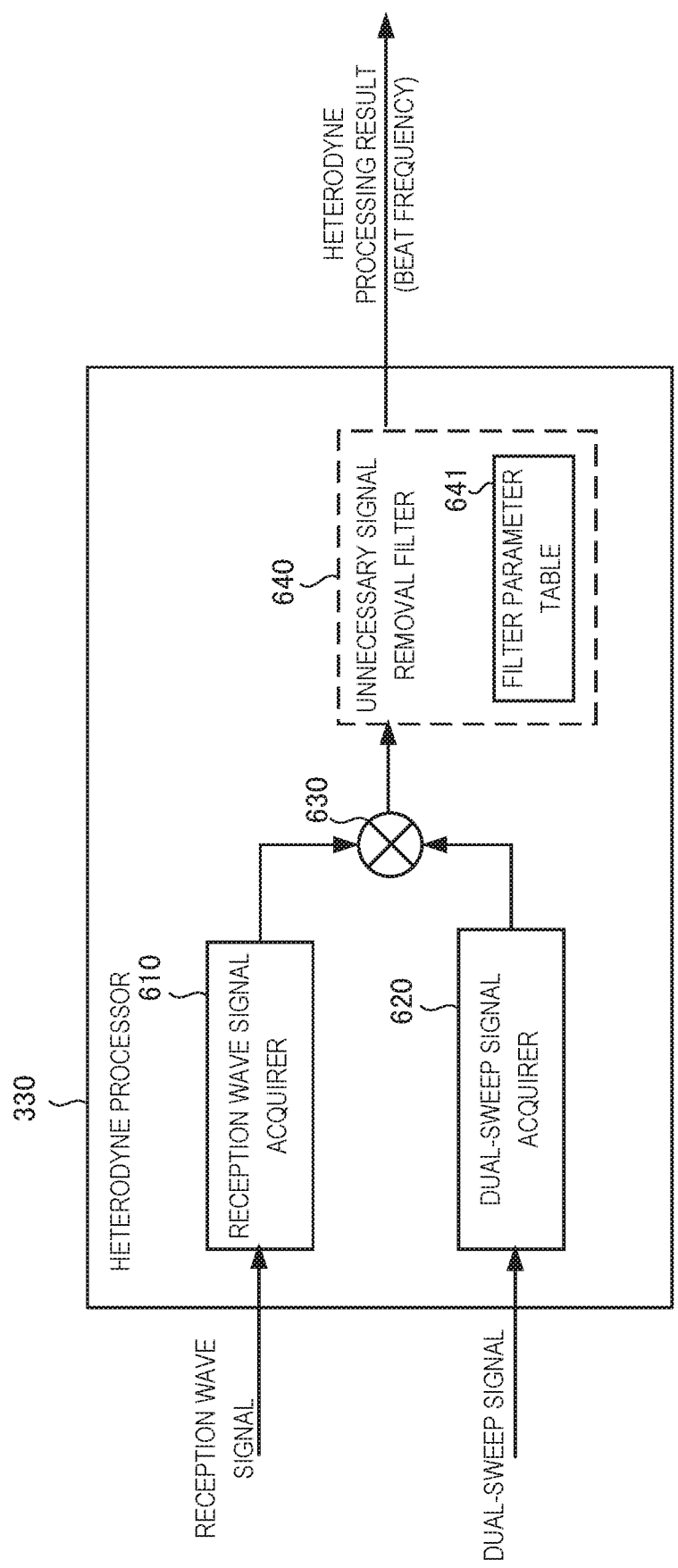
FIG. 6A is a block diagram showing the functional arrangement of a heterodyne processor according to the second embodiment of the present invention.

FIG. 6A is a block diagram showing the functional arrangement of the heterodyne processor 330 according to this embodiment. The functional arrangement of the heterodyne processor 330 shown in FIG. 6A is merely an example, and the present invention is not limited to this as long as multiplication processing of a reception wave signal and a dual-sweep signal is performed according to this embodiment.

The heterodyne processor 330 includes a reception wave signal acquirer 610, a dual-sweep signal acquirer 620, a multiplier 630, and an optional unnecessary signal removal filter 640.

The reception wave signal acquirer 610 acquires the reception wave signal from the wave receiver 310. The dual-sweep signal acquirer 620 acquires the dual-sweep signal from the dual-sweep signal generator 320. The multiplier 630 generates a beat frequency as a difference frequency by multiplying the reception wave signal by the dual-sweep signal.

Based on a filter parameter table 641 predicted based on the chirp wave and the dual-sweep signal, the unnecessary signal removal filter 640 removes frequency components unnecessary for target extraction, which are included in the output of the multiplier 630. Note that if the chirp signal and the dual-sweep signal are known and fixed, the filter parameter table 641 is not necessary.

FIG. 6B is a table showing the structure of the filter parameter table 641 according to this embodiment. The filter parameter table 641 stores filter parameters predicted based on the chirp signal and dual-sweep signal.

The filter parameter table 641 stores a filter frequency band 604 of each filter type 601, which is estimated based on a use chirp wave 602 and a use dual-sweep signal 603. Note that the filter frequency band 604 may store a plurality of frequency bands including unnecessary frequencies.

(Functional Arrangement of Spectrogram Unit)

Figure 7:
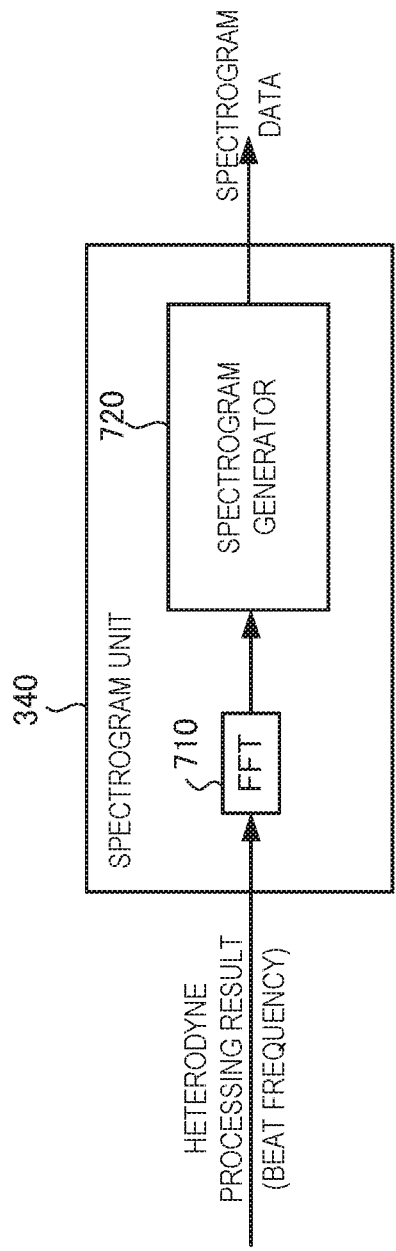
FIG. 7 is a block diagram showing the functional arrangement of a spectrogram unit according to the second embodiment of the present invention.

FIG. 7 is a block diagram showing the functional arrangement of the spectrogram unit 340 according to this embodiment. The functional arrangement of the spectrogram unit 340 shown in FIG. 7 is merely an example, and the present invention is not limited to this as long as a spectrogram of a beat frequency after heterodyne processing is generated according to this embodiment.

The spectrogram unit 340 includes a fast Fourier transformer (FFT: Fast Fourier Transform in FIG. 7) 710 and a spectrogram generator 720. The fast Fourier transformer 710 generates the frequency characteristics of a beat frequency after heterodyne processing. The spectrogram generator 720 generates, for example, a frequency-vs-level spectrogram (not shown) based on the frequency characteristics of the beat frequency.

<<Hardware Arrangement of Information Processing Apparatus>>

Figure 8:
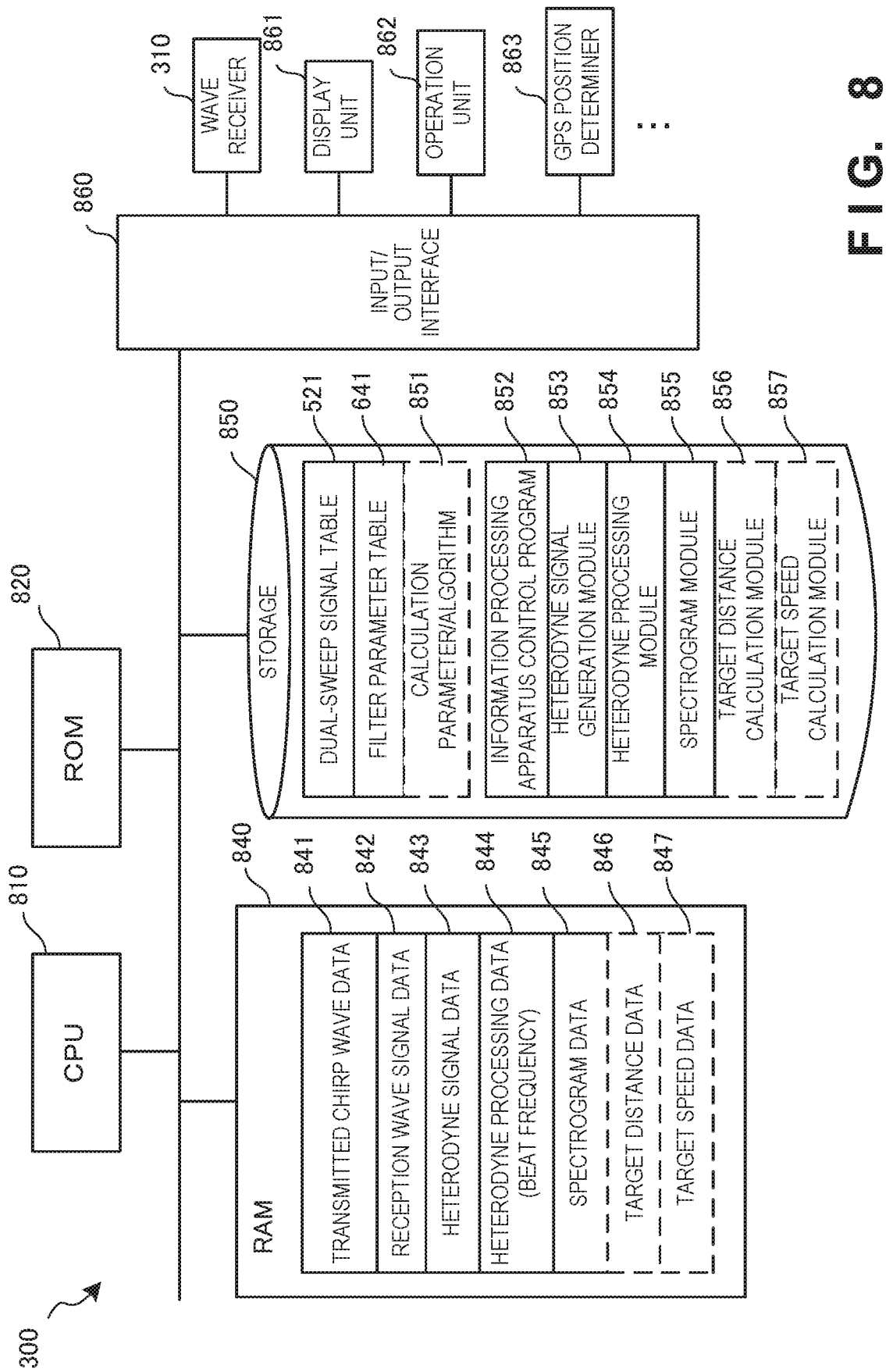
FIG. 8 is a block diagram showing the hardware arrangement of the information processing apparatus according to the second embodiment of the present invention.

FIG. 8 is a block diagram showing the hardware arrangement of the information processing apparatus 300 according to this embodiment.

Referring to FIG. 8, a CPU 810 is an arithmetic control processor, and implements the functions of the functional components of the information processing apparatus 300 shown in FIG. 3 by executing programs and modules stored in a storage 850 using a RAM 840. A ROM 820 stores programs and permanent data such as initial data and programs. Note that the number of CPUs 810 is not limited to one, and a plurality of CPUs or a GPU for image processing may be included.

The RAM 840 is a random access memory used by the CPU 810 as a work area for temporary storage. An area to store data necessary for implementation of the embodiment is allocated to the RAM 840. Transmitted chirp wave data 841 is data of the chirp wave transmitted by the transmission wave generation unit 350, which indicates an up or down chirp wave, frequency band, and cycle. Reception wave signal data 842 is data of the signal received by the wave receiver 310. Heterodyne signal data 843 is data of the dual-sweep signal which has been generated based on the transmitted chirp wave and is used for heterodyne processing. Heterodyne processing data (beat frequency) 844 is data representing the beat frequency of the heterodyne processing result. Spectrogram data 845 is data of the spectrogram processing result of the beat frequency. Target distance data 846 is distance data to the target, which has been calculated based on the spectrogram data 845. Target speed data 847 is data of the moving speed of the target calculated based on the spectrogram data 845.

The storage 850 stores a database and various parameters, or the following data or programs necessary for implementation of the embodiment. The dual-sweep signal table 521 stores data of a frequency change in the dual-sweep signal, as shown in FIG. 5B.

The filter parameter table 641 stores the parameters of the unnecessary signal removal filter, as shown in FIG. 6B. A calculation parameter/algorithm 851 stores parameters and algorithms to be used to optionally calculate a target distance, a target speed, and the like.

The storage 850 stores the following programs. An information processing apparatus control program 852 is a control program for controlling the overall information processing apparatus 300. A heterodyne signal generation module 853 is a module for generating a dual-sweep signal, corresponding to the transmitted chirp wave, whose frequency band does not overlap that of the chirp wave. A heterodyne processing module 854 is a module for performing heterodyne processing using the reception wave signal and the dual-sweep signal.

A spectrogram module 855 is a module for generating a spectrogram of the beat frequency of the heterodyne processing result. A target distance calculation module 856 is a module for calculating the distance to the target based on the spectrogram of the beat frequency. A target speed calculation module 857 is a module for calculating the moving speed of the target based on the spectrogram of the beat frequency.

An input/output interface 860 interfaces input/output data with an input/output device.

The input/output interface 860 is connected to the wave receiver 310, a display unit 861, an operation unit 862 such as a keyboard, touch panel, and pointing device, a GPS position determiner 863, and the like.

Note that programs and data which are associated with the general-purpose functions of the information processing apparatus 300 and other feasible functions are not shown in the RAM 840 or the storage 850 of FIG. 8. Calculation of the target distance and target speed shown in FIG. 8 is optional.

<<Processing Procedure of Information Processing Apparatus>>

Figure 9:
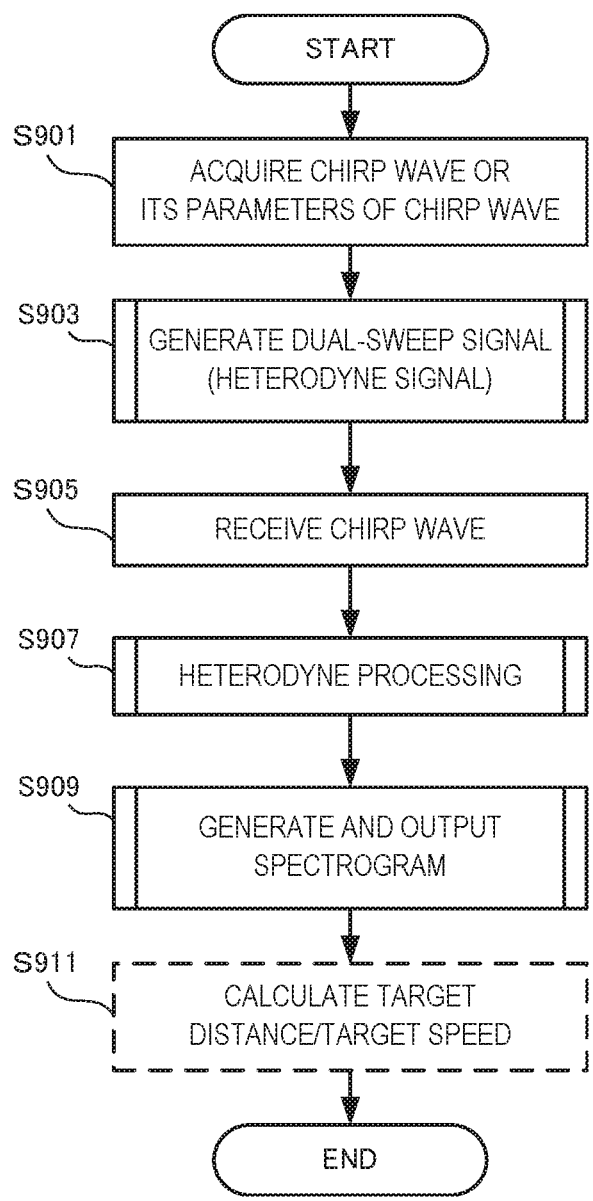
FIG. 9 is a flowchart illustrating the processing procedure of the information processing apparatus according to the second embodiment of the present invention.

FIG. 9 is a flowchart illustrating the processing procedure of the information processing apparatus 300 according to this embodiment. This flowchart is executed by the CPU 810 of FIG. 8 using the RAM 840, thereby implementing the functional components of FIG. 3.

In step S901, the information processing apparatus 300 acquires a transmitted chirp wave or its parameters. Note that if the transmitted chirp wave is known and fixed, step S901 can be skipped. In step S903, the information processing apparatus 300 generates a dual-sweep signal whose frequency band does not overlap that of the chirp wave. In step S905, the information processing apparatus 300 receives the chirp wave transmitted and reflected by the target. In step S907, the information processing apparatus 300 executes heterodyne processing using the received chirp wave and the dual-sweep signal. In step S909, the information processing apparatus 300 generates a spectrogram of a beat frequency of a heterodyne processing result, and outputs it. Note that in step S911, the information processing apparatus 300 optionally calculates a target distance and target speed based on the spectrogram of the beat frequency.

(Dual-Sweep Signal Generation Processing)

Figure 10A:
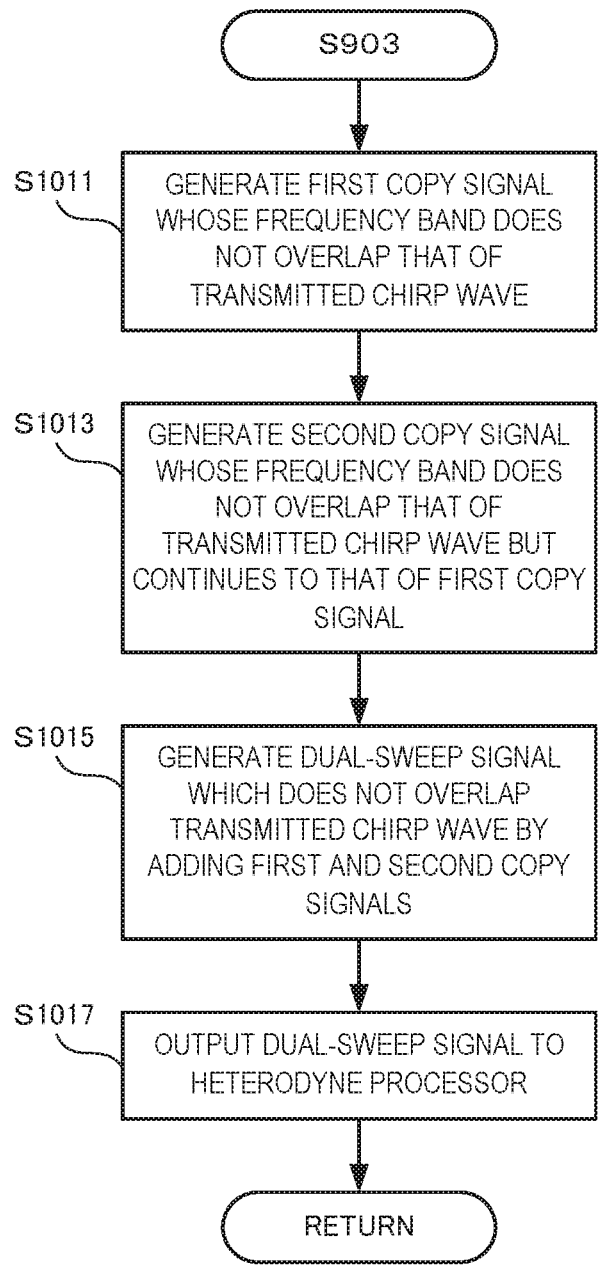
FIG. 10A is a flowchart illustrating the procedure of dual-sweep signal generation processing according to the second embodiment of the present invention.

FIG. 10A is a flowchart illustrating the procedure of the dual-sweep signal generation processing (S903) according to this embodiment.

In step S1011, the information processing apparatus 300 generates the first copy signal whose frequency band does not overlap that of the transmitted chirp wave. Note that the copy signal indicates that it has the same degree of frequency change, as shown in FIGS. 2A to 2E, and does not indicate that it has the same frequency. Assume that the frequency band of the first copy signal is close to the frequency band of the chirp wave. In step S1013, the information processing apparatus 300 generates the second copy signal whose frequency band does not overlap that of the transmitted chirp wave and continues to that of the first copy signal. In step S1015, the information processing apparatus 300 generates a dual-sweep signal whose frequency band does not overlap that of the transmitted chirp wave by adding the first and second copy signals. In step S1017, the information processing apparatus 300 outputs the generated dual-sweep signal to the heterodyne processor 330.

(Heterodyne Processing and Spectrogram Processing)

Figure 10B:
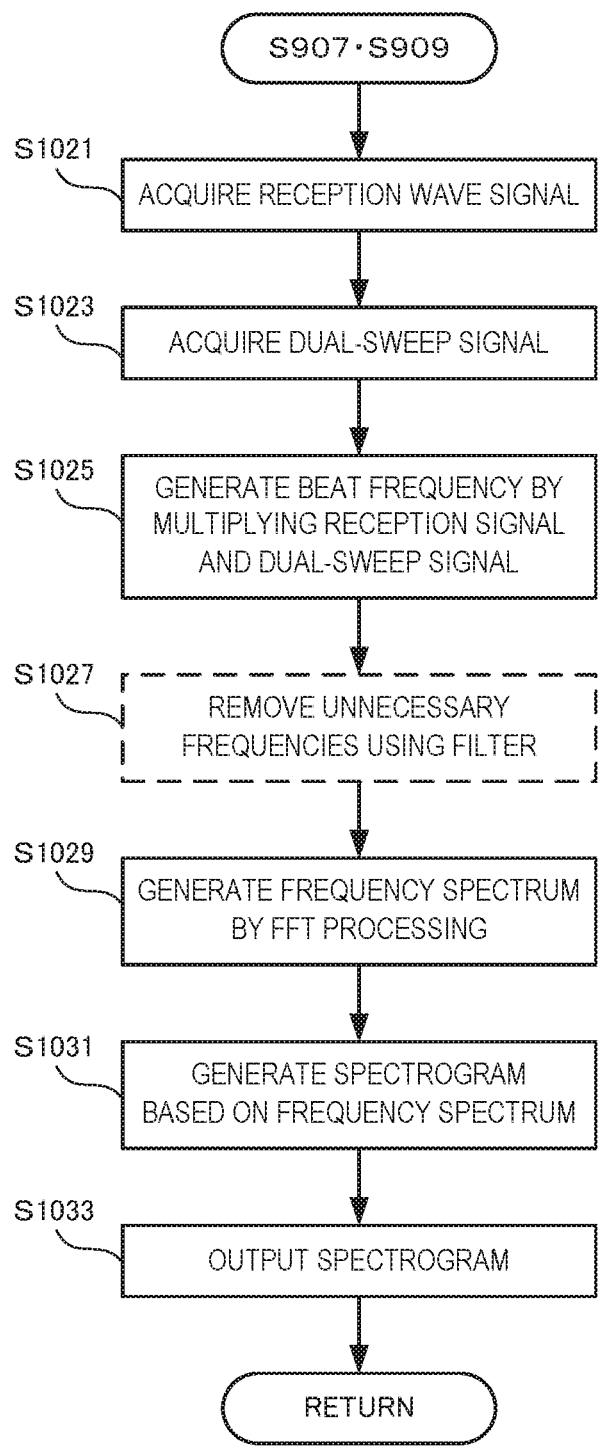
FIG. 10B is a flowchart illustrating the procedure of heterodyne processing and spectrogram processing according to the second embodiment of the present invention.

FIG. 10B is a flowchart illustrating the procedure of the heterodyne processing (S907) and spectrogram processing (S909) according to this embodiment.

In step S1021, the information processing apparatus 300 acquires the reception wave signal. In step S1023, the information processing apparatus 300 acquires the dual-sweep signal.

In step S1025, the information processing apparatus 300 generates a beat frequency by multiplying the reception signal by the dual-sweep signal. Note that in step S1027, the information processing apparatus 300 optionally removes unnecessary frequencies using a filter.

In step S1029, the information processing apparatus 300 performs fast Fourier transform processing for the beat frequency, thereby generating a frequency spectrum. In step S1031, the information processing apparatus 300 generates a spectrogram based on the frequency spectrum.

In step S1033, the information processing apparatus 300 outputs the generated spectrogram.

According to this embodiment, it is possible to separate a signal necessary for target extraction and an unnecessary signal from a heterodyne result, thereby effectively extracting the target.

Third Embodiment

An information processing apparatus according to the third embodiment of the present invention will be described next. The information processing apparatus according to this embodiment is different from that according to the second embodiment in that a plurality of chirp waves are transmitted. The remaining components and operations are the same as those in the second embodiment. Hence, the same reference numerals denote the same components and operations, and a detailed description thereof will be omitted.

<<Overview of Processing of Embodiment>>

(Transmission Wave Signal and Reception Wave Signal)

Figure 11A:
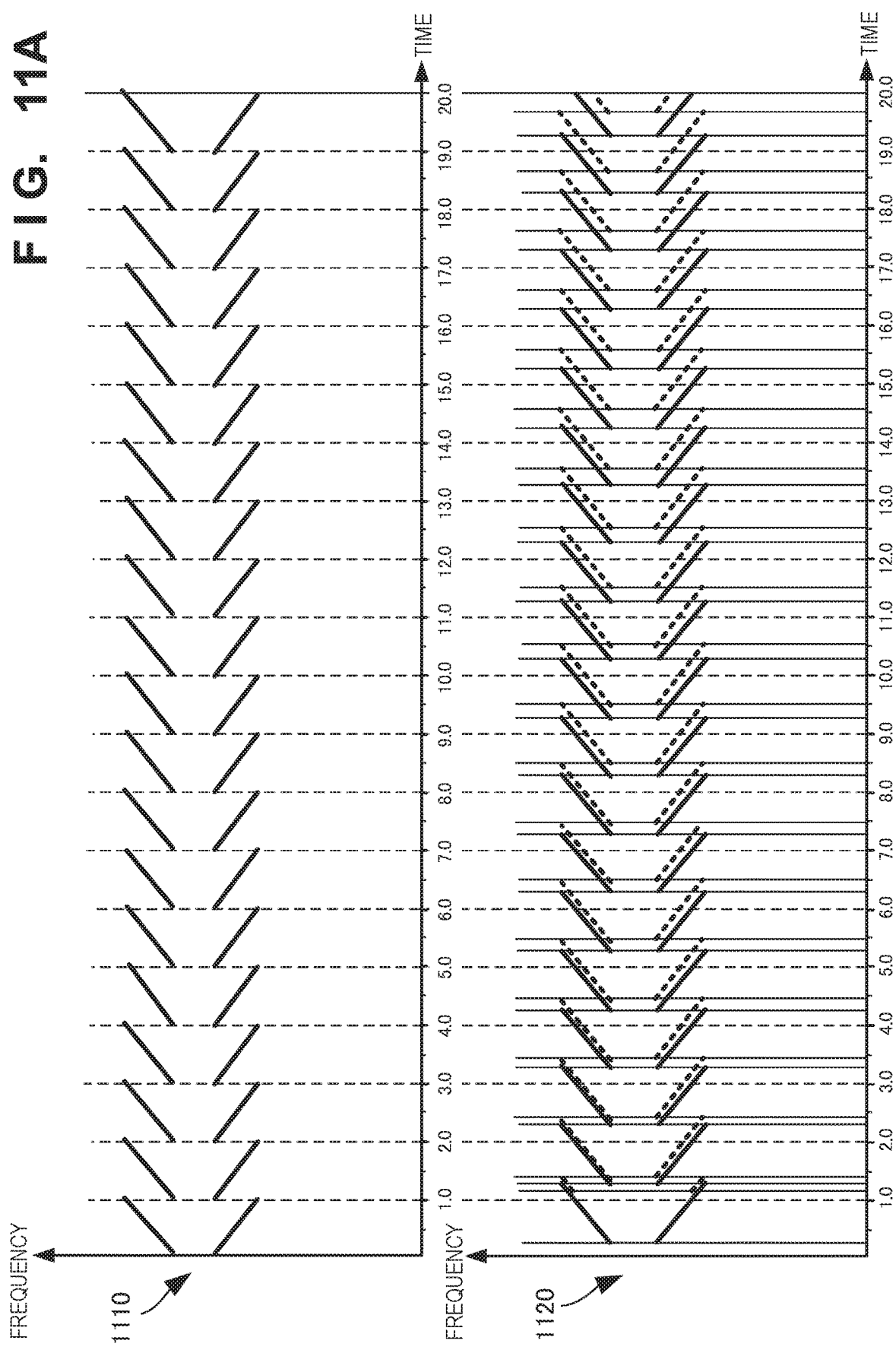
FIG. 11A shows timing charts respectively showing a frequency change in a transmission wave signal and that in a reception wave signal in a target extraction system including an information processing apparatus according to the third embodiment of the present invention.

FIG. 11A shows timing charts respectively showing a frequency change in a transmission wave signal 1110 and that in a reception wave signal 1120 in a target extraction system including the information processing apparatus according to this embodiment.

FIG. 11A shows the transmission wave signal 1110 formed from a plurality of chirp waves whose frequencies change in an inverted "V"-shaped pattern, and its reception wave signal 1120. In the reception wave signal 1120, a solid line indicates the reception wave signal of a still object, and a broken line indicates the reception wave signal of a moving object. FIG. 11A shows a case in which the distance to the moving object becomes longer with time. Note that this embodiment will exemplify the transmission wave signal 1110 formed from the plurality of chirp waves whose frequencies change in an inverted "V"-shaped pattern. However, any transmission wave signal formed from a plurality of chirp waves may be used. For example, a combination of up or down chirp waves or a combination with a serrated chirp wave may be used.

In this embodiment, it is possible to separate a signal necessary for target extraction and an unnecessary signal from a heterodyne result by preventing the frequency band of a heterodyne dual-sweep signal from overlapping those of the plurality of transmitted chirp waves.

(Reception Wave Signal and Up Heterodyne Signal)

Figure 11B:
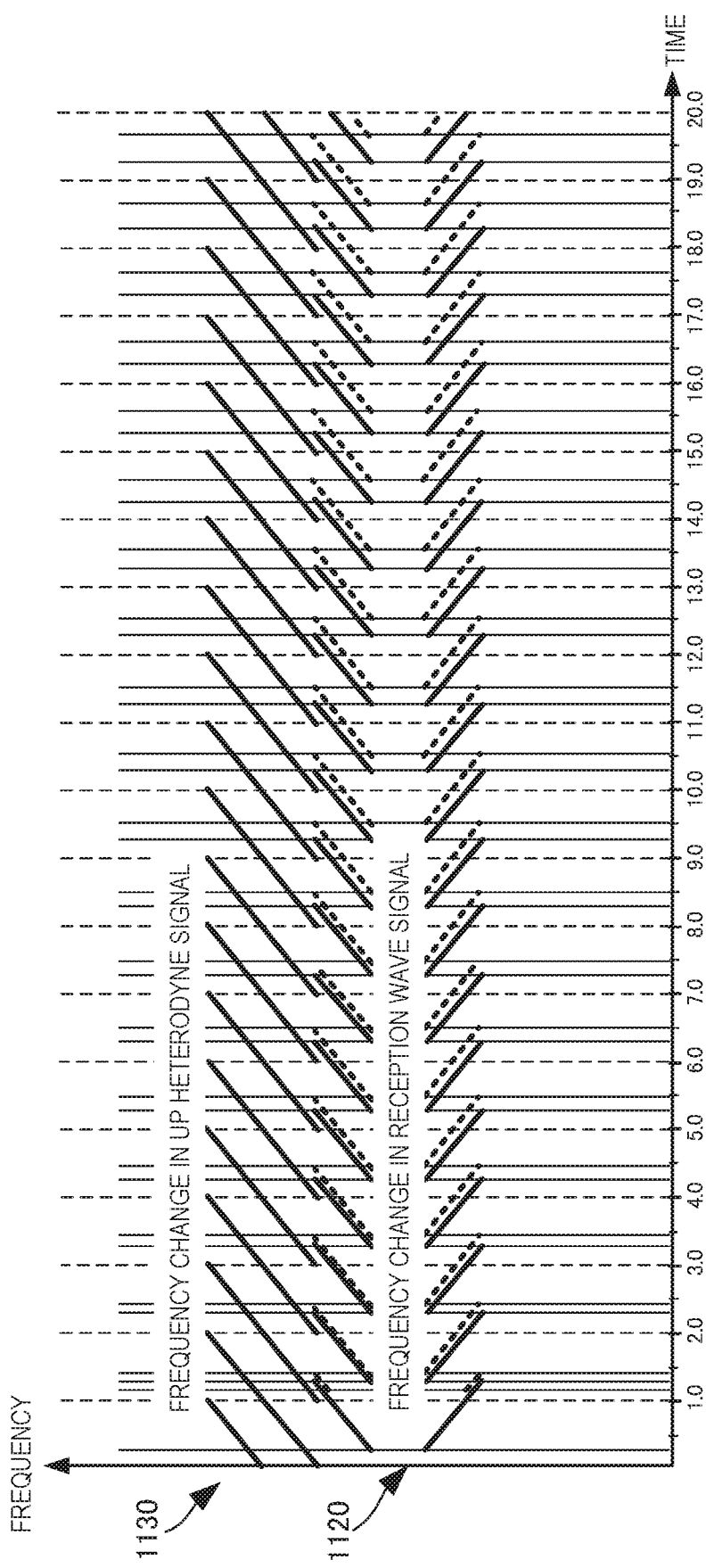
FIG. 11B is a timing chart showing frequency changes in the reception wave signal and an up heterodyne signal according to the third embodiment of the present invention.

FIG. 11B is a timing chart showing frequency changes in the reception wave signal 1120 and an up heterodyne signal 1130 according to this embodiment. Note that the up heterodyne signal 1130 is set in a high-frequency band which does not overlap the frequency band of the reception wave signal 1120 but may be set in a low-frequency band. The frequency band is selected so as to prevent the use band of the frequency from becoming wide as much as possible.

Figure 11C:
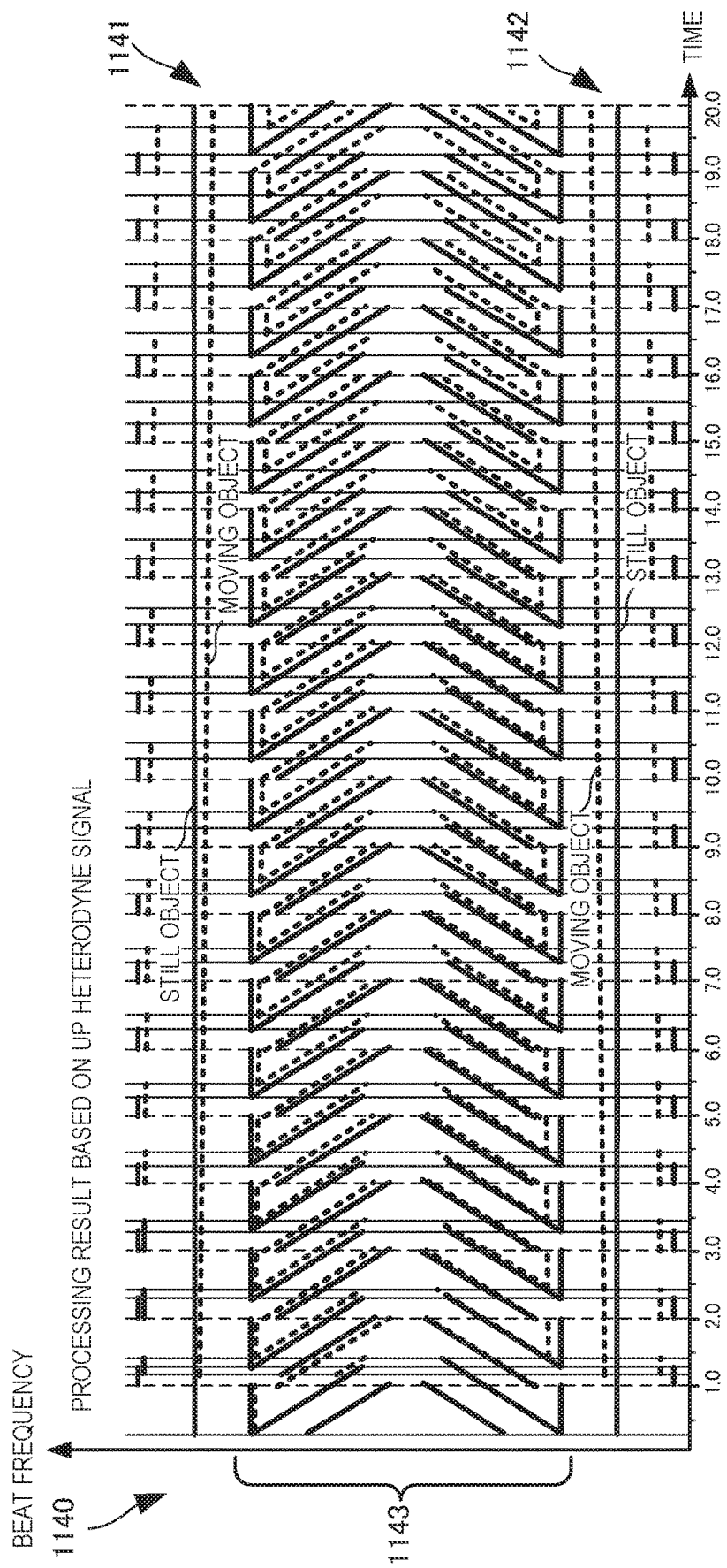
FIG. 11C is a timing chart showing a beat frequency change in an up heterodyne processing result according to the third embodiment of the present invention.

FIG. 11C is a timing chart showing a beat frequency change in an up heterodyne processing result 1140 according to this embodiment. As shown in FIG. 11C, two sets of beat frequencies 1141 and 1142 of a still object and moving object corresponding to two reception wave signals are generated to be separated from unnecessary frequencies 1143. Since a shift in the beat frequency is different between the still object and the moving object in each of the two sets of beat frequencies 1141 and 1142 depending on the influence of the Doppler effect, it is possible to calculate the correct position and speed of a moving target by correcting the Doppler influence based on the output data.

(Reception Wave Signal and Down Heterodyne Signal)

Figure 11D:
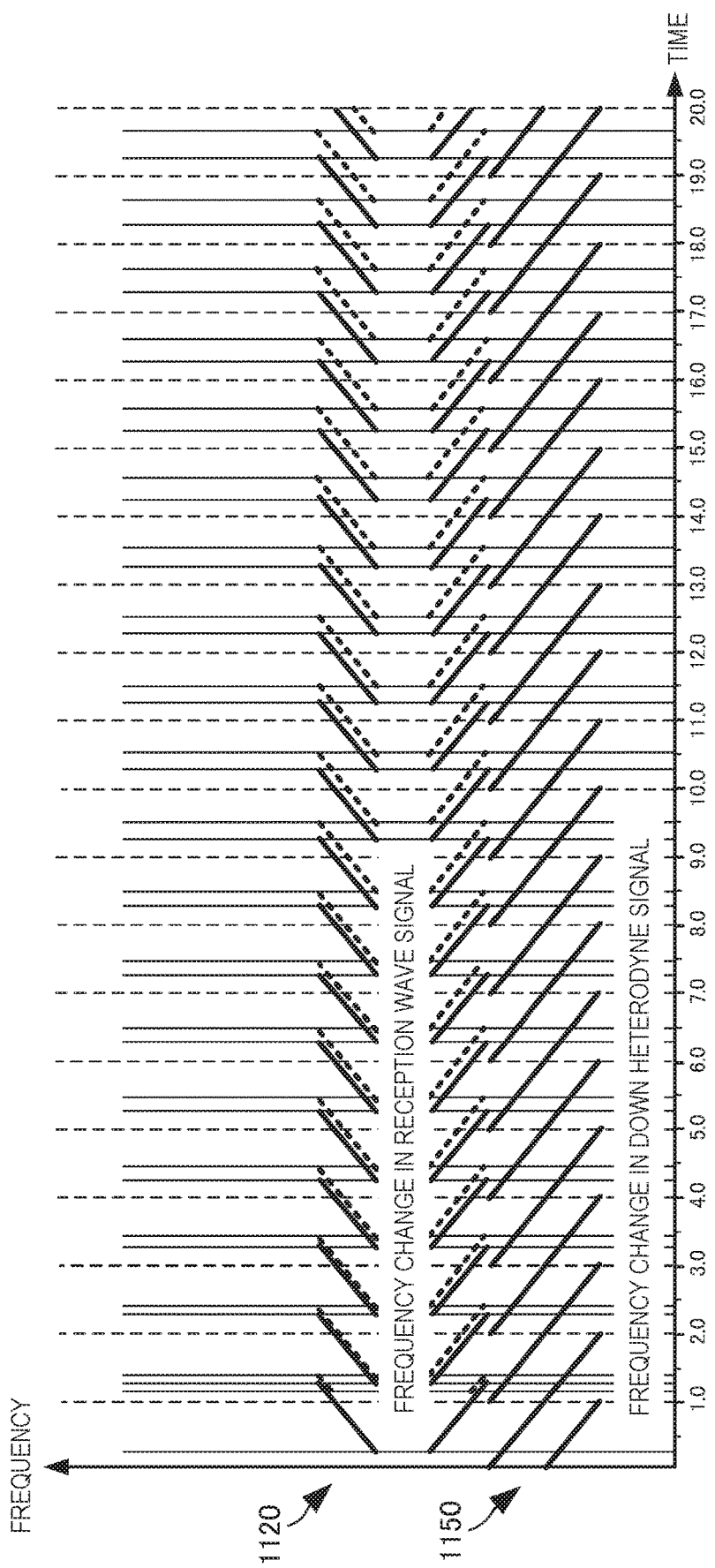
FIG. 11D is a timing chart showing frequency changes in the reception wave signal and a down heterodyne signal according to the third embodiment of the present invention.

FIG. 11D is a timing chart showing frequency changes in the reception wave signal 1120 and a down heterodyne signal 1150 according to this embodiment. Note that the down heterodyne signal 1150 is sets in a low-frequency band which does not overlap the frequency band of the reception wave signal 1120 but may be set in a high-frequency band. The frequency band is selected so as to prevent the use band of the frequency from becoming wide as much as possible.

Figure 11E:
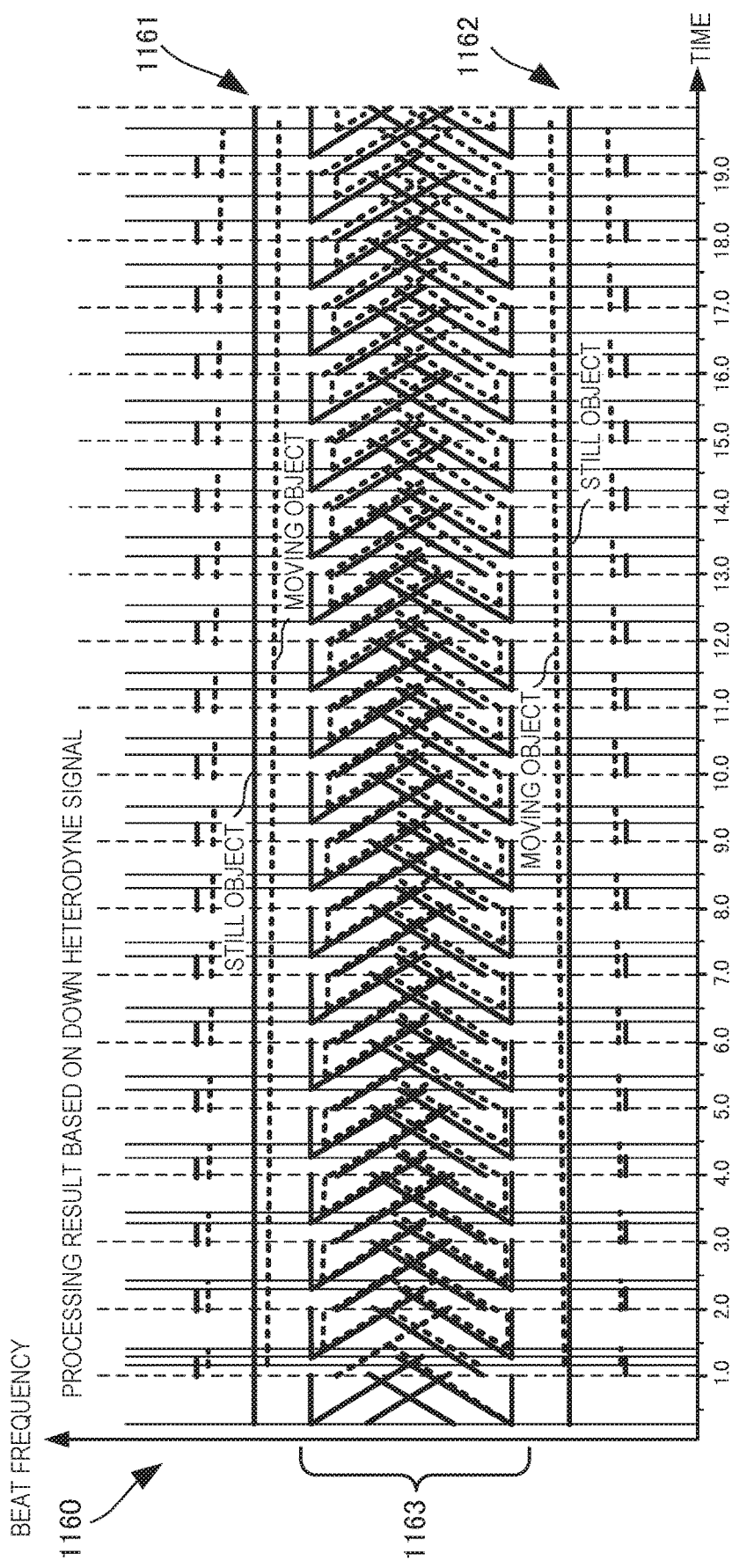
FIG. 11E is a timing chart showing a beat frequency change in a down heterodyne processing result according to the third embodiment of the present invention.

FIG. 11E is a timing chart showing a beat frequency change in a down heterodyne processing result 1160 according to this embodiment. As shown in FIG. 11E, two sets of beat frequencies 1161 and 1162 of a still object and moving object corresponding to two reception wave signals are generated to be separated from unnecessary frequencies 1163. Since a shift in the beat frequency is different between the still object and the moving object in each of the two sets of beat frequencies 1161 and 1162 depending on the influence of the Doppler effect, it is possible to calculate the correct position and speed of the moving target by correcting the Doppler influence based on the output data.

Note that it is understood from the heterodyne processing results shown in FIGS. 11C and 11E that a heterodyne dual-sweep signal is more desirably set in a frequency band as low as possible since the frequency band becomes narrow.

<<Functional Arrangement of Target Extraction System Including Information Processing Apparatus>>

Figure 12:
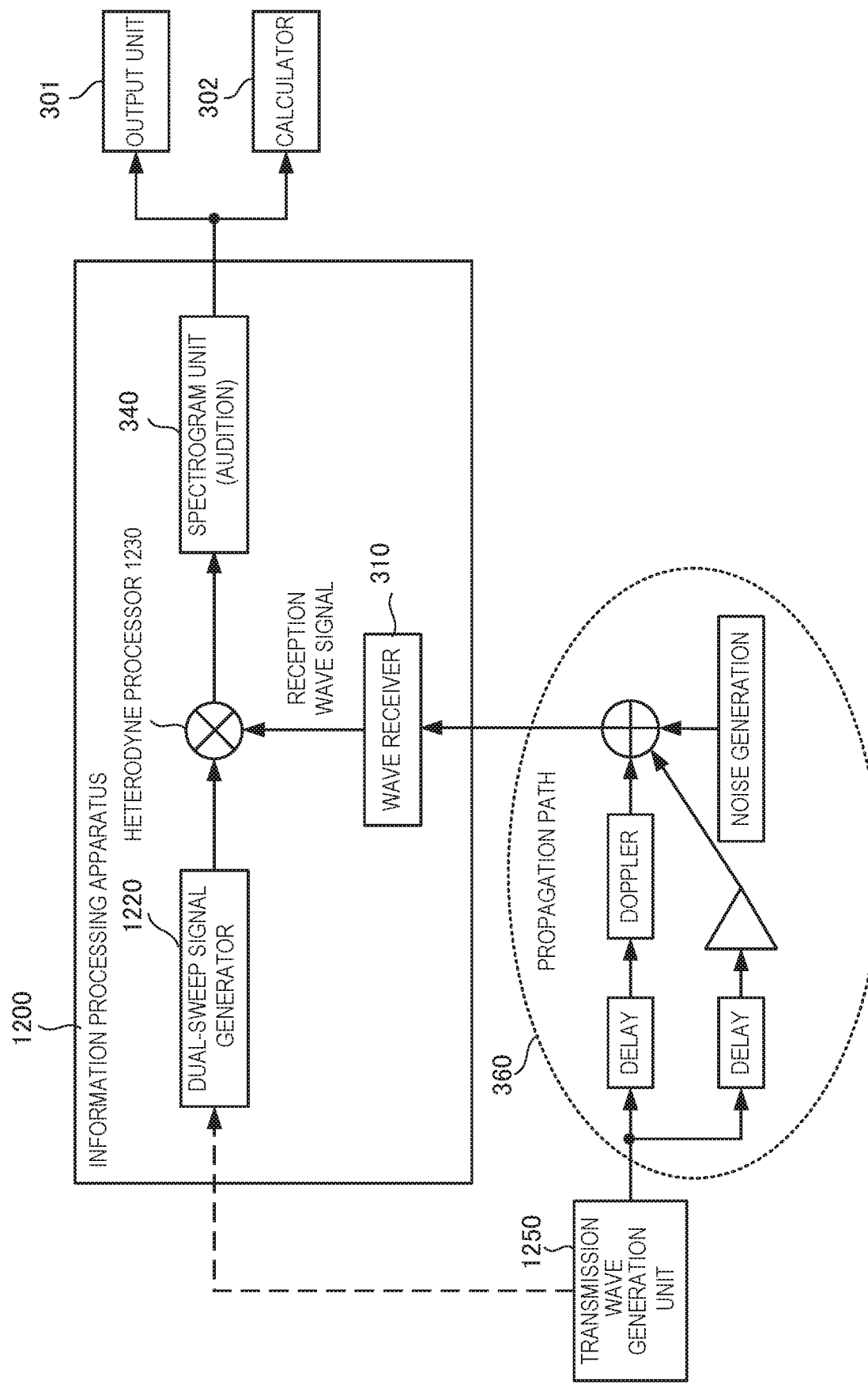
FIG. 12 is a block diagram showing the functional arrangement of the target extraction system including the information processing apparatus according to the third embodiment of the present invention.

FIG. 12 is a block diagram showing the functional arrangement of the target extraction system including an information processing apparatus 1200 according to this embodiment. Note that in FIG. 12, the same reference numerals as in FIG. 3 denote the same functional components and a description thereof will be omitted.

A transmission wave generation unit 1250 generates a plurality of chirp waves of predetermined frequency bands and predetermined cycles, and transmits them. This example will explain an example in which two chirp waves whose frequencies change in an inverted "V"-shaped pattern are transmitted. The present invention, however, is not limited to this.

The information processing apparatus 1200 includes a wave receiver 310, a dual-sweep signal generator 1220, a heterodyne processor 1230, and a spectrogram unit 340. The dual-sweep signal generator 1220 generates, as a heterodyne signal, a dual-sweep signal whose frequency band does not overlap those of the plurality of chirp waves transmitted by the transmission wave generation unit 1250 and is twice that of each transmission wave signal. Note that FIG. 12 shows an example in which the dual-sweep signal generator 1220 acquires the frequency bands and cycles of the chirp waves transmitted from the transmission wave generation unit 1250. However, if the frequency bands and cycles of the plurality of chirp waves transmitted from the transmission wave generation unit 1250 are already known, a dual-sweep signal can be generated without acquiring the frequency bands and cycles of the chirp waves.

The heterodyne processor 1230 multiplies a plurality of reception wave signals output from the wave receiver 310 by the dual-sweep signal whose frequency band does not overlap those of the plurality of reception wave signals, thereby generating beat frequencies as the frequency differences between the reception wave signals and the dual-sweep signal.

(Functional Arrangement of Transmission Wave Generation Unit)

Figure 13A:
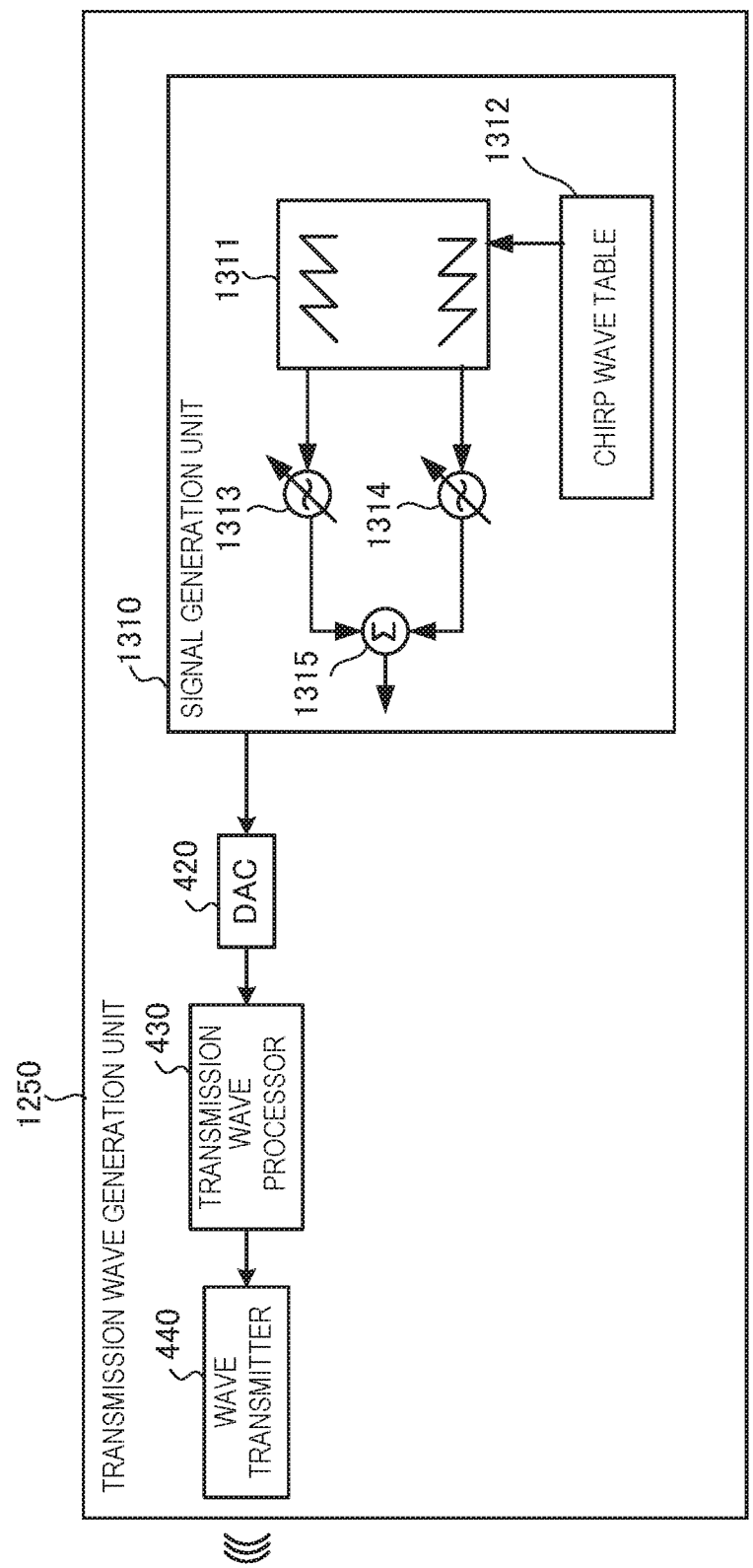
FIG. 13A is a block diagram showing the functional arrangement of a transmission wave generation unit according to the third embodiment of the present invention.

FIG. 13A is a block diagram showing the functional arrangement of the transmission wave generation unit 1250 according to this embodiment. Note that in FIG. 13A, the same reference numerals as in FIG. 4A denote the same functional components and a description thereof will be omitted. The functional arrangement of the transmission wave generation unit 1250 shown in FIG. 13A is merely an example, and the present invention is not limited to this as long as a plurality of chirp waves are output according to this embodiment.

The transmission wave generation unit 1250 includes a signal generation unit 1310, a digital-to-analog converter (DAC in FIG. 13A) 420, a transmission wave processor 430, and a wave transmitter 440. The signal generation unit 1310 includes a signal generator 1311 that generates signals for generating chirp waves, and a chirp wave table 1312 that stores the frequency bands and cycles of the chirp waves generated by the signal generator 1311. The signal generation unit 1310 includes oscillators 1313 and 1314 that generate a plurality of chirp waves based on the signals from the signal generator 1311, and a combiner 1315 that combines the plurality of chirp waves.

Note that FIG. 13A shows the arrangement in which the frequency bands and cycles of the chirp waves to be transmitted can be freely set. However, if the plurality of chirp waves are fixed, the chirp wave table 1312 is not necessary.

Figure 13B:
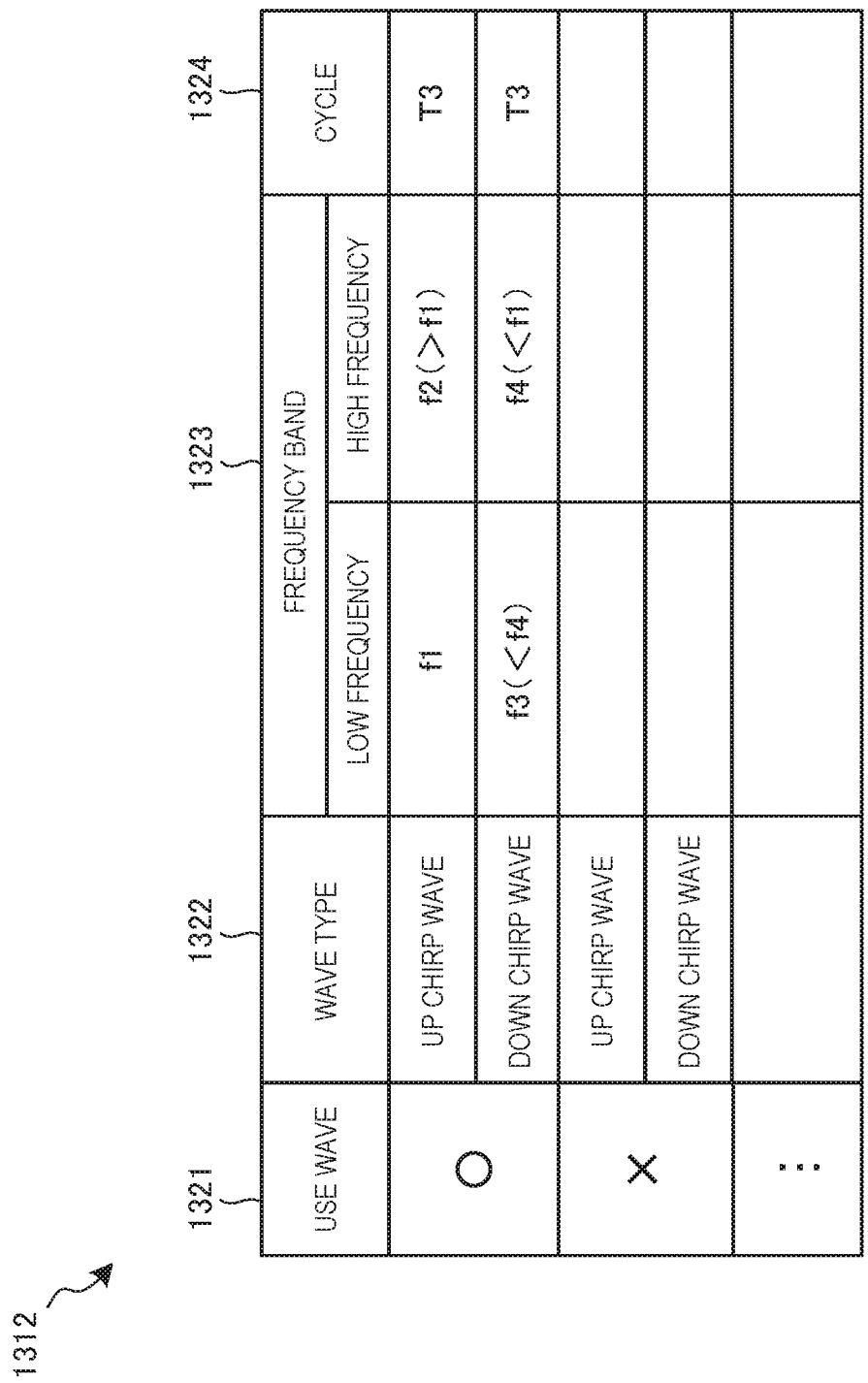
FIG. 13B is a table showing the structure of a chirp wave table according to the third embodiment of the present invention.

FIG. 13B is a table showing the structure of the chirp wave table 1312 according to this embodiment. The chirp wave table 1312 is used to set the frequency bands and cycles of the plurality of chirp waves generated by the signal generator 1311.

The chirp wave table 1312 stores a wave type 1322 and a frequency band 1323 and cycle 1324 of the wave in association with a use wave flag 1321 indicating a chirp wave to be used.

In the use wave flag 1321, o indicates a use wave and x indicates a disuse wave. The wave type 1322 includes an up chirp wave whose frequency linearly rises, a down chirp wave whose frequency linearly lowers, and a serrated chirp wave obtained by alternately repeating an up chirp wave and a down chirp wave. In this example, a plurality of chirp waves to be used are stored in association with each use wave flag 1321.

In FIG. 13B, up and down chirp waves which have an inverted "V" shape, as shown in FIG. 11A, are selected as use waves.

(Functional Arrangement of Dual-Sweep Signal Generator)

Figure 14A:
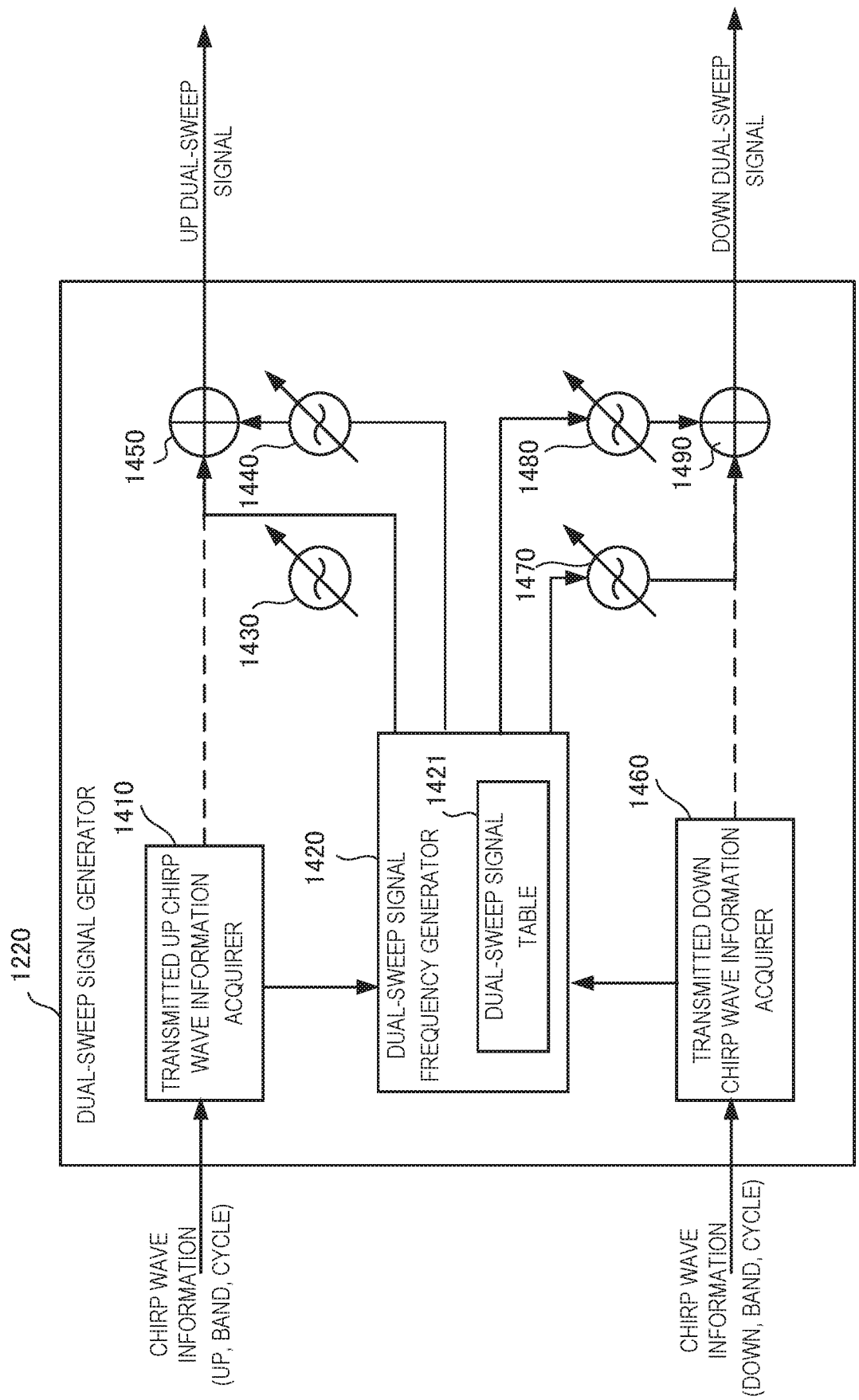
FIG. 14A is a block diagram showing the functional arrangement of a dual-sweep signal generator according to the third embodiment of the present invention.

FIG. 14A is a block diagram showing the functional arrangement of the dual-sweep signal generator 1220 according to this embodiment. Note that the functional arrangement of the dual-sweep signal generator 1220 shown in FIG. 14A is merely an example, and the present invention is not limited to this as long as dual-sweep signals whose frequency bands do not overlap those of a plurality of chirp waves are output according to this embodiment. In the dual-sweep signal generator 1220 of FIG. 14A, an arrangement of generating both an up dual-sweep signal and a down dual-sweep signal is shown. However, as shown in FIG. 11B or 11D, one of the up and down dual-sweep signals may be generated. Alternatively, one of the two signals may be selected.

The dual-sweep signal generator 1220 includes a transmitted up chirp wave information acquirer 1410, a dual-sweep signal frequency generator 1420, an oscillator 1430 on the low-frequency side of the dual-sweep signal, an oscillator 1440 on the high-frequency side of the dual-sweep signal, and a signal combiner 1450. The dual-sweep signal generator 1220 also includes a transmitted down chirp wave information acquirer 1460, an oscillator 1470 on the low-frequency side of the dual-sweep signal, an oscillator 1480 on the high-frequency side of the dual-sweep signal, and a signal combiner 1490.

Note that the transmitted up chirp wave information acquirer 1410 and the transmitted down chirp wave information acquirer 1460 may be integrated into one chirp wave information acquirer. If the chirp waves to be transmitted are known and fixed, the chirp wave information acquirers are not necessary.

The dual-sweep signal frequency generator 1420 includes a dual-sweep signal table 1421, and generates, based on the plurality of transmitted chirp waves, frequency data of dual-sweep signals whose frequency bands do not overlap those of the plurality of chirp waves. In accordance with the output of the dual-sweep signal frequency generator 1420, the oscillators 1430 and 1440 respectively generate signals each of which has the same degree of frequency change as that of the up chirp wave and in each of which a frequency change continues without overlapping the frequency bands of the plurality of transmitted chirp waves. The signal combiner 1450 combines the outputs of the oscillators 1430 and 1440, and outputs an up dual-sweep signal whose frequency band does not overlap those of the plurality of transmitted chirp waves. On the other hand, in accordance with the output of the dual-sweep signal frequency generator 1420, the oscillators 1470 and 1480 respectively generate signals each of which has the same degree of frequency change as that of the down chirp wave and in each of which a frequency change continues without overlapping the frequency bands of the plurality of transmitted chirp waves. The signal combiner 1490 combines the outputs of the oscillators 1470 and 1480, and outputs a down dual-sweep signal whose frequency band does not overlap those of the plurality of transmitted chirp waves.

Note that FIG. 14A shows the arrangement in which the frequency bands and cycles of the plurality of chirp waves to be transmitted can be freely set. However, if the plurality of chirp waves are known and fixed, the dual-sweep signal table 1421 is not necessary.

Figure 14B:
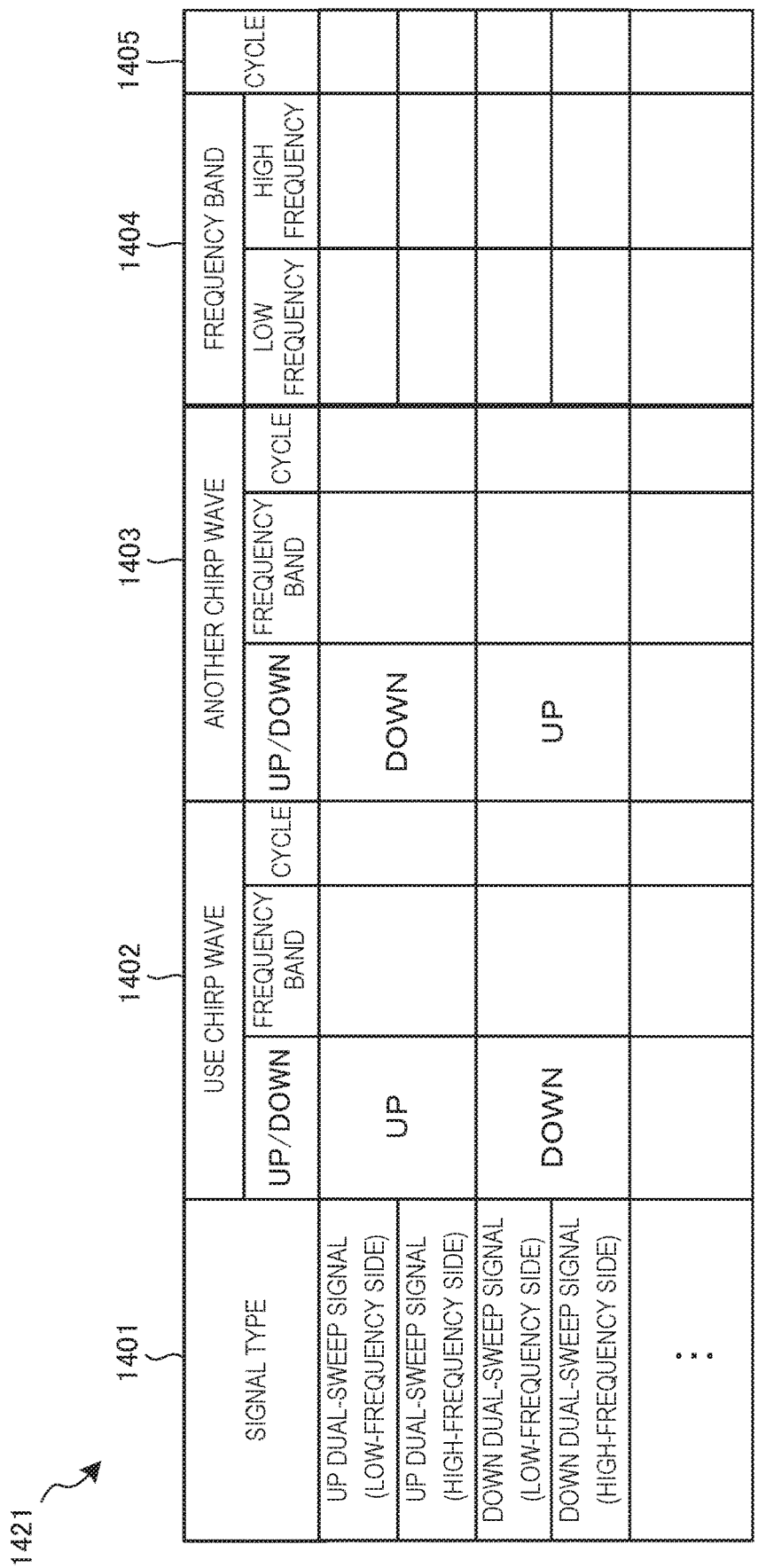
FIG. 14B is a table showing the structure of a dual-sweep signal table according to the third embodiment of the present invention.

FIG. 14B is a table showing the structure of the dual-sweep signal table 1421 according to this embodiment. The dual-sweep signal table 1421 is used to generate dual-sweep signals corresponding to the plurality of transmitted chirp waves.

The dual-sweep signal table 1421 stores a frequency band 1404 and a cycle 1405, which are set based on a signal type 1401, a transmitted use chirp wave 1402, and another chirp wave 1403. Note that the other chirp wave 1403 is not limited to one chirp wave. The signal type 1401 includes a low-frequency side and a high-frequency side for one dual-sweep signal. The use chirp wave 1402 and the other chirp wave 1403 store the pieces of chirp wave information acquired by the transmitted up chirp wave information acquirer 1410 and transmitted down chirp wave information acquirer 1460.

In the frequency band 1404, frequency bands which do not overlap those of the plurality of chirp waves and are close to those of the plurality of chirp waves are set based on the information of the transmitted use chirp wave 1402. The frequency bands 1404 on the low-frequency and high-frequency sides are continuous. Furthermore, the same cycle as that of the use chirp wave is set in the cycle 1405.

(Functional Arrangement of Heterodyne Processor)

Figure 15A:
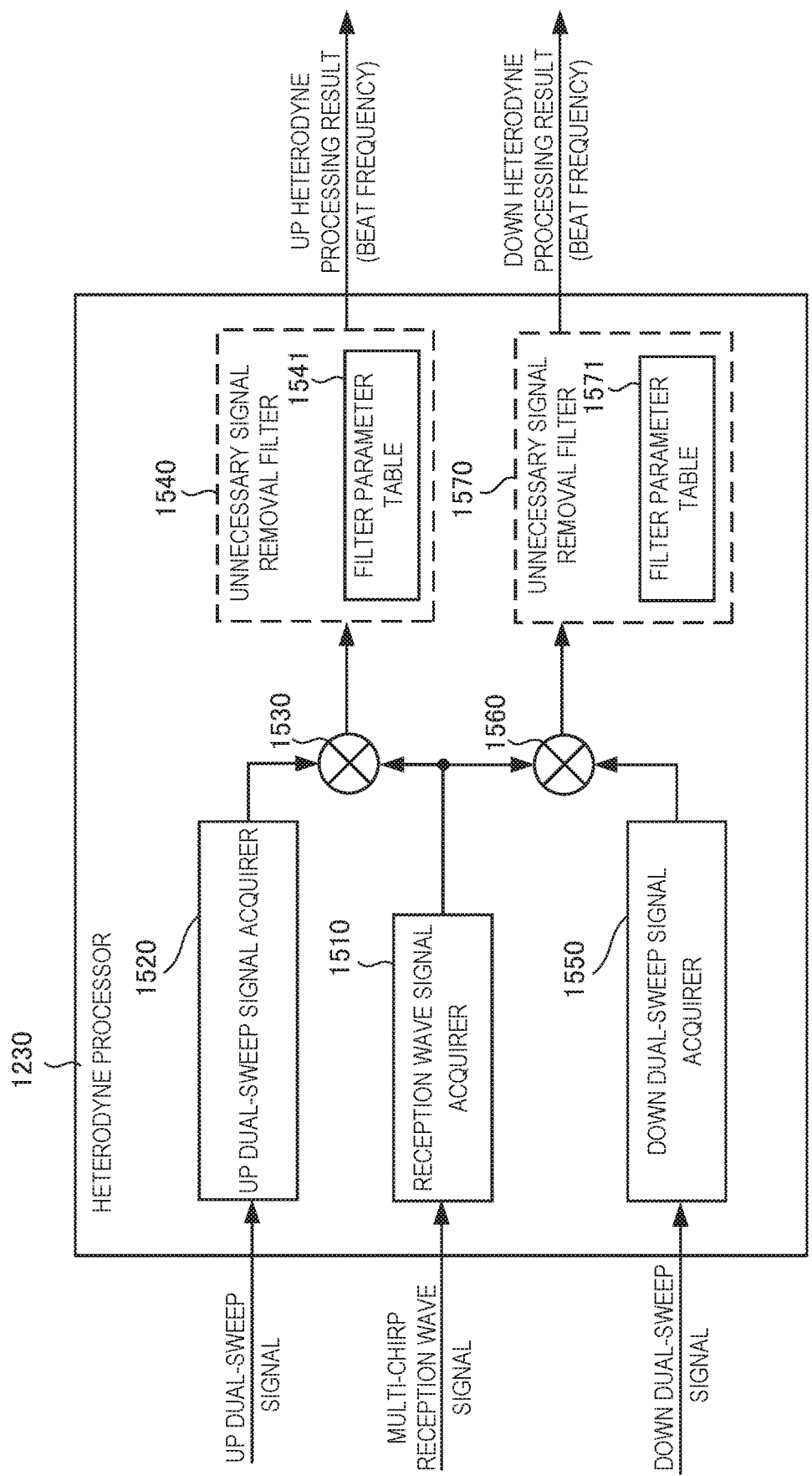
FIG. 15A is a block diagram showing the functional arrangement of a heterodyne processor according to the third embodiment of the present invention.

FIG. 15A is a block diagram showing the functional arrangement of the heterodyne processor 1230 according to this embodiment. Note that the functional arrangement of the heterodyne processor 1230 shown in FIG. 15A is merely an example, and the present invention is not limited to this as long as multiplication processing of a reception wave signal and a dual-sweep signal is performed according to this embodiment. In the heterodyne processor 1230 of FIG. 15A, the arrangement of executing both heterodyne processing based on the up dual-sweep signal and that based on the down dual-sweep signal is shown. However, as shown in FIG. 11B or 11D, one of the heterodyne processes may be executed. Alternatively, one of the two processes may be selected.

The heterodyne processor 1230 includes a reception wave signal acquirer 1510, an up dual-sweep signal acquirer 1520, a multiplier 1530, and an optional unnecessary signal removal filter 1540. The heterodyne processor 1230 also includes a down dual-sweep signal acquirer 1550, a multiplier 1560, and an optional unnecessary signal removal filter 1570.

The reception wave signal acquirer 1510 acquires a reception wave signal including a plurality of chirp waves from the wave receiver 310. The up dual-sweep signal acquirer 1520 acquires the up dual-sweep signal from the dual-sweep signal generator 1220. On the other hand, the down dual-sweep signal acquirer 1550 acquires the down dual-sweep signal from the dual-sweep signal generator 1220. The multiplier 1530 multiplies the reception wave signal by the up dual-sweep signal to generate a beat frequency as a difference frequency. On the other hand, the multiplier 1560 multiplies the reception wave signal by the down dual-sweep signal to generate a beat frequency as a difference frequency.

Based on a filter parameter table 1541 predicted based on the plurality of chirp waves and the up dual-sweep signal, the unnecessary signal removal filter 1540 removes frequency components unnecessary for target extraction, which are included in the output of the multiplier 1530. On the other hand, based on a filter parameter table 1571 predicted based on the plurality of chirp waves and the down dual-sweep signal, the unnecessary signal removal filter 1570 removes frequency components unnecessary for target extraction, which are included in the output of the multiplier 1560. Note that the filter parameter tables 1541 and 1571 may be integrated into one table capable of identifying each parameter. If the plurality of chirp waves and the dual-sweep signals are known and fixed, the filter parameter tables 1541 and 1571 are not necessary.

FIG. 15B is a table showing the structures of the filter parameter tables 1541 and 1571 according to this embodiment. Each of the filter parameter tables 1541 and 1571 stores filter parameters predicted based on the plurality of chirp waves and the up or down dual-sweep signal.

Each of the filter parameter tables 1541 and 1571 stores a filter frequency band 1504 of each filter type 1501, which is estimated based on a use chirp wave 1502 and a use dual-sweep signal 1503. Note that the filter frequency band 1504 may store a plurality of frequency bands including unnecessary frequencies.

<<Processing Procedure of Transmission Wave Generation Unit>>

Figure 16A:
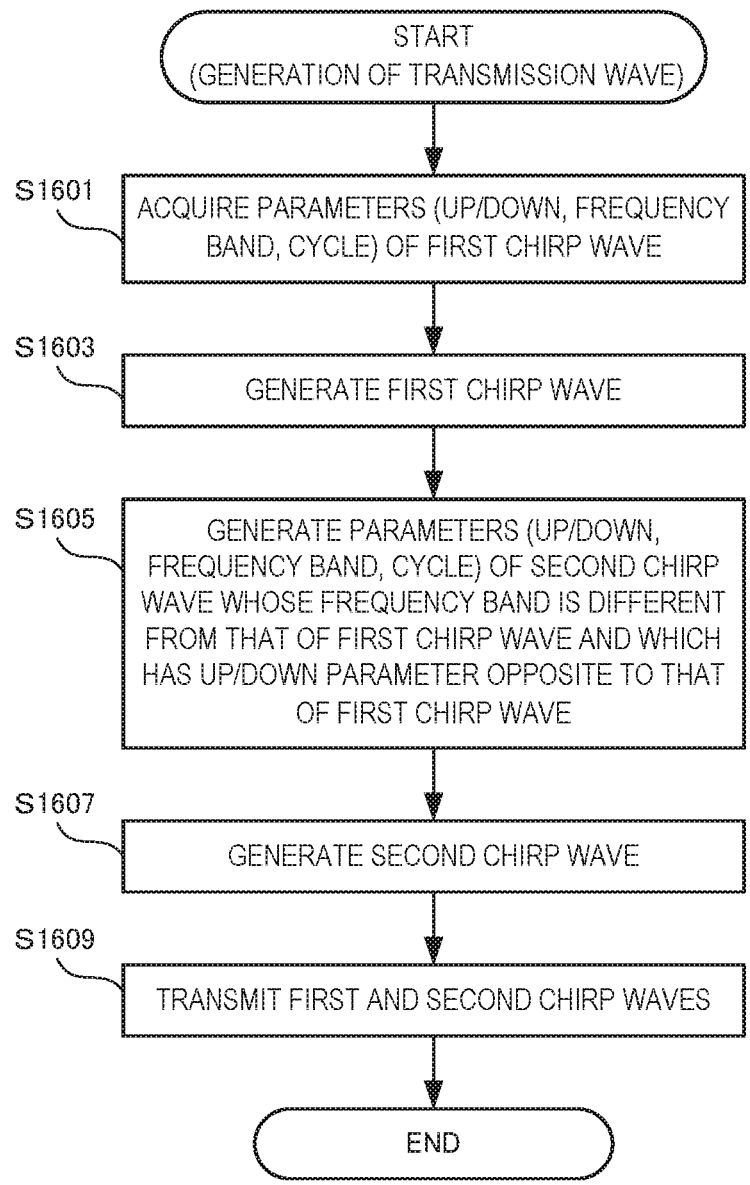
FIG. 16A is a flowchart illustrating the processing procedure of the transmission wave generation unit according to the third embodiment of the present invention.

FIG. 16A is a flowchart illustrating the processing procedure of the transmission wave generation unit 1250 according to this embodiment.

In step S1601, the transmission wave generation unit 1250 acquires the parameters (up/down, frequency band, and cycle) of the first chirp wave from the chirp wave table 1312. In step S1603, the transmission wave generation unit 1250 generates the first chirp wave.

In step S1605, in this example, the transmission wave generation unit 1250 acquires, from the chirp wave table 1312, the parameters (up/down, frequency band, and cycle) of the second chirp wave whose frequency band is different from that of the first chirp wave and which has the up/down parameter opposite to that of the first chirp wave. In step S1607, the transmission wave generation unit 1250 generates the second chirp wave.

In step S1609, the transmission wave generation unit 1250 transmits the first and second chirp waves. Note that the combination of two chirp waves or the number of chirp waves is not limited to that in this example.

(Dual-Sweep Signal Generation Processing)

Figure 16B:
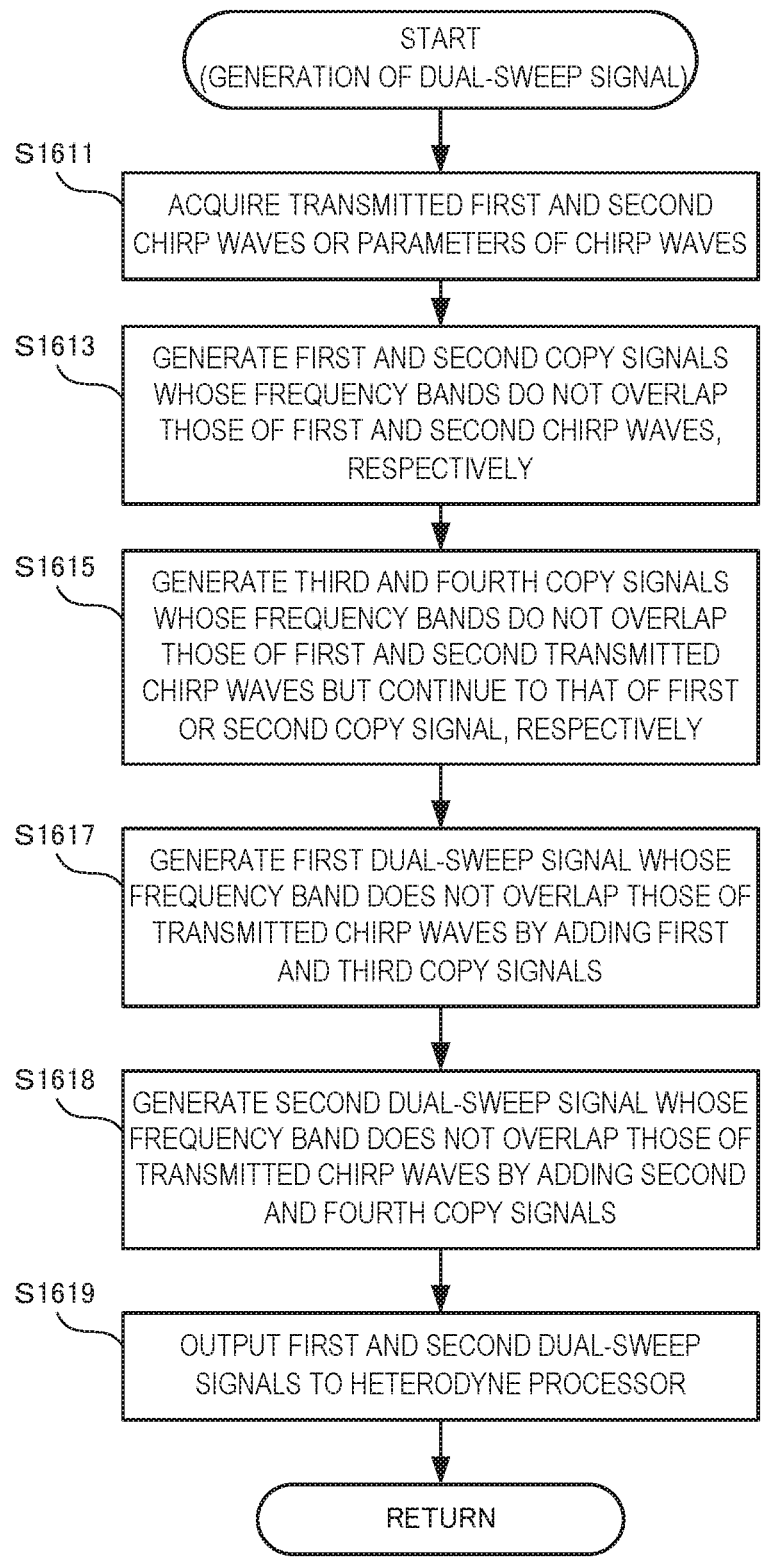
FIG. 16B is a flowchart illustrating the procedure of dual-sweep signal generation processing according to the third embodiment of the present invention.

FIG. 16B is a flowchart illustrating the procedure of the dual-sweep signal generation processing according to this embodiment. This flowchart is executed by a CPU 810 of FIG. 8 using a RAM 840, thereby implementing the dual-sweep signal generator 1220 of FIG. 12.

In step S1611, the information processing apparatus 1200 acquires the transmitted first and second chirp waves or their parameters. In step S1613, the information processing apparatus 1200 generates the first copy signal of the first chirp wave and the second copy signal of the second chirp wave, whose frequency bands do not overlap those of the first and second chirp waves. Note that each copy signal indicates that it has the same degree of frequency change, as shown in FIGS. 11A, 11B, and 11D, and does not indicate that it has the same frequency. The frequency band of the first or second copy signal is close to those of the plurality of chirp waves.

In step S1615, the information processing apparatus 1200 generates the third and fourth copy signals whose frequency bands do not overlap those of the plurality of transmitted chirp waves and continue to that of the first or second copy signal. In step S1617, the information processing apparatus 1200 generates the first dual-sweep signal whose frequency band does not overlap those of the plurality of transmitted chirp waves by adding the first and third copy signals. In step S1618, the information processing apparatus 1200 generates the second dual-sweep signal whose frequency band does not overlap those of the plurality of transmitted chirp waves by adding the second and fourth copy signals. In step S1619, the information processing apparatus 1200 outputs the generated first and second dual-sweep signals to the heterodyne processor 1230.

<<Transmission Wave Generation Conditions>>

Figure 17:
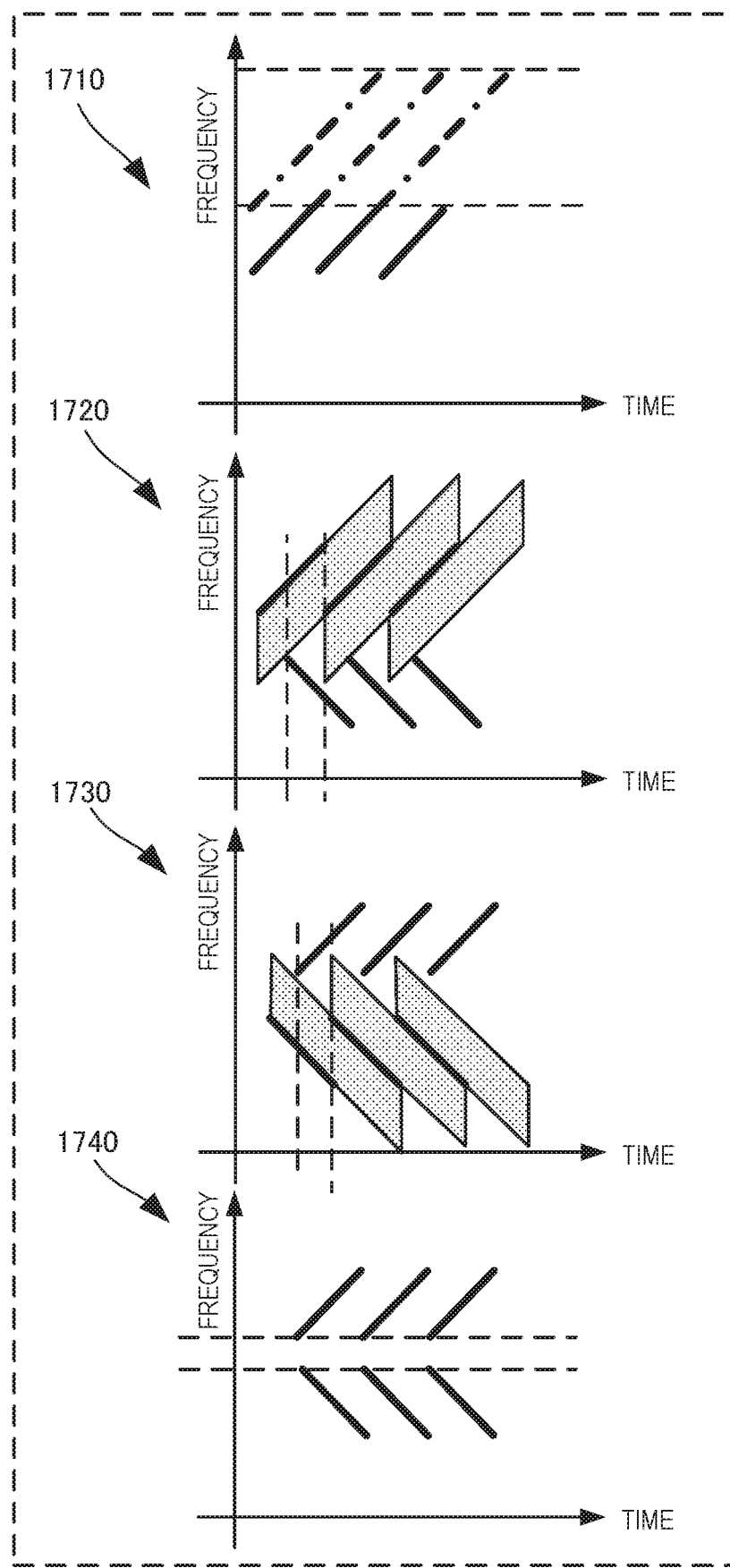
FIG. 17 shows timing charts for explaining transmission wave generation conditions according to the third embodiment of the present invention.

FIG. 17 shows timing charts for explaining transmission wave generation conditions according to this embodiment. FIG. 17 shows conditions of reducing an unnecessary frequency spectrum of the beat frequency when using the chirp waves whose frequencies change in an inverted "V"-shaped pattern in this example. However, the conditions can be applied when using a plurality of other chirp waves.

The first condition is that a chirp wave does not enter a region to which a frequency change in heterodyne signal is translated (see a frequency change 1710). Conversely, a heterodyne signal does not enter a region to which a frequency change in a chirp wave is translated.

The second condition is that two chirp waves are combined by shifting their cycles by a half to reduce a wasted use band to half, as compared with the inverted "V" shape obtained when the cycles of the chirp waves coincide with each other (see frequency changes 1720 and 1730).

By separating a plurality of chirp waves to have predetermined frequency intervals by a band filter before transmission, it is possible to generate a plurality of chirp waves for which an unnecessary frequency spectrum of the beat frequency is reduced with a simple arrangement (see a frequency change 1740).

<<Target Object Speed Estimation and Doppler Influence Correction>>

Figure 18:
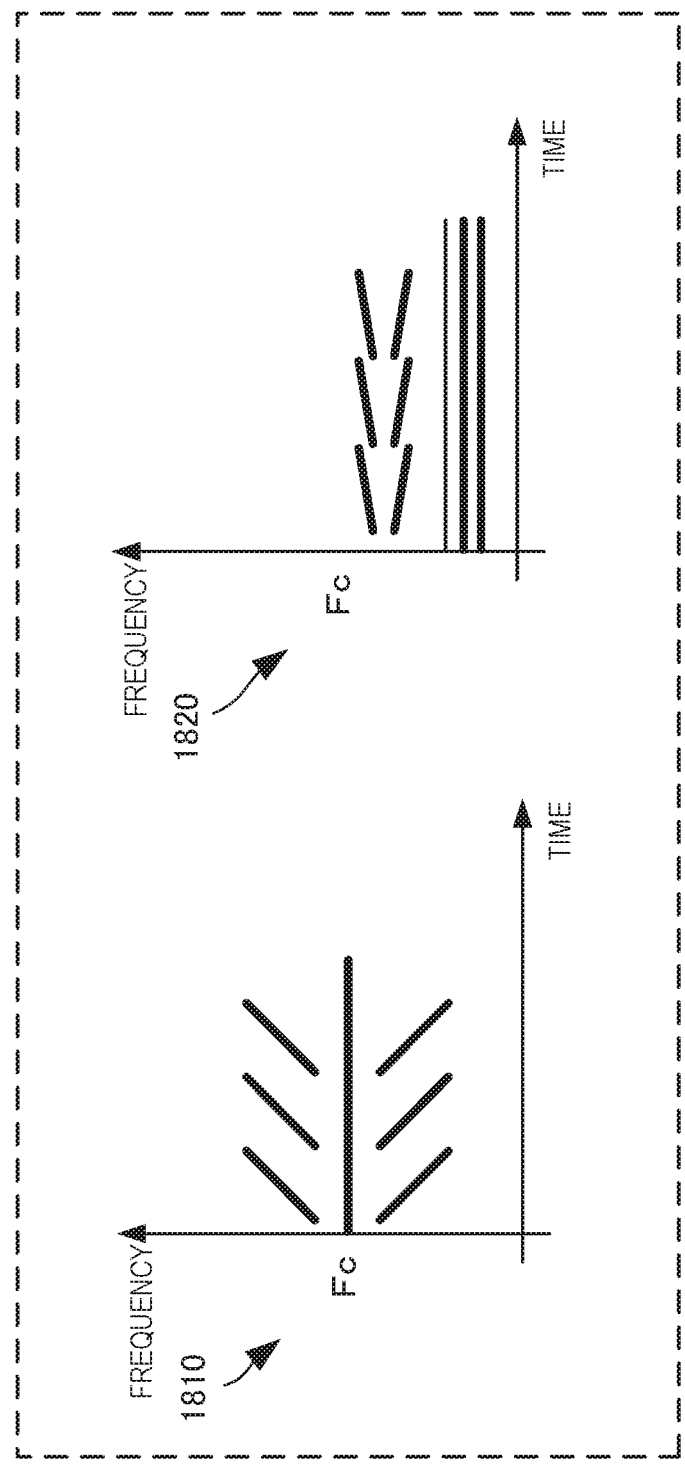
FIG. 18 shows timing charts for explaining target object speed estimation and Doppler influence correction according to the third embodiment of the present invention.

FIG. 18 shows timing charts for explaining target object speed estimation and Doppler influence correction according to this embodiment.

A frequency change 1810 shown in FIG. 18 explains target speed estimation when the up and down chirp waves having the inverted "V" shape are used. In this example, a frequency Fc is set as the center frequency of the up and down chirp waves.

In this case, Fsu represents the frequency of the transmitted up chirp wave, Fsd represents the frequency of transmitted down chirp wave, Fru represents the frequency of the received up chirp wave, Frd represents the frequency of the received down chirp wave, and D represents a Doppler deviation ratio. All of these pieces of information can be acquired from, for example, FIG. 11D or 11E.

Therefore, transmitting a plurality of chirp waves makes it possible to perform target speed calculation (estimation) by executing processing once.

A frequency change 1820 shown in FIG. 18 explains Doppler influence correction when the up and down chirp waves having the inverted "V" shape are used.

The Doppler deviation ratio D can be calculated by D=(Fru+Frd)/(Fsu+Fsd)=(Fru+Frd)/2Fc. Therefore, transmitting a plurality of chirp waves makes it possible to correct the influence of the Doppler effect by performing processing once.

Note that a case in which two chirp waves are used has been described above. However, it is apparent that not two but three or more chirp waves may be used. Obtaining a plurality of heterodyne results allows statistical processing such as averaging, and can also improve the measurement accuracy.

According to this embodiment, it is possible to separate a signal necessary for target extraction and an unnecessary signal from heterodyne results, and obtain different results of the Doppler influence at once, thereby effectively performing target extraction, target speed estimation, and Doppler influence correction.

Fourth Embodiment

An information processing apparatus according to the fourth embodiment of the present invention will be described next. The information processing apparatus according to this embodiment is different from that according to the third embodiment in that a reception wave signal of a plurality of chirp waves is separated to perform heterodyne processing. That is, in this embodiment, a reception wave is separated by a band separation filter to perform different heterodyne processes for respective chirps. Beat frequencies obtained by the heterodyne processes are combined using a band filter and the like so as not to overlap each other. A beat frequency change image is obtained for each heterodyne result, and these two beat frequency change images are combined. The remaining components and operations are the same as those in the second and third embodiments. Hence, the same reference numerals denote the same components and operations, and a detailed description thereof will be omitted.

<<Overview of Processing of Embodiment>>

(Separation of Reception Wave Signal)

Figure 19A:
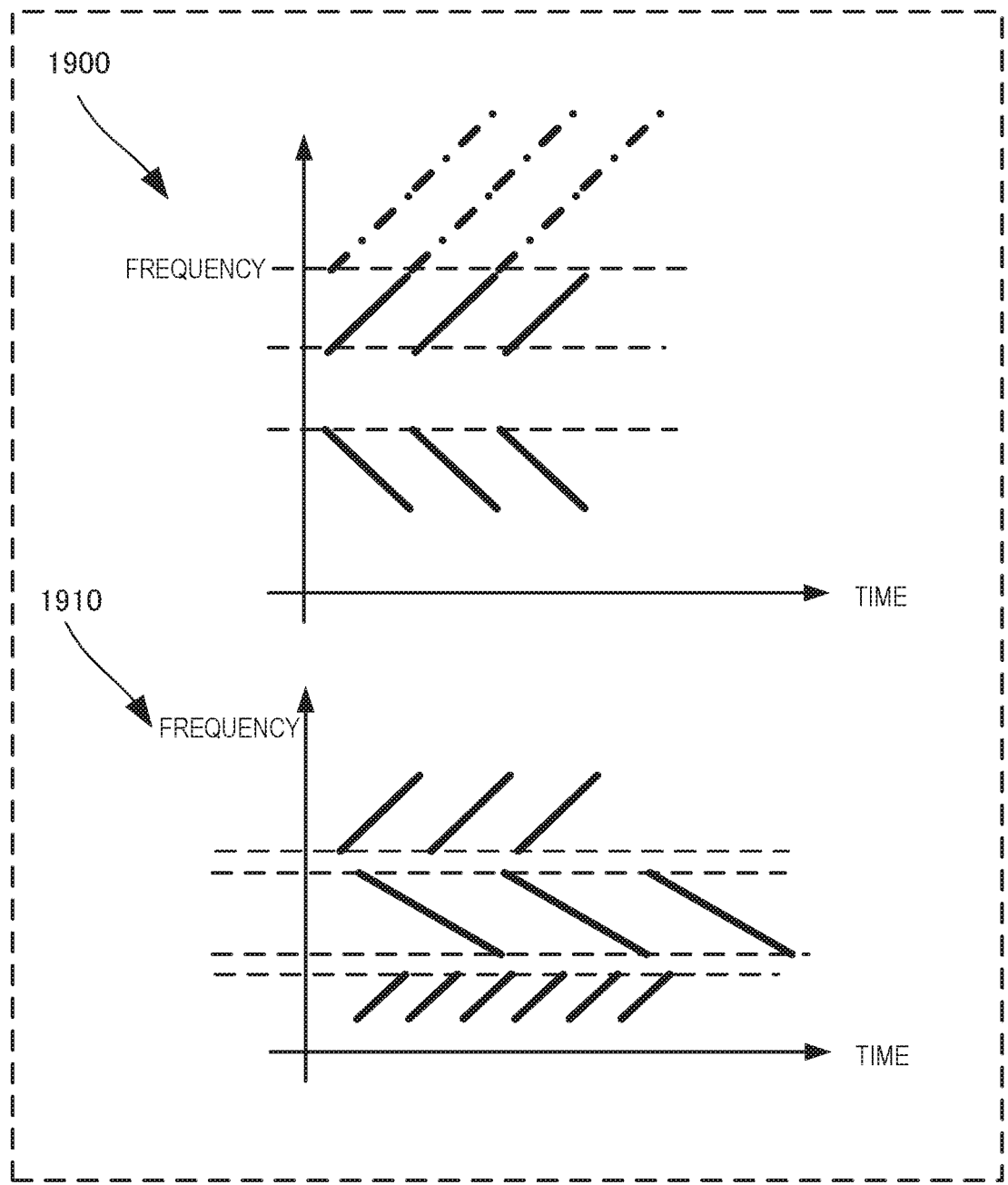
FIG. 19A shows timing charts showing the features of a target extraction method by an information processing apparatus according to the fourth embodiment of the present invention.

FIG. 19A shows timing charts showing the features of a target extraction method by the information processing apparatus according to this embodiment.

FIG. 19A shows a frequency change in a reception wave signal in an example in which the reception wave signal is separated by a band separation filter. A frequency change 1900 shows up and down reception wave signals obtained by separating the reception wave signal of chirp waves having an inverted "V" shape using a band separation filter. In this embodiment, heterodyne processing is performed for each of the separated up and down reception wave signals using a dual-sweep signal whose frequency band does not overlap that of the reception wave signal, and the thus obtained signals are combined later.

A frequency change 1910 shows a case in which if a reception wave signal is formed from three chirp waves, it is separated into three reception wave signals by a band separation filter, heterodyne processing is performed for each of the separated reception wave signals using a dual-sweep signal whose frequency band does not overlap that of the reception wave signal, and the thus obtained signals are combined later.

According to this embodiment, it is possible to generate a dual-sweep signal whose frequency band does not overlap that of each reception wave signal, and thus the frequency band can be effectively used.

(Separated Up Reception Wave Signal and Up Heterodyne Signal, and Separated Down Reception Wave Signal and Down Heterodyne Signal)

FIG. 19B shows timing charts respectively showing frequency changes in a separated up reception wave signal 1921 and an up heterodyne signal 1130, and those a separated down reception wave signal 1922 and a down heterodyne signal 1150 according to this embodiment.

Referring to FIG. 19B, the up reception wave signal 1921 and the down reception wave signal 1922 are signals obtained by separating, using a band separation filter, in accordance with chirp waves, a signal received by a wave receiver 310. Note that a reception wave signal 1120 shown in FIGS. 11A and 11B is separated into the up reception wave signal 1921 and down reception wave signal 1922 to perform heterodyne processing. Therefore, even if the up heterodyne signal 1130 is in the low-frequency band of the up reception wave signal 1921 or the down heterodyne signal 1150 is in the high-frequency band of the down reception wave signal 1922, the reception wave signal and the heterodyne dual-sweep signal do not overlap each other. This allows selection of the frequency band of the dual-sweep signal with ease, and a frequency range to be used can be narrowed.

(Heterodyne Processing Results in Embodiment)

Figure 19C:
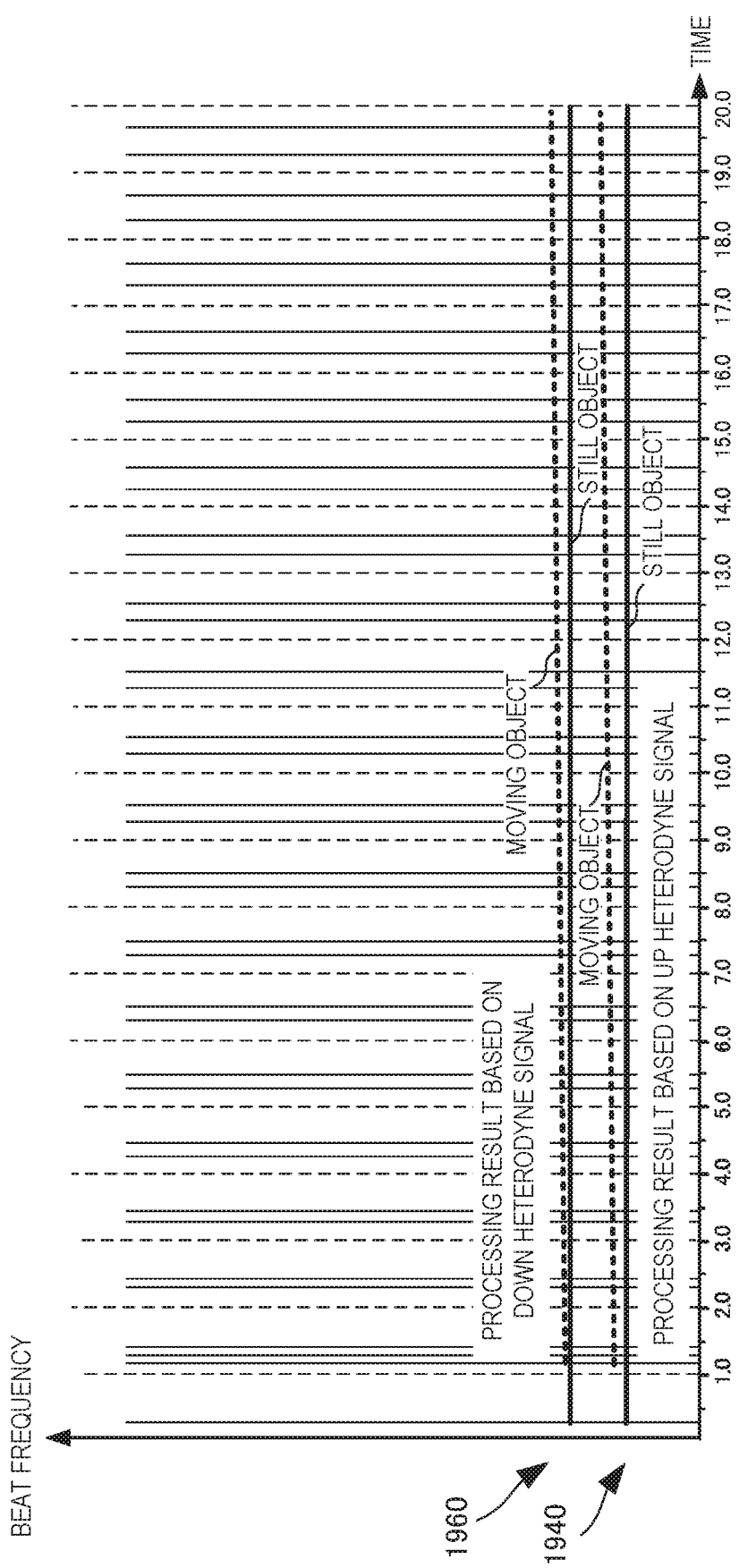
FIG. 19C is a timing chart showing beat frequency changes in heterodyne processing results in the information processing apparatus according to the fourth embodiment of the present invention.

FIG. 19C is a timing chart showing beat frequency changes in heterodyne processing results in the information processing apparatus according to this embodiment.

Referring to FIG. 19C, a beat frequency 1940 generated by heterodyne processing using the up reception wave signal 1921 and the up heterodyne signal 1130 and a beat frequency 1960 generated by heterodyne processing using the down reception wave signal 1922 and the down heterodyne signal 1150 are combined and output.

<<Functional Arrangement of Target Extraction System Including Information Processing Apparatus>>

Figure 20:
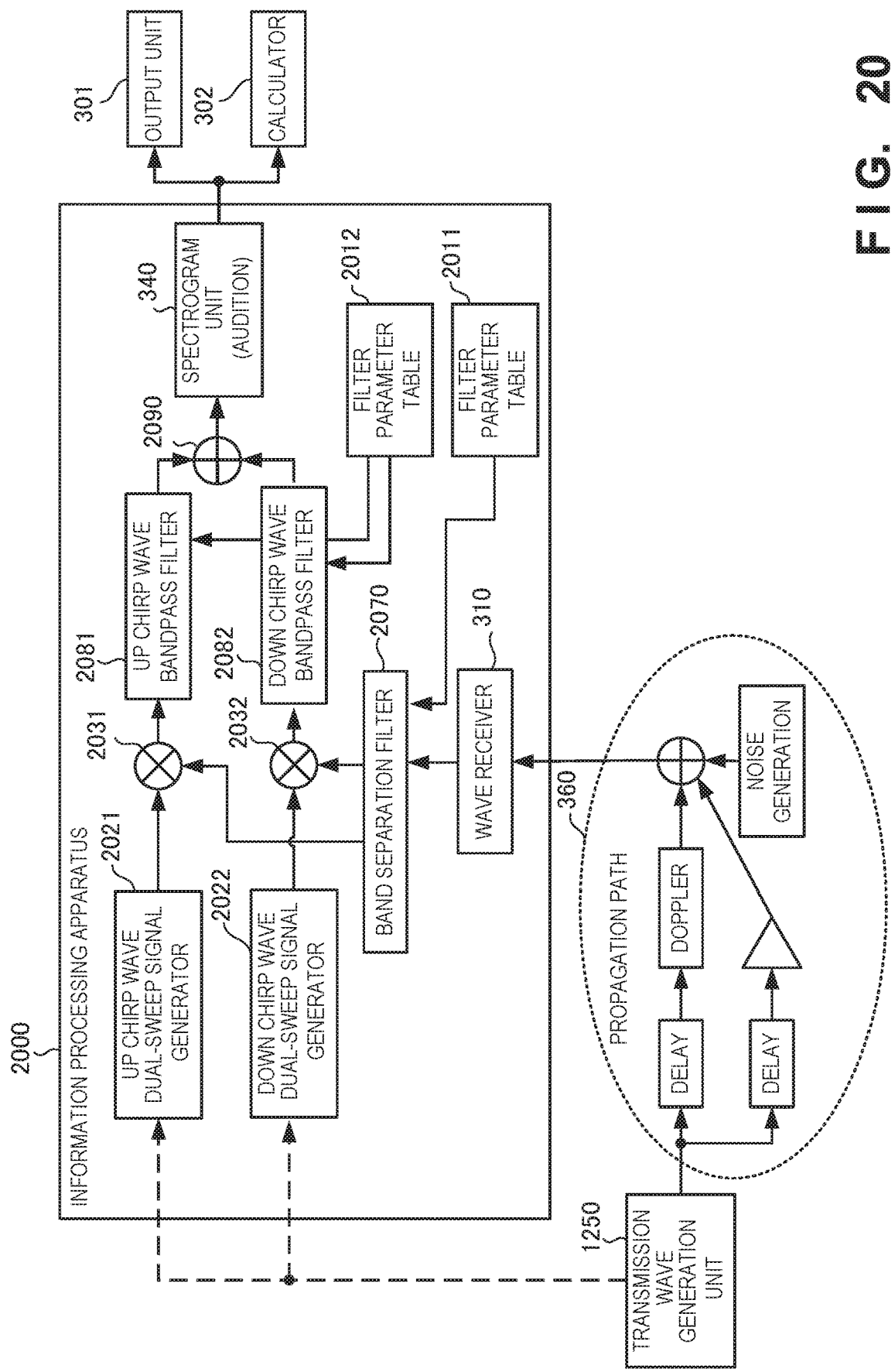
FIG. 20 is a block diagram showing the functional arrangement of a target extraction system including the information processing apparatus according to the fourth embodiment of the present invention.

FIG. 20 is a block diagram showing the functional arrangement of a target extraction system including an information processing apparatus 2000 according to this embodiment. Note that in FIG. 20, the same reference numerals as in FIGS. 3 and 12 denote the same functional components and a description thereof will be omitted. Furthermore, FIG. 20 shows an arrangement complying with chirp waves having an inverted "V" shape but the plurality of chirp waves are not limited to those having an inverted "V" shape.

The information processing apparatus 2000 includes a band separation filter 2070, a filter parameter table 2011 for the band separation filter 2070, an up chirp wave dual-sweep signal generator 2021, and a down chirp wave dual-sweep signal generator 2022.

Furthermore, the information processing apparatus 2000 includes an up multiplier 2031, a down multiplier 2032, an up chirp wave bandpass filter 2081, a down chirp wave bandpass filter 2082, a filter parameter table 2012 for the bandpass filters, and a heterodyne processing result combiner 2090.

The band separation filter 2070 separates a reception wave signal into an up reception wave signal and a down reception wave signal in accordance with the filter parameter table 2011. The up chirp wave dual-sweep signal generator 2021 generates an up dual-sweep signal whose frequency band does not overlap that of the transmitted up chirp wave in correspondence with the up chirp wave. On the other hand, the down chirp wave dual-sweep signal generator 2022 generates a down dual-sweep signal whose frequency band does not overlap that of the transmitted down chirp wave in correspondence with the down chirp wave. The up multiplier 2031 generates a beat frequency by multiplying the up reception wave signal by the up dual-sweep signal. On the other hand, the down multiplier 2032 generates a beat frequency by multiplying the down reception wave signal by the down dual-sweep signal.

The up chirp wave bandpass filter 2081 removes unnecessary frequencies from the output of the up multiplier 2031 in accordance with the filter parameter table 2012. On the other hand, the down chirp wave bandpass filter 2082 removes unnecessary frequencies from the output of the down multiplier 2032 in accordance with the filter parameter table 2012. The heterodyne processing result combiner 2090 combines the beat frequencies obtained by removing the unnecessary frequencies (see FIG. 19C).

Note that each of the filter parameter tables 2011 and 2012 may be included in the band separation filter 2070, or the chirp wave bandpass filter 2081 or 2082. Alternatively, the filter parameter tables may be integrated into one table. If the plurality of chirp waves and the plurality of dual-sweep signals are known and fixed, the filter parameter tables are not necessary.

(Functional Arrangement of Band Separation Filter)

Figure 21A:
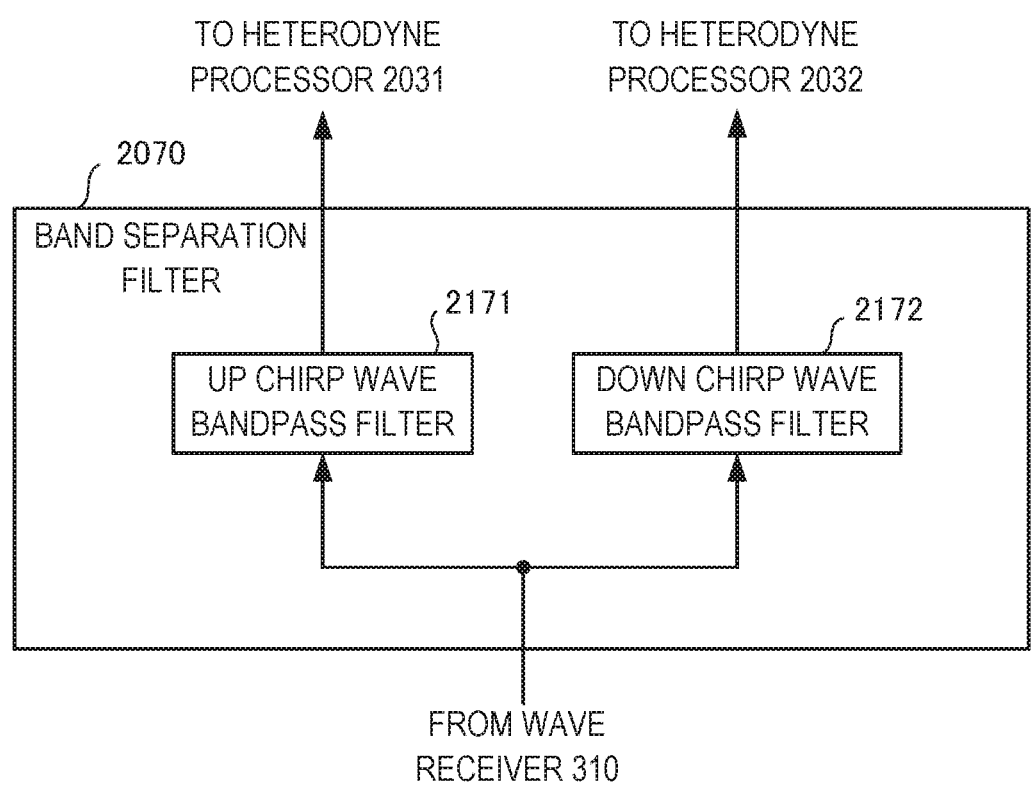
FIG. 21A is a block diagram showing the functional arrangement of a band separation filter according to the fourth embodiment of the present invention.

FIG. 21A is a block diagram showing the functional arrangement of the band separation filter 2070 according to this embodiment. Note that the functional arrangement of the band separation filter 2070 is not limited to that shown in FIG. 21A. Any arrangement capable of extracting reception wave signals corresponding to a plurality of transmitted chirp waves from a reception wave signal may be adopted.

The band separation filter 2070 includes an up chirp wave bandpass filter 2171 and a down chirp wave bandpass filter 2172. The band separation filter 2070 separates a reception wave signal into reception wave signals corresponding to a plurality of transmitted chirp waves in accordance with the filter parameter table 2011.

Figure 21B:
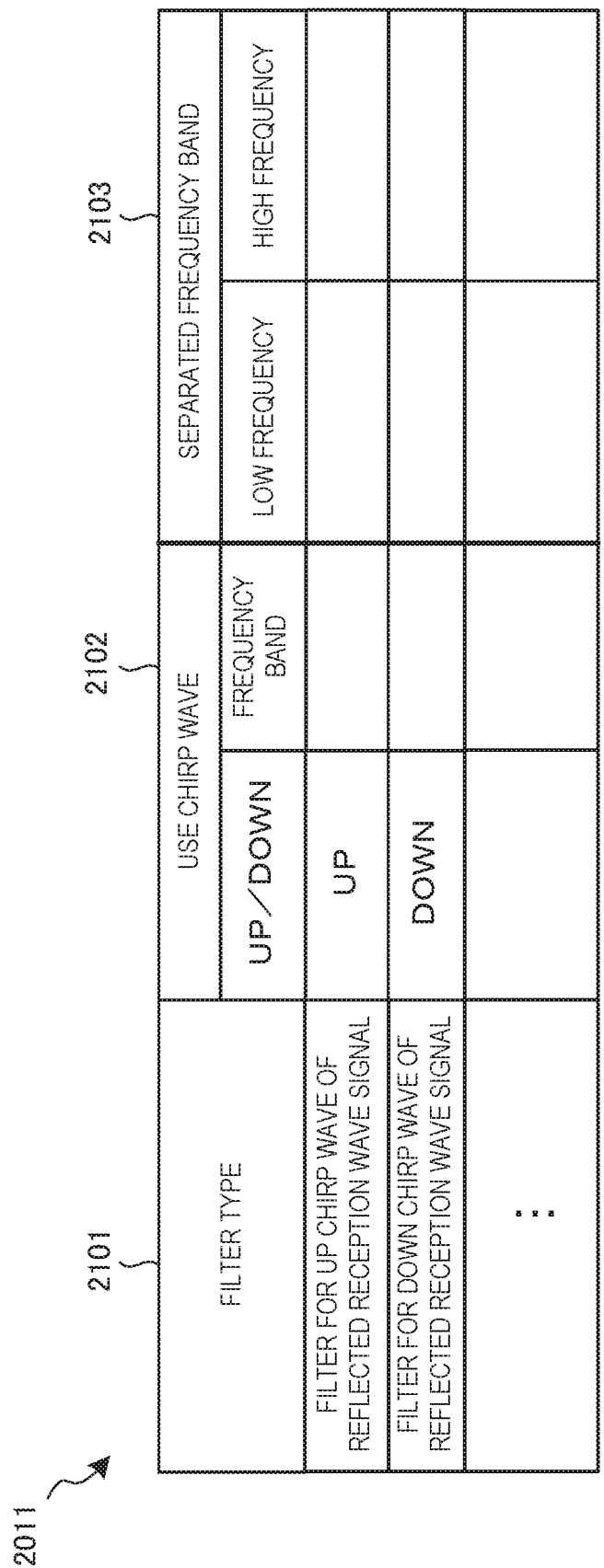
FIG. 21B is a table showing the structure of a filter parameter table for the band separation filter according to the fourth embodiment of the present invention.

FIG. 21B is a table showing the structure of the filter parameter table 2011 for the band separation filter according to this embodiment. The filter parameter table 2011 is used to set the frequency band of the band separation filter 2070 in accordance with a use chirp wave.

The filter parameter table 2011 stores a separated frequency band 2103 in association with a filter type 2101 and a use chirp wave 2102.

(Filter Parameters for Bandass Filters)

Figure 22:
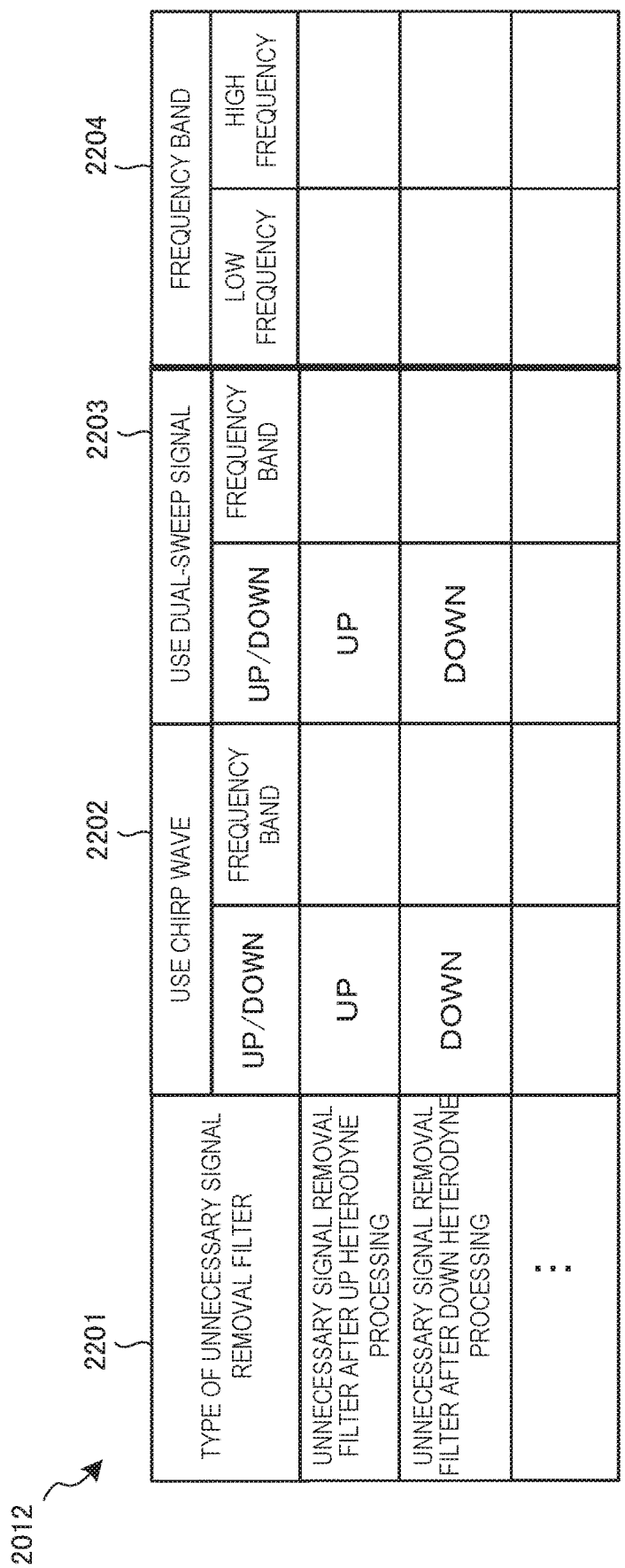
FIG. 22 is a table showing the structure of a filter parameter table for bandpass filters according to the fourth embodiment of the present invention.

FIG. 22 is a table showing the structure of the filter parameter table 2012 for the bandpass filters according to this embodiment. The filter parameter table 2012 is used to set the frequency bands of the bandpass filters after heterodyne processing.

The filter parameter table 2012 stores a frequency band 2204 of an unnecessary signal in association with a type 2201 of unnecessary signal removal filter, a use chirp wave 2202, and a use dual-sweep signal 2203. Note that the plurality of frequency bands 2204 may be set depending on the use chirp wave 2202 and the use dual-sweep signal 2203.

<<Processing Procedure of Information Processing Apparatus>>

Figure 23:
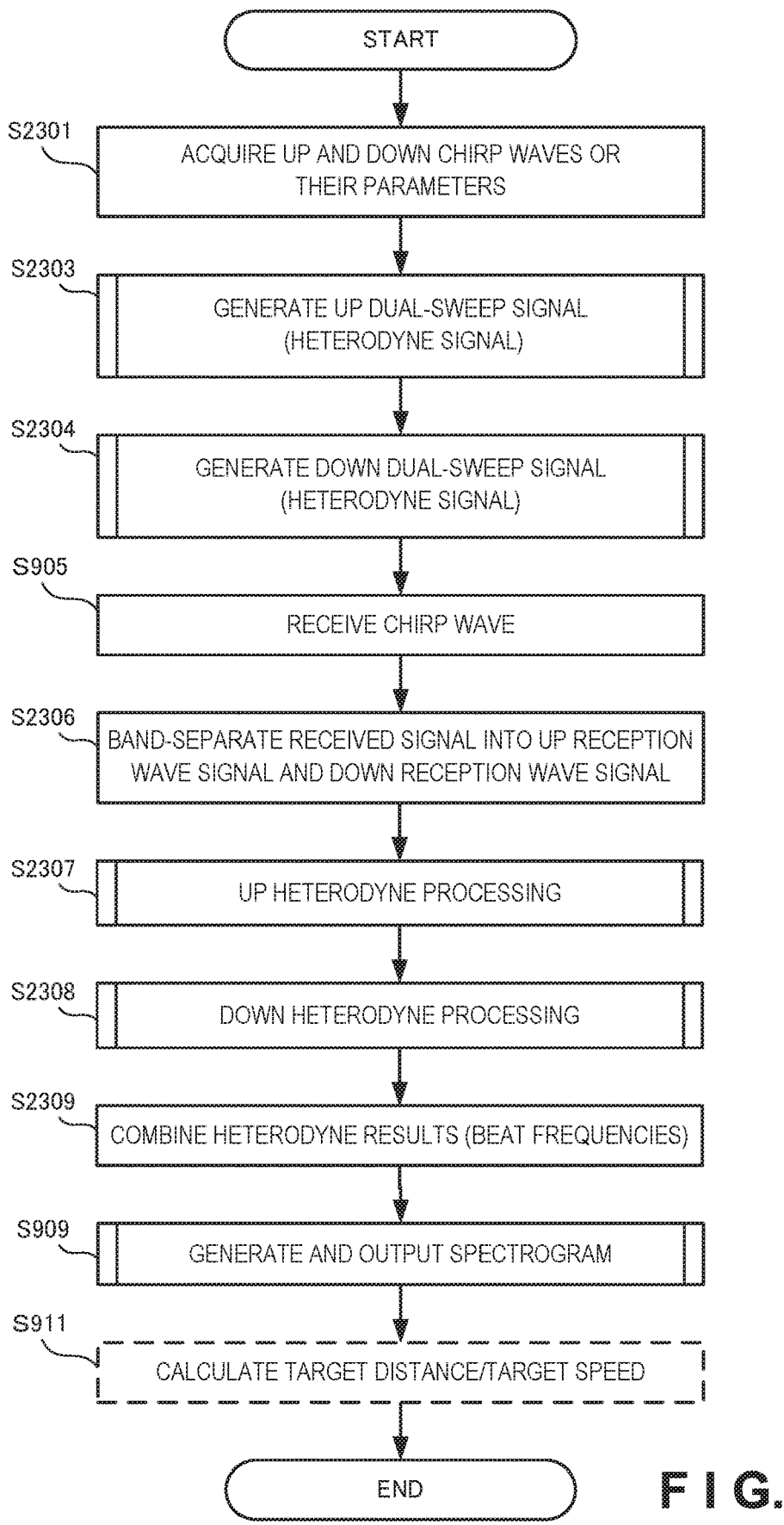
FIG. 23 is a flowchart illustrating the processing procedure of the information processing apparatus according to the fourth embodiment of the present invention.

FIG. 23 is a flowchart illustrating the processing procedure of the information processing apparatus 2000 according to this embodiment. This flowchart is executed by a CPU 810 of FIG. 8 using a RAM 840, thereby implementing the functional components of FIG. 20. Note that in FIG. 23, the same step numbers as in FIG. 9 denote the same steps and a description thereof will be omitted.

In step S2301, the information processing apparatus 2000 acquires up and down chirp waves or their parameters. Note that if three or more chirp waves are used, data of each chirp wave is acquired. In step S2303, the information processing apparatus 2000 generates an up dual-sweep signal corresponding to the transmitted up chirp wave.

In step S2304, the information processing apparatus 2000 generates a down dual-sweep signal corresponding to the transmitted down chirp wave. Note that the processes in steps S2303 and S2304 are the same as those in FIG. 10A of the second embodiment and a detailed description thereof will be omitted.

In step S2306, the information processing apparatus 2000 band-separates the reception wave signal into an up reception wave signal and a down reception wave signal. In step S2307, the information processing apparatus 2000 executes up heterodyne processing of multiplying the up reception wave signal by the up dual-sweep signal. In step S2308, the information processing apparatus 2000 executes down heterodyne processing of multiplying the down reception wave signal by the down dual-sweep signal. Note that the processes in steps S2307 and S2308 are the same as those in steps S1021 to S1027 in FIG. 10B of the second embodiment and a detailed description thereof will be omitted. In step S2309, the information processing apparatus 2000 forms heterodyne results.

According to this embodiment, since a reception wave of a plurality of chirp waves is separated to perform heterodyne processing, the chirp waves and heterodyne signals can be set in narrow frequency bands. Thus, it is possible to effectively perform target extraction, target speed estimation, and Doppler influence correction.

Fifth Embodiment

An information processing apparatus according to the fifth embodiment of the present invention will be described next. The information processing apparatus according to this embodiment is different from those according to the second to fourth embodiments in that a transmitted chirp wave is used as a dual-sweep signal. The remaining components and operations are the same as those in the second to fourth embodiments. Hence, the same reference numerals denote the same components and operations, and a detailed description thereof will be omitted.

<<Overview of Processing of Embodiment>>
(Transmission Wave Signal and Reception Wave Signal)
FIG. 24A shows timing charts showing the frequencies of a transmission wave signal 2410 and reception wave signal 2420 in a target extraction system including the information processing apparatus according to this embodiment.

Referring to FIG. 24A, the transmission wave signal 2410 and the reception wave signal 2420 are dual-sweep signals. In this embodiment, a plurality of pseudo chirp waves are generated with a simpler arrangement, and a plurality of sets of beat signals can be generated at once.

Figure 24B:
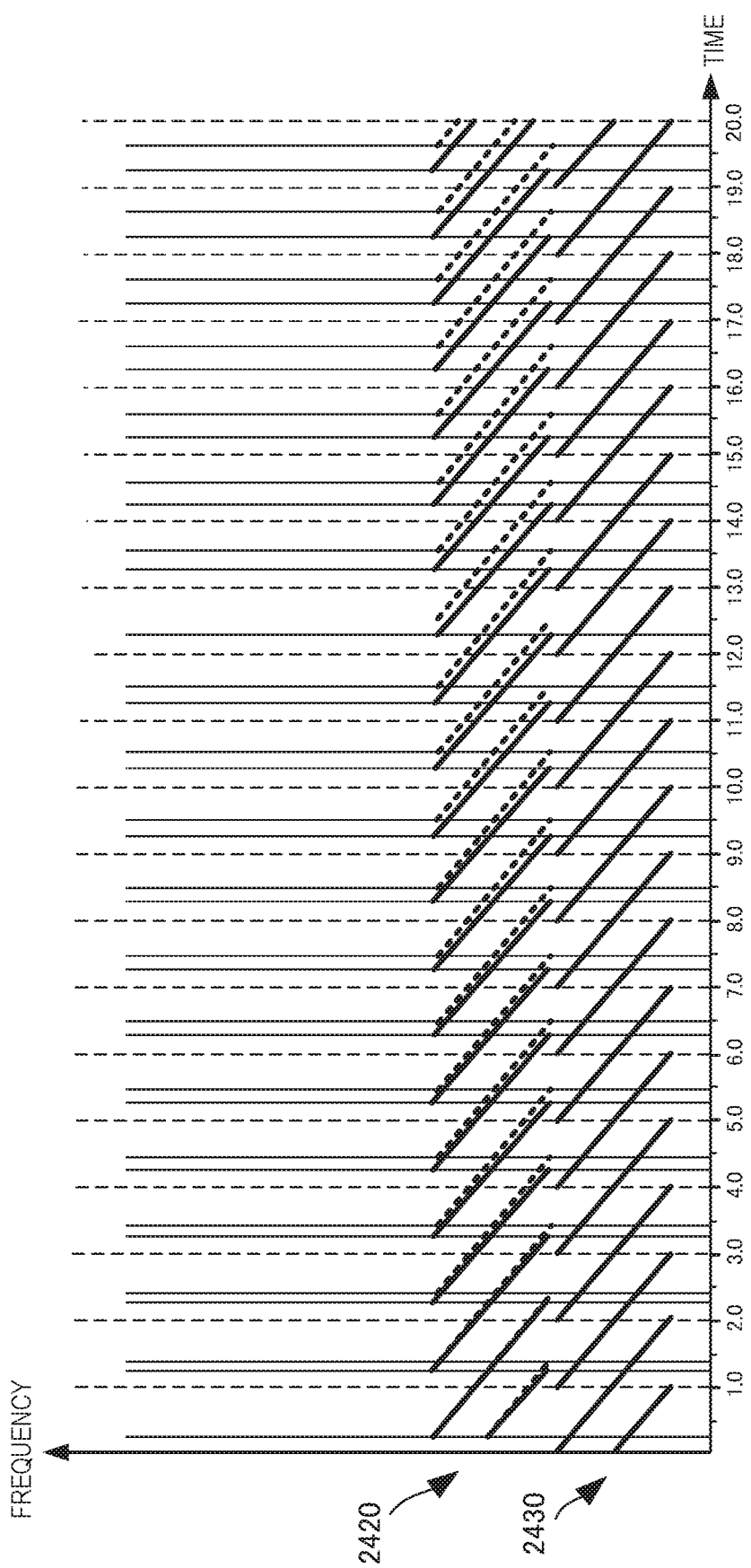
FIG. 24B is a timing chart showing frequency changes in the reception wave signal and a dual-sweep signal according to the fifth embodiment of the present invention.

(Reception Wave Signal and Dual-Sweep Signal)
FIG. 24B is a timing chart showing frequency changes in the reception wave signal 2420 and a dual-sweep signal 2430 according to this embodiment. Note that in FIG. 24B, the dual-sweep signal 2430 is set on the low-frequency side which does not overlap the reception wave signal 2420 but may be set on the high-frequency side. The dual-sweep signal 2430 is desirably set on the low-frequency side to narrow a use frequency range.

Figure 24C:
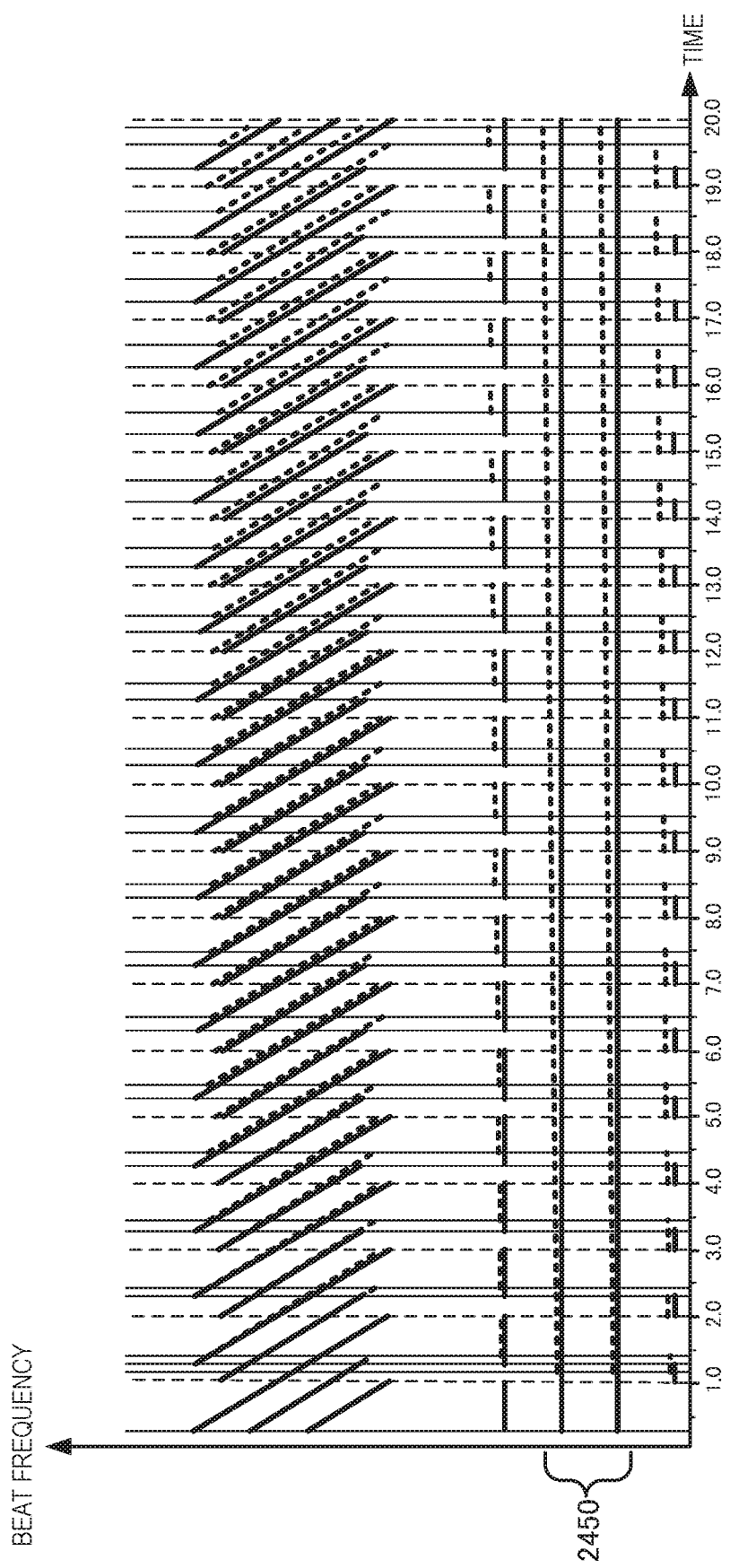
FIG. 24C is a timing chart showing beat frequency changes in heterodyne processing results in the information processing apparatus according to the fifth embodiment of the present invention.

(Heterodyne Processing Result in Information Processing Apparatus)
FIG. 24C is a timing chart showing beat frequency changes in heterodyne processing results 2450 in the information processing apparatus according to this embodiment.

As shown in FIG. 24C, the plurality of sets of heterodyne processing results 2450 are output in frequency bands separated from another unnecessary frequency band and close to each other.

Figure 25A:
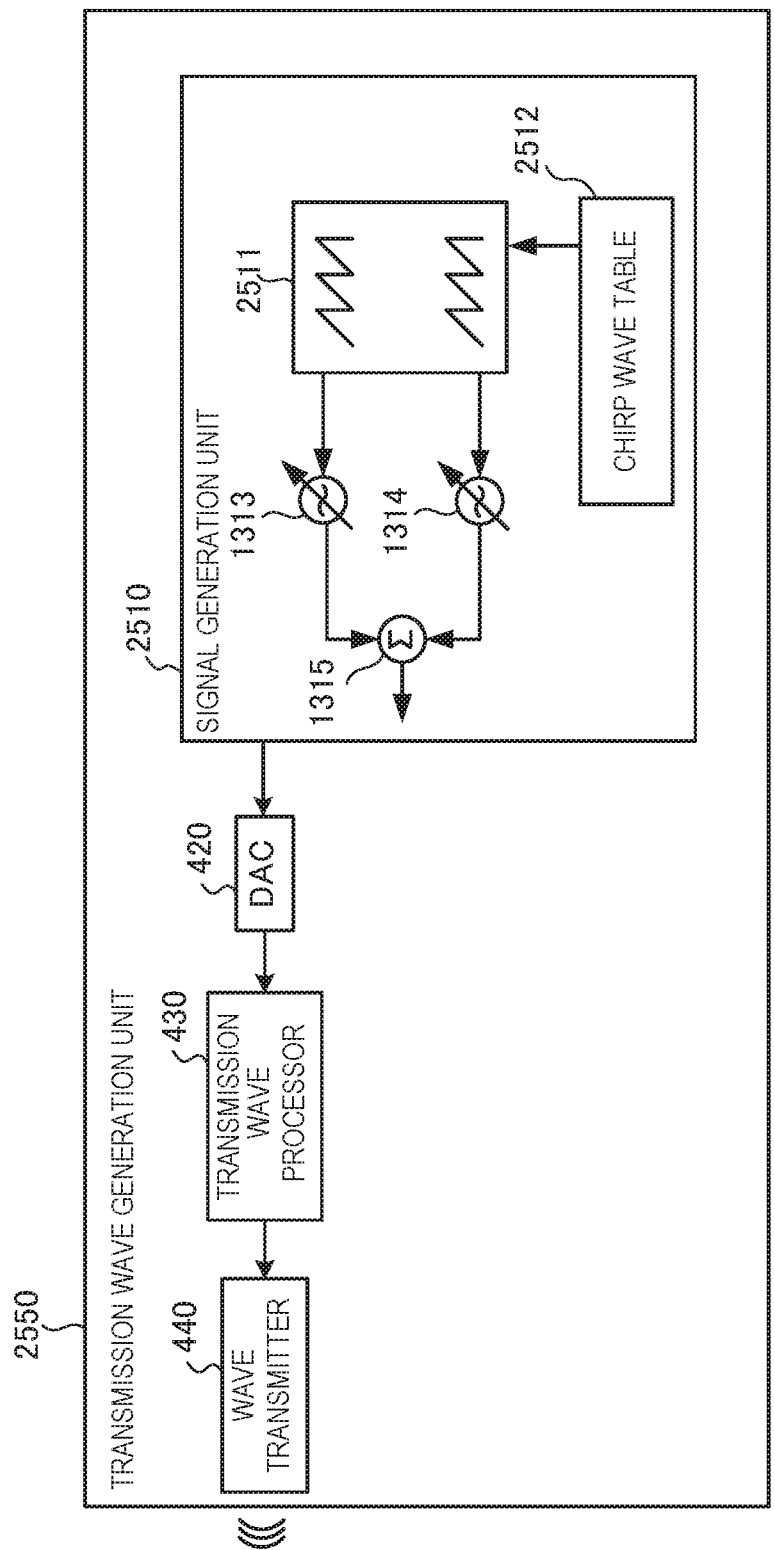
FIG. 25A is a block diagram showing the functional arrangement of a transmission wave generation unit according to the fifth embodiment of the present invention.

<<Functional Arrangement of Transmission Wave Generation Unit>>
FIG. 25A is a block diagram showing the functional arrangement of a transmission wave generation unit 2550 according to this embodiment. Note that in FIG. 25A, the same reference numerals as in FIGS. 4A and 13A denote the same functional components and a description thereof will be omitted. The functional arrangement of the transmission wave generation unit 2550 shown in FIG. 25A is merely an example, and the present invention is not limited to this as long as a dual-sweep chirp wave is output according to this embodiment.

The transmission wave generation unit 2550 includes a signal generation unit 2510, a digital-to-analog converter (DAC in FIG. 25A) 420, a transmission wave processor 430, and a wave transmitter 440. The signal generation unit 2510 includes a signal generator 2511 that generates a signal of a chirp waveform, and a chirp wave table 2512 that stores the frequency band and cycle of the chirp waveform generated by the signal generator 2511.

Note that FIG. 25A shows the arrangement in which the frequency band and cycle of the dual-sweep chirp wave to be transmitted can be freely set. However, if the dual-sweep chirp wave is fixed, the chirp wave table 2512 is not necessary.

FIG. 25B is a table showing the structure of the chirp wave table 2512 according to this embodiment. The chirp wave table 2512 is used to set the frequency band and cycle of the dual-sweep chirp wave generated by the signal generator 2511.

The chirp wave table 2512 stores a wave type 2522 and a frequency band 2523 and cycle 2524 of the wave in association with a use wave flag 2521 indicating a chirp wave to be used.

Referring to FIG. 25B, in the use wave flag 2521, ○ indicates a use wave and x indicates a disuse wave. The wave type 2522 includes a dual-sweep up chirp wave, a dual-sweep down chirp wave, and a serrated chirp wave obtained by alternately repeating a dual-sweep up chirp wave and a dual-sweep down chirp wave. In this example, a plurality of chirp waves to be used, whose frequency bands are continuous, are stored in association with each use wave flag 2521.

Figure 26:
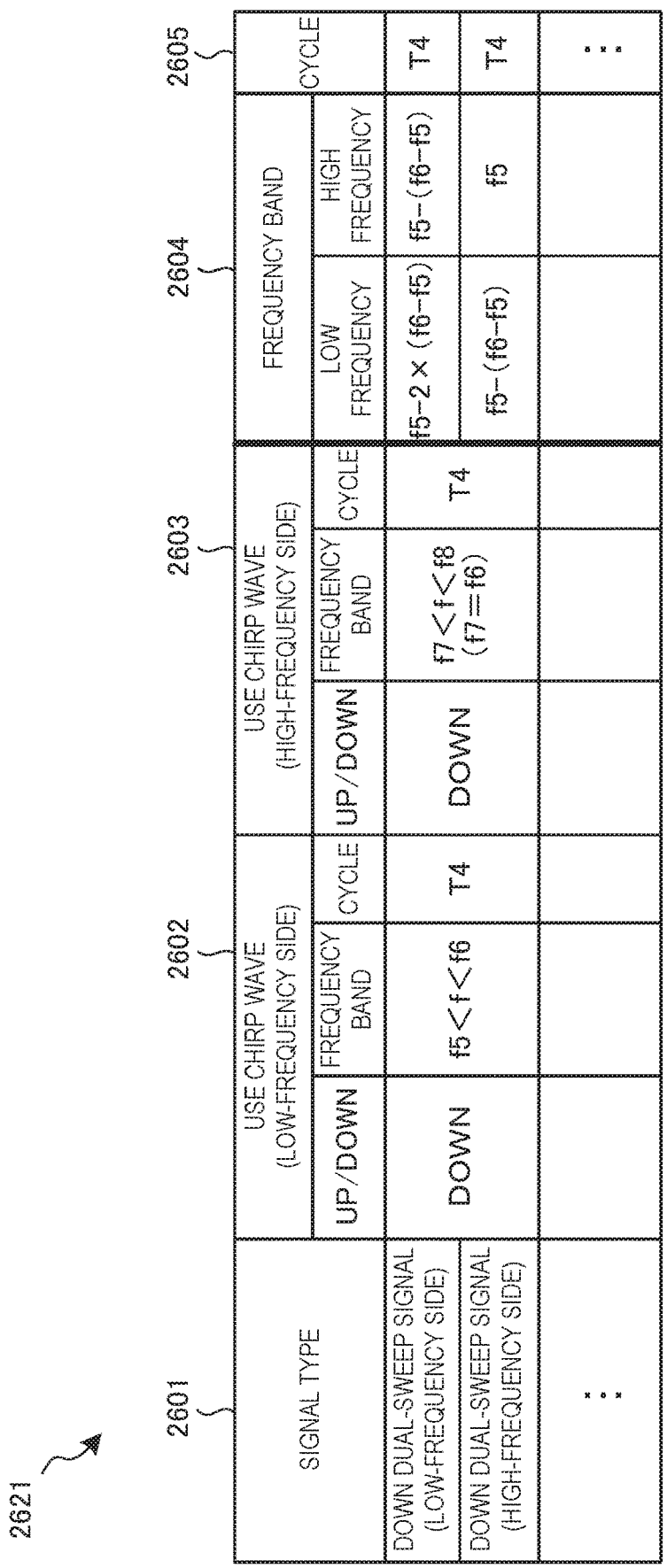
FIG. 26 is a table showing the structure of a dual-sweep signal table according to the fifth embodiment of the present invention.

(Dual-Sweep Signal Table)
FIG. 26 is a table showing the structure of a dual-sweep signal table 2621 according to this embodiment. The dual-sweep signal table 2621 is used to generate a dual-sweep signal for heterodyne processing corresponding to the dual-sweep chirp wave. Note that if the dual-sweep chirp wave is known and fixed, the dual-sweep signal table 2621 is not necessary.

The dual-sweep signal table 2621 stores a frequency band 2604 which does not overlap that of the dual-sweep chirp wave, and a cycle 2605 in association with a type 2601 of dual-sweep signal and a low-frequency side 2602 and high-frequency side 2603 of the dual-sweep chirp wave to be used.

Figure 27:
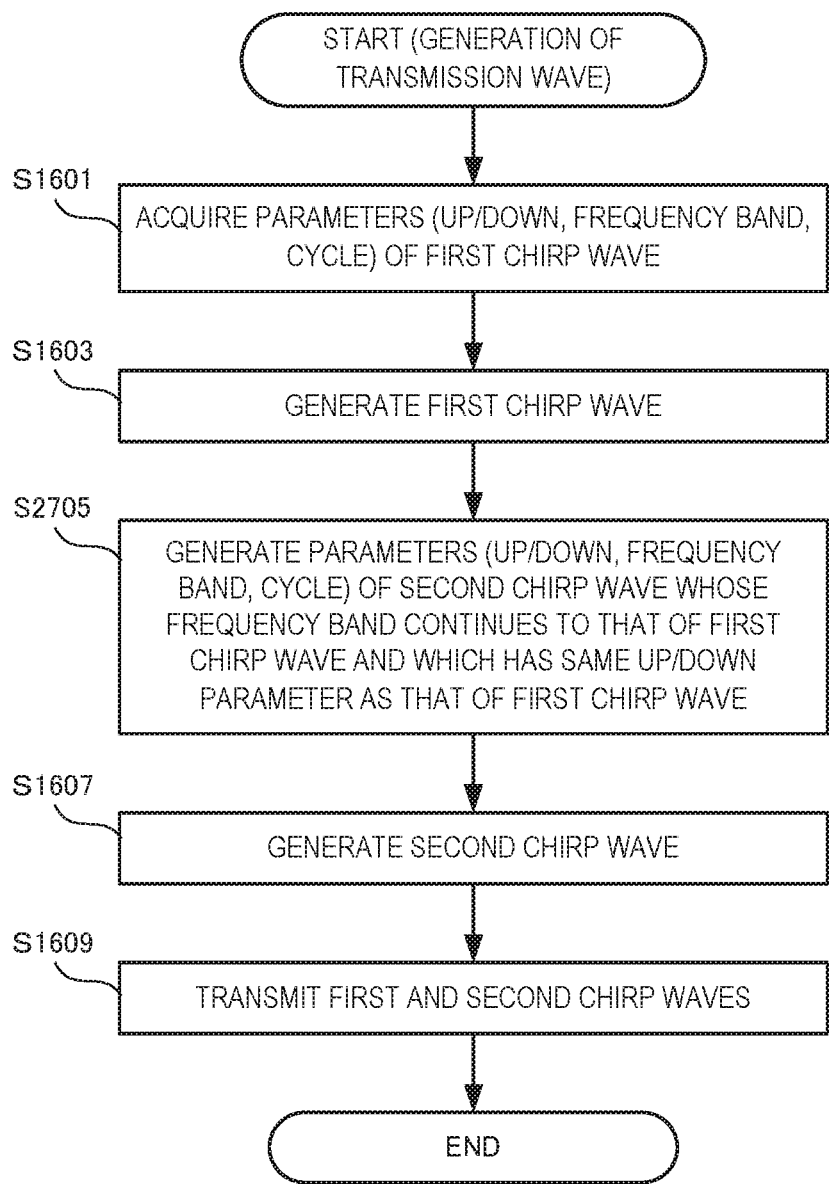
FIG. 27 is a flowchart illustrating the processing procedure of the transmission wave generation unit according to the fifth embodiment of the present invention.

<<Processing Procedure of Transmission Wave Generation Unit>>
FIG. 27 is a flowchart illustrating the processing procedure of the transmission wave generation unit 2550 according to this embodiment. Note that in FIG. 27, the same step numbers as in FIG. 16 denote the same steps and a description thereof will be omitted.

In step S2705, the transmission wave generation unit 2550 generates parameters of the second chirp wave whose frequency band continues to that of the first chirp wave generated in step S1603 and which has the same up/down parameter as that of the first chirp wave. In step S1607, the transmission wave generation unit 2550 generates the second chirp wave.

According to this embodiment, since a plurality of processing results are output by performing heterodyne processing and spectrogram processing once, it is possible to effectively perform target extraction, target speed estimation, and Doppler influence correction with a simple arrangement.

Sixth Embodiment

An information processing apparatus according to the sixth embodiment of the present invention will be described next. The information processing apparatus according to this embodiment is different from those according to the second to fifth embodiments in that the information processing apparatus includes a wave transmitter. The remaining components and operations are the same as those in the second to fifth embodiments. Hence, the same reference numerals denote the same components and operations, and a detailed description thereof will be omitted.

<<Functional Arrangement of Information Processing Apparatus>>

Figure 28:
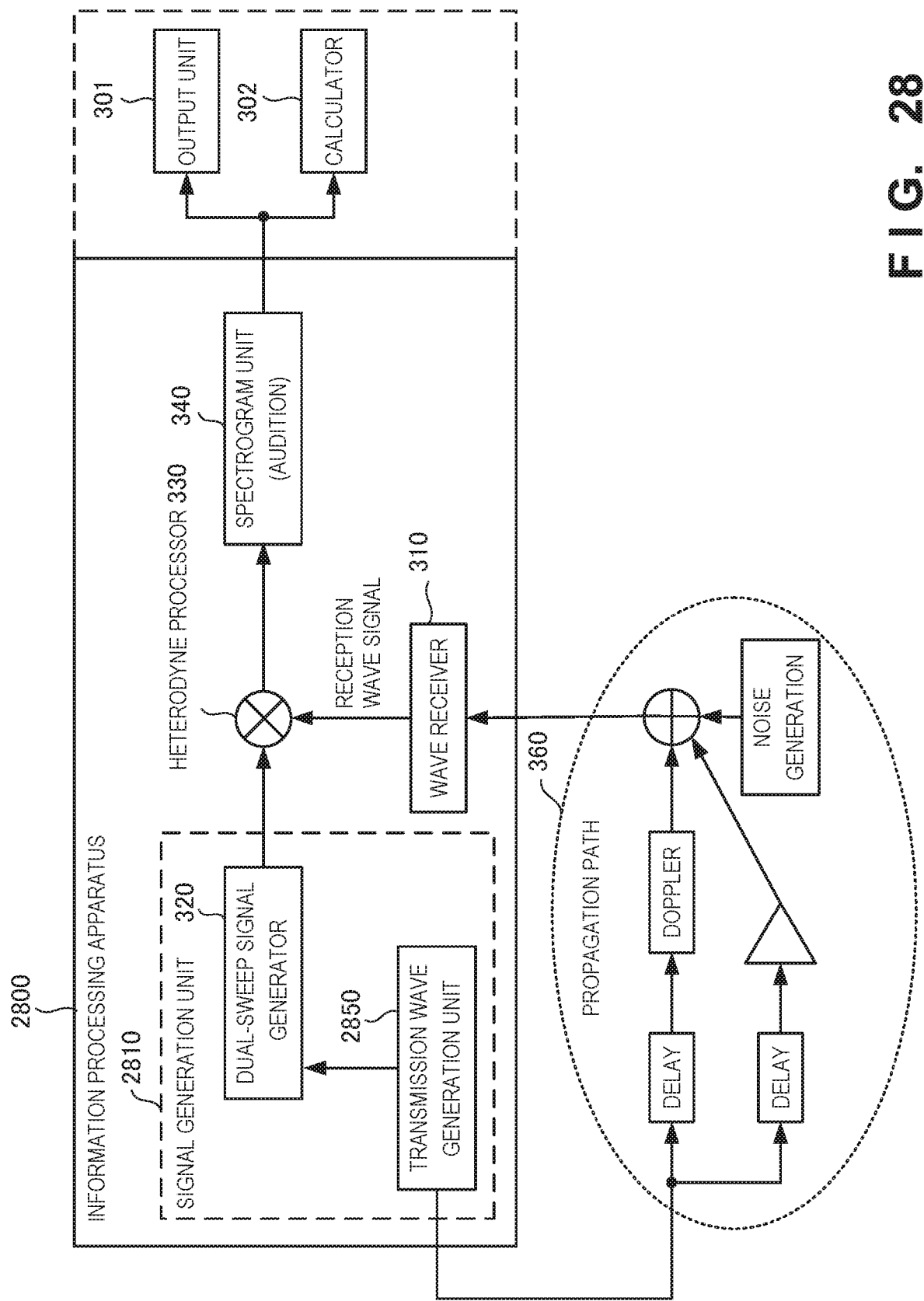
FIG. 28 is a block diagram showing the functional arrangement of an information processing apparatus according to the sixth embodiment of the present invention.

FIG. 28 is a block diagram showing the functional arrangement of an information processing apparatus 2800 according to this embodiment. Note that in FIG. 28, the same reference numerals as in FIG. 3 denote the same functional components and a description thereof will be omitted.

Referring to FIG. 28, a transmission wave generator 2850 is included in the information processing apparatus 2800. The functional arrangement of the transmission wave generator 2850 is the same as that shown in FIG. 4A, 13A, or 25A.

Furthermore, the arrangement can be simplified by integrating the transmission wave generator 2850 and a dual-sweep signal generator 320 as a signal generation unit 2810. All the components of an output unit 301 and calculator 302 can be included in the information processing apparatus 2800.

According to this embodiment, since it is possible to correctly adjust a chirp wave to be transmitted and a dual-sweep signal to undergo heterodyne processing, it is possible to perform target extraction, target speed estimation, and Doppler influence correction with higher accuracy.

Other Embodiments

Note that the target extraction method using an acoustic wave or ultrasonic wave, which has been described above, can be used for a technique of making robots pass each other without crashing and a vehicle collision avoidance technique. However, the present invention is not limited to them, and can be used to, for example, monitor an intruder in an office or the like, detect the motion of a person in a gymnasium, and monitor an obstacle in the water. In many cases, an ultrasonic wave cannot be used for monitoring in the water such as a port since it attenuates easily. However, the present invention is applicable to the principles of a target object detection method, distance measurement method, and speed measurement method using an acoustic wave called active sonar. Therefore, by appropriately setting a carrier frequency (center frequency), waveform length, modulated wave frequency, and the like suitable for the water, it is possible to obtain the same effects as those of the present invention. Furthermore, a transmission waveform according to the present invention can also be used for radar using a radio wave.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

This application claims the benefit of Japanese Patent Application No. 2014-048144 filed on Mar. 11, 2014, which is hereby incorporated by reference herein in its entirety.

The invention claimed is:

1. An information processing apparatus comprising:
a wave receiver that receives at least two reflected waves and outputs at least two reception wave signals in accordance with the at least two reflected waves,
wherein at least two chirp waves are transmitted at the same time and reflected from a target, and
wherein frequency bands of the at least two transmitted chirp waves do not overlap each other;
a dual-sweep signal generator that generates at least two dual-sweep signals based on the at least two transmitted chirp waves, respectively,
wherein frequencies of the at least two dual-sweep signals do not overlap the frequency bands of the at least two transmitted chirp waves; and
a heterodyne processor that receives the at least two reception wave signals from the wave receiver, receives the at least two dual-sweep signals from the dual-sweep signal generator, and generates at least two beat frequencies by multiplying the at least two reception wave signals and the at least two dual-sweep signals as heterodyne signals, respectively,
wherein a Doppler deviation ratio is calculated from frequencies of the at least two transmitted chirp waves and frequencies of the at least two reflected waves, and an influence of the Doppler effect is corrected using the calculated Doppler deviation ratio.

2. The information processing apparatus according to claim 1, further comprising:
a spectrogram generator that generates at least two frequency spectrums based on the at least two beat frequencies.

3. The information processing apparatus according to claim 2, further comprising:
a spectrogram display unit that displays the at least two frequency spectrums generated based on the at least two beat frequencies.

4. The information processing apparatus according to claim 2, further comprising:
a target distance calculator that calculates a distance to the target based on the at least two frequency spectrums generated based on the at least two beat frequencies.

5. The information processing apparatus according to claim 4, further comprising:
a target speed calculator that calculates a moving speed of the target based on the at least two frequency spectrums generated based on the at least two beat frequencies.

6. The information processing apparatus according to claim 2, further comprising:
a target speed calculator that calculates a moving speed of the target based on the at least two frequency spectrums generated based on the at least two beat frequencies.

7. The information processing apparatus according to claim 1, further comprising:
a wave transmitter that transmits the at least two chirp waves,
wherein the wave transmitter transmits the at least two chirp waves with cycles shifted by a half cycle relative to each other.

8. The information processing apparatus according to claim 1, wherein the at least two transmitted chirp waves comprises a UP chirp wave with a frequency Fsu which linearly rises and a DOWN chirp wave with a frequency Fsd which linearly lowers, and wherein the at least two reflected waves comprises a UP chirp reflected wave with a frequency Fm which linearly rises and a DOWN chirp reflected wave with a frequency Frd which linearly lowers, and the Doppler deviation ratio D is calculated by D=(Fru+Frd)/(Fsu +Fsd) =(Fru+Frd)/2Fc with the frequency Fc being set as a center frequency of the UP chirp wave and the DOWN chirp wave.

9. The information processing apparatus according to claim 1, wherein the heterodyne processor has an unnecessary signal remover that removes a frequency component unnecessary for target extraction included in a result of the multiplication, and wherein the unnecessary frequency component is predicted based on the at least two transmitted chirp waves and the at least two dual-sweep signals.

10. The information processing apparatus according to claim 9, wherein the wave receiver has a band separator that separates the received at least two reflected waves into the at least two reception wave signals, and wherein the unnecessary signal remover has at least two unnecessary signal filters that remove, respectively, frequency components unnecessary for the target extraction in accordance with the at least two separated reception wave signals.

11. A control method of an information processing apparatus, comprising:
receiving at least two reflected waves, and outputting at least two reception wave signals in accordance with the at least two reflected waves,
wherein at least two chirp waves are transmitted at the same time and reflected from a target, and
wherein frequency bands of the at least two transmitted chirp waves do not overlap each other;
generating at least two dual-sweep signals based on the at least two transmitted chirp waves, respectively,
wherein frequencies of the at least two dual-sweep signals do not overlap the frequencies of the at least two transmitted chirp waves; and
generating at least two beat frequencies by multiplying the at least two reception wave signals and the at least two dual-sweep signals as heterodyne signals, respectively,
wherein a Doppler deviation ratio is calculated from frequencies of the at least two transmitted chirp waves and frequencies of the at least two reflected waves, and an influence of the Doppler effect is corrected using the calculated Doppler deviation ratio.

12. The control method according to claim 11, wherein the generating the at least two beat frequencies comprises removing a frequency component unnecessary for target extraction included in a result of the multiplication, and wherein the unnecessary frequency component is predicted based on the at least two chirp waves and the at least two dual-sweep signals.

13. The control method according to claim 11, further comprising:
transmitting the at least two chirp waves with cycles shifted by a half cycle relative to each other.

14. A non-transitory computer-readable storage medium storing a control program of an information processing apparatus, for causing a computer to execute a method, comprising:
receiving at least two reflected waves, and outputting at least two reception wave signals in accordance with the at least two reflected waves,
wherein at least two chirp waves are transmitted at the same time and reflected from a target, and
wherein frequency bands of the at least two transmitted chirp waves do not overlap each other;
generating at least two dual-sweep signals based on the at least two transmitted chirp waves, respectively,
wherein frequencies of the at least two dual-sweep signals do not overlap the frequencies of the at least two transmitted chirp waves; and
generating at least two beat frequencies by multiplying the at least two reception wave signals and the at least two dual-sweep signals as heterodyne signals, respectively,
wherein a Doppler deviation ratio is calculated from frequencies of the at least two transmitted chirp waves and frequencies of the at least two reflected waves, and an influence of the Doppler effect is corrected using the calculated Doppler deviation ratio.

15. The storage medium according to claim 14, wherein the generating the at least two beat frequencies comprises removing a frequency component unnecessary for target extraction included in a result of the multiplication, and wherein the unnecessary frequency component is predicted based on the at least two transmitted chirp waves and the at least two dual-sweep signals.

16. The storage medium according to claim 14, wherein the method further comprises:
transmitting the at least two chirp waves,
wherein the at least two chirp waves are transmitted with cycles shifted by a half cycle relative to each other.

17. A target extraction system comprising:
a wave transmission apparatus that transmits at least two chirp waves at the same time, wherein frequency bands of the at least two transmitted chirp waves do not overlap each other; and
a wave reception apparatus that receives at least two reflected waves and extracts a target wherein the at least two transmitted chirp waves are reflected from the target,
wherein the wave reception apparatus comprises:
a wave receiver that receives the at least two reflected waves, and outputs at least two reception wave signals in accordance with the at least two reflected waves; and
a heterodyne processor that generates at least two beat frequencies by multiplying the at least two reception wave signals and at least two dual-sweep signals as heterodyne signals, respectively,
wherein the at least two dual-sweep signals are respectively generated based on the at least two transmitted chirp waves, and frequencies of the at least two dual-sweep signals do not overlap frequencies of the at least two transmitted chirp waves, wherein said wave reception apparatus calculates a Doppler deviation ratio from frequencies of the at least two transmitted chirp waves and frequencies of the at least two reflected waves, and corrects an influence of the Doppler effect using the calculated Doppler deviation ratio.

18. A target extraction method comprising:
transmitting at least two chirp waves at the same time, wherein frequency bands of the at least two transmitted chirp waves do not overlap each other; and
extracting a target based on at least two frequency spectrums generated based on at least two beat frequencies,.
   wherein the at least two beat frequencies are generated by multiplying at least two dual-sweep signals and at least two reception wave signals obtained from at least two reflected waves as heterodyne signals,
   wherein the at least two reflected chirp waves are reflected from the target,
   wherein the at least two dual-sweep signals are respectively generated based on the at least two transmitted chirp waves, and frequencies of the at least two dual-sweep signals do not overlap that of the at least two transmitted chirp waves,
wherein a Doppler deviation ratio is calculated from frequencies of the at least two transmitted chirp waves and frequencies of the at least two reflected waves, and an influence of the Doppler effect is corrected using the calculated Doppler deviation ratio.

\* \* \* \* \*